US012755719B2

(12) United States Patent
Ranson

(10) Patent No.: US 12,755,719 B2
(45) Date of Patent: Oct. 6, 2026

(54) STRINGED MUSICAL INSTRUMENT WITH FRETTING SADDLING MEMBER

(71) Applicant: Polyphonic Chromaticism, Inc., Sandstone, MN (US)

(72) Inventor: Benjamin M. Ranson, Sandstone, MN (US)

(73) Assignee: POLYPHONIC CHROMATICISM, INC., Sandstone, MN (US)

( * ) Notice: Subject to any disclaimer, the term of this patent is extended or adjusted under 35 U.S.C. 154(b) by 0 days.

(21) Appl. No.: 19/571,221

(22) Filed: Mar. 18, 2026

(65) Prior Publication Data

US 2026/0279311 A1 Sep. 17, 2026

Related U.S. Application Data

(63) Continuation of application No. PCT/US2026/019165, filed on Mar. 13, 2026.

(60) Provisional application No. 63/856,170, filed on Aug. 1, 2025, provisional application No. 63/771,375, filed on Mar. 13, 2025.

(51) Int. Cl.
*G10D 1/08* (2006.01)
*G10D 3/06* (2020.01)

(52) U.S. Cl.
CPC ................. *G10D 1/08* (2013.01); *G10D 3/06* (2013.01)

(58) Field of Classification Search
CPC ................................... G10D 1/04; G10D 1/08
See application file for complete search history.

(56) References Cited

U.S. PATENT DOCUMENTS

| | | | |
|---|---|---|---|
| 864,204 | A | 8/1907 | Skinnell |
| 937,121 | A | 10/1909 | Turturro |
| 1,461,636 | A | 7/1923 | Tanquary |
| 1,684,467 | A | 9/1928 | Albert |
| 1,895,383 | A | 1/1933 | Sullivan |
| 2,491,991 | A | 12/1949 | Lundback |
| 2,565,253 | A | 8/1951 | Sebastiano |
| 2,573,254 | A | 10/1951 | Fender |

(Continued)

FOREIGN PATENT DOCUMENTS

| | | | |
|---|---|---|---|
| DE | 340568 | C | 9/1921 |
| DE | 354922 | C | 6/1922 |

(Continued)

OTHER PUBLICATIONS

Wikipedia—"Moodswinger" [online]—Retrieved on Sep. 5, 2024 from the Internet <URL: https://en.wikipedia.org/wiki/Moodswinger >.

(Continued)

*Primary Examiner* — Christopher Uhlir
(74) *Attorney, Agent, or Firm* — Gallium Law; Wesley Schwie; Justin Schwechter

(57) ABSTRACT

A fretting saddling member with a saddling interface and a string contactable fretting crown is coupled to a body of a stringed musical instrument. The saddling interface contacts a string and directs it above the fretting crown and towards a neck of the stringed musical instrument. A player may use the wrist of the picking hand to depress the string between the saddling interface and the fretting crown until the string contacts the fretting crown. A length of the string extending from the fretting crown to a nut on the neck may be plucked with the thumb of the picking hand.

30 Claims, 24 Drawing Sheets

(56) References Cited

U.S. PATENT DOCUMENTS

| | | | | |
|---|---|---|---|---|
| 2,714,326 | A | 8/1955 | Mccarty | |
| 2,740,313 | A | 4/1956 | Mccarty | |
| 2,741,146 | A | 4/1956 | Fender | |
| 2,964,985 | A | 12/1960 | Webster | |
| 3,103,846 | A | 9/1963 | Webster | |
| 3,538,807 | A | 11/1970 | Francis | |
| 3,780,202 | A | 12/1973 | Law | |
| 3,911,777 | A | 10/1975 | Rendell | |
| 4,132,143 | A | 1/1979 | Stone | |
| 4,171,661 | A | 10/1979 | Rose | |
| 4,227,434 | A | 10/1980 | Dimarzio | |
| 4,335,641 | A * | 6/1982 | Hopf | G10D 3/04 84/307 |
| 4,497,236 | A | 2/1985 | Rose | |
| 4,535,668 | A | 8/1985 | Schaller | |
| 4,616,548 | A | 10/1986 | Anderson | |
| 4,722,260 | A | 2/1988 | Pigozzi | |
| 4,777,858 | A | 10/1988 | Petschulat | |
| 4,852,450 | A | 8/1989 | Novak | |
| 4,869,144 | A | 9/1989 | Lieber | |
| 4,981,064 | A | 1/1991 | Vogt | |
| 5,072,646 | A | 12/1991 | Valkama | |
| 5,404,783 | A | 4/1995 | Feiten | |
| 5,600,079 | A | 2/1997 | Feiten | |
| 5,750,910 | A | 5/1998 | Lojacono | |
| 5,814,745 | A | 9/1998 | Feiten | |
| 5,847,298 | A * | 12/1998 | Adams | G10D 3/06 84/314 R |
| 6,046,397 | A | 4/2000 | Rose | |
| 6,156,961 | A | 12/2000 | Beckmeier | |
| 6,162,984 | A | 12/2000 | Engard | |
| 6,723,905 | B2 | 4/2004 | Gillis | |
| 6,911,590 | B2 | 6/2005 | Childress | |
| 6,992,243 | B2 | 1/2006 | Small | |
| 7,060,888 | B2 | 6/2006 | Spalt | |
| 7,145,063 | B2 | 12/2006 | Redard | |
| 7,179,975 | B2 | 2/2007 | Feiten | |
| 7,301,085 | B2 | 11/2007 | Wyman | |
| 7,453,033 | B2 | 11/2008 | Redard | |
| 8,481,831 | B2 | 7/2013 | Tanabe | |
| 8,759,649 | B2 * | 6/2014 | Potyrala | G10D 1/085 84/293 |
| 9,520,109 | B1 | 12/2016 | Edwards | |
| 9,881,593 | B2 | 1/2018 | Edwards | |
| 10,607,588 | B2 | 3/2020 | Berg | |
| 11,114,070 | B2 | 9/2021 | Langberg | |
| 11,195,503 | B2 | 12/2021 | Bruen | |
| 11,636,832 | B2 | 4/2023 | Singh | |
| 2007/0131082 | A1 | 6/2007 | Feiten | |
| 2015/0000508 | A1 | 1/2015 | Canavan | |
| 2016/0027422 | A1 | 1/2016 | Baker | |
| 2018/0197518 | A1 | 7/2018 | Ma | |
| 2025/0273187 | A1 * | 8/2025 | Micarelli | G10D 1/08 |

FOREIGN PATENT DOCUMENTS

| | | | |
|---|---|---|---|
| DE | 102009034171 | A1 | 2/2011 |
| GB | 2173032 | A1 | 10/1986 |
| WO | 2006100309 | A1 | 9/2006 |

OTHER PUBLICATIONS

Wikipedia—"Home Swinger" [online]—Retrieved on Sep. 5, 2024 from the Internet <URL: https://en.wikipedia.org/wiki/Home_Swinger>.

Wikipedia—"Springtime (guitar)" [online]—Retrieved on Sep. 5, 2024 from the Internet <URL: https://en.wikipedia.org/wiki/Springtime_(guitar)>.

Guitar Gallery—"New Complexity Harmonic Master Guitar" [online]—Retrieved on Sep. 5, 2024 from the Internet <URL: https://www.guitargal.com/products/new-complexity-harmonic-master-guitar? >.

Bart—"Adjustable Frets"—Bart Hopkin Musician and Instrument Designer [online]—Retrieved on Sep. 5, 2024 from the Internet <URL: https://barthopkin.com/guitars-with-adjustable-frets/ >.

Dery—"Forging a New Guitar Vocabulary." Guitar Player, Jul. 1988, pp. 52-61.

Reichel—"Crossing the Bridge" Guitar Player, Jan. 1989, pp. 48-52.

ABM—"ABM 3257b Schwarz"—abm-guitarpartsshop.com [online]—Retrieved on Apr. 16, 2026 from the Internet <URL: https://abm-guitarpartsshop.com/ABM-GUITAR-PARTS/Hardtail-Bridges/Modern-7-8/7-String/ABM-3257b-Black::233.html>.

G&L—"Bridge—G&L Saddle Lock Guitar"—Webpage <URL: https://g-l-online-store.myshopify.com/products/g-l-saddle-lock-guitar-bridge>—Available at least as early as Mar. 9, 2015—Retrieved from Internet Archive Wayback Machine <URL: https://web.archive.org/web/20250719145616/https://g-l-online-store.myshopify.com/products/g-l-saddle-lock-guitar-bridge> on Jul. 19, 2025.

Reichel—"Brief History of HR Guitar Making"—p. 9—Webpage <URL: daxo.de> Available at least as early as Aug. 29, 2000—Retrieved from YouTube.com <URL: https://www.youtube.com/watch?v=qxHqJ5jAuoo> on May 5, 2026.

New Complexity—"Harmonic Guitars" [online]—Retrieved on Apr. 16, 2026 from the Internet <URL: https://newcomplexity.com.au/harmonic-guitars/ >.

Discogs—"Hans Reichel—The Death Of The Rare Bird Ymir" [online]—Retrieved on Apr. 16, 2026 from the Internet <URL: https://www.discogs.com/release/1235043-Hans-Reichel-The-Death-Of-The-Rare-Bird-Ymir >.

Discogs—"Reichel" [online]—Retrieved on Apr. 16, 2026 from the Internet <URL: https://www.discogs.com/artist/211536-Hans-Reichel/image/SW1hZ2U6MjlxMDYzNzQ=?anv=Reichel&filter>.

Flickr—"Hans Reichel 1981" [online]—Retrieved on Apr. 16, 2026 from the Internet <URL: https://www.flickr.com/photos/26213532@N05/3215938762/in/photostream>.

Microtonal Guitars—"Adjustable Microtonal Guitars, necks, fretboards" [online]—Retrieved on Apr. 16, 2026 from the Internet <URL: https://www.microtonalguitar.org>.

Musiclily—"Musiclily Pro 15.5mm Individual Bass Bridge Single String Lock-Down Bass Bridge for 1st/2nd String"—Webpage <URL: https://musiclily.com/collections/bridge-and-tailpiece/products/musiclily-pro-15-5mm-individual-bass-bridge-single-string-lock-down-bass-bridge-for-1st-2nd-string-mx1844p>—Retrieved from Internet Archive Wayback Machine <URL: https://web.archive.org/web/20250719150410/https://musiclily.com/collections/bridge-and-tailpiece/products/musiclily-pro-15-5mm-individual-bass-bridge-single-string-lock-down-bass-bridge-for-1st-2nd-string-mx1844p> on Jul. 19, 2025.

Dusty Strings—"Sharping Levers" [online]—Retrieved from the Internet <URL: https://manufacturing.dustystrings.com/harps/about-harps/sharping-levers >.

Wikipedia—"Sitar" [online]—Retrieved on Apr. 16, 2026 from the Internet <URL: https://en.wikipedia.org/wiki/Sitar#>.

Lieber Guitars—"The Bass" [online]—Retrieved on Apr. 16, 2026 from the Internet <URL: https://lieberguitars.com/guitars/entwistle-explorer/>.

The Musiczoo—"Tom Lieber Thos Shazar Guitars John Entwistle Bass" [online]—Retrieved from the Internet <URL: https://www.themusiczoo.com/products/tom-lieber-tos-shazar-gutars-john-entwistle-bass>.

Best Bass Gear—"Bartolini Pickup With Slider-Adjustable Pole Pieces" [online]—Retrieved on Apr. 16, 2026 from the Internet <URL: https://www.bestbassgear.com/ebass/funny/bartolini-pickup-with-slider-adjustable-pole-pieces.html?srsIE>.

Sophia—"Sophia 4:44 Hardtail Special—18° Multi-capable/Ambidextrous" [online]—Retrieved on Apr. 16, 2026 from the Internet <URL: https://sophiatremolos.com/products/sophia-4-44-special?srsltid=AfmBOorUVh_hHifujU-bVh-eKPwdb0FIOE6R8j8FIk4yWgGpTuBb8Pt4>.

Wikipedia—"Taishōgoto" [online]—Retrieved on Apr. 16, 2026 from the Internet <URL: https://en.wikipedia.org/wiki/Taish%C5%8Dgoto#>.

(56) References Cited

OTHER PUBLICATIONS

Donahue—“DR. Fret Ver 3 Wine Red” [online]—Retrieved from the Internet <URL: https://www.timdonahue.com/images/DR.%20FRET%20ver.3%20WINE%20RED%20HG.jpg >.
Axebition—“Wilkinson HT100” [online]—Retrieved on Apr. 16, 2026 from the Internet <URL: https://www.axebition.com/bridge/wilkinson-ht100#google_vignette >.
Reverb—“New Complexity Harmonic Isolator”—reverb.com [online]—Retrieved on Apr. 16, 2026 from the Internet <URL: https://reverb.com/item/4553115-new-complexity-harmonic-isolator >.
Whiny—“Harmonic Master by New Complexity”—Off Set Guitars—Aug. 11, 2014—Retrieved from the Internet <URL: https://offsetguitars.com/forums/index.php?threads/insane-12-string-guitar-with-tunable-3rd-bridge.83962/ >.

* cited by examiner

STRINGED MUSICAL INSTRUMENT WITH FRETTING SADDLING MEMBER

CROSS-REFERENCE TO RELATED APPLICATIONS

The entire contents of the following application are incorporated by reference herein: U.S. Provisional Patent Application No. 63/771,375; filed Mar. 13, 2025; and entitled COUNTER-FRETTING DEVICES AND METHODS.

The entire contents of the following application are incorporated by reference herein: U.S. Provisional Patent Application No. 63/856,170; filed Aug. 1, 2025; and entitled WRIST FRETTING ASSEMBLIES AND STRINGED MUSICAL INSTRUMENTS.

The entire contents of the following application are incorporated by reference herein: PCT Application No. PCT/US2026/01965; filed Mar. 13, 2026; and entitled STRINGED MUSICAL INSTRUMENT WITH FRETTING SADDLING MEMBER.

BACKGROUND

Technical Field

The present disclosure relates to a stringed musical instrument.

Description of Related Art

A guitar includes a neck, a body, and strings. Frets are located on a fingerboard connected to the neck. The pitch of a string may be changed by depressing the string against a fingerboard fret with the fretting hand. This action is called fretting.

A player uses the fretting hand to fret along the neck, and uses the picking hand to pluck a string near the body. Fretting shortens the sounding length of the string in one direction; the end of the sounding length at the bridge stays the same, while the location of the end of the sounding length opposite the bridge is changed. As the fretting hand moves toward the body, the pitches of fretted fingerboard notes get higher.

A player may fret multiple fretted fingerboard notes with the fretting hand. Note combinations and articulation are constrained by the physical challenge of fretting multiple strings and by the limited number of open notes.

The most common forms of the guitar are unchanged since the 1960s. As a consequence of the unchanged form of the instrument, the techniques of the guitar and bass guitar have advanced little since the 1970s.

The styles of guitar performance developed in the mid-twentieth century rely on open strings. However, open notes available on open strings are of little use in some keys, and retuning strings to alter open notes is impractical while playing. Thus, fretting hand position forms a longstanding technical barrier which prevents the use of some combinations of notes, restricts the range of chords, and limits expression during polyphonic play.

SUMMARY

Included in the present disclosure is a component for a stringed musical instrument. In some embodiments, the component includes a block having a saddling interface and a first fretting crown spaced longitudinally forward from the saddling interface. According to some embodiments, the block is adjustably positionable on a body of the stringed musical instrument such that the stringed musical instrument is configurable with a proto string of the stringed musical instrument extending i) from a proto string longitudinally rearward critical contact point on the saddling interface, ii) at a wrist fretable vertical distance above the first fretting crown, iii) above a neck of the stringed musical instrument connected to the body of the stringed musical instrument, iv) to a proto string longitudinally forward critical contact point on a nut of the stringed musical instrument disposed on the neck of the stringed musical instrument.

The block may include an opening configured to receive a fastener of the stringed musical instrument configured to couple the block to the body of the stringed musical instrument. In some embodiments, the block includes a string guide indentation configured to position the proto string of the stringed musical instrument on the saddling interface.

According to some embodiments, the block is configured to couple to a soundboard of the body of the stringed musical instrument.

The saddling interface of the block may delineate a first line. In some embodiments, the first fretting crown delineates a second line. According to some embodiments, the first line and the second line are coplanar.

The block may further include a second fretting crown spaced longitudinally forward from the first fretting crown. In some embodiments, the block includes a third fretting crown spaced longitudinally forward from the second fretting crown. According to some embodiments, the block includes a fourth fretting crown spaced longitudinally forward from the third fretting crown.

On the block, a distance from the saddling interface to the second fretting crown may be inclusively from 180% to 194.39% of a distance from the saddling interface to the first fretting crown. In some embodiments, a distance from the saddling interface to the second fretting crown is inclusively from 194.39% to 220% of a distance from the saddling interface to the first fretting crown. According to some embodiments, a distance from the saddling interface to the second fretting crown is inclusively from 194.72% to 220% of a distance from the saddling interface to the first fretting crown. A distance from the saddling interface to the second fretting crown may be inclusively from 195.04% to 220% of a distance from the saddling interface to the first fretting crown. In some embodiments, a distance from the saddling interface to the second fretting crown is inclusively from 195.37% to 220% of a distance from the saddling interface to the first fretting crown.

On the block, according to some embodiments, a distance from the saddling interface to the second fretting crown is inclusively from 138% to 152% of a distance from the saddling interface to the first fretting crown. A distance from the saddling interface to the third fretting crown may be inclusively from 255% to 283.48% of the distance from the saddling interface to the first fretting crown. In some embodiments, a distance from the saddling interface to the third fretting crown is inclusively from 283.48% to 325% of a distance from the saddling interface to the first fretting crown. According to some embodiments, a distance from the saddling interface to the third fretting crown is inclusively from 284.12% to 325% of a distance from the saddling interface to the first fretting crown.

A distance from the saddling interface to a longitudinally forward extent of the block may be equal to or less than 370% of the distance from the saddling interface to the first fretting crown. In some embodiments, a distance from the saddling interface to a longitudinally forward extent the block is equal to or less than 450% of the distance from the saddling interface to the first fretting crown. According to some embodiments, a distance from the saddling interface to a longitudinally forward extent the block is equal to or less than 525% of the distance from the saddling interface to the first fretting crown.

The block may further include an upward facing face and a forward facing surface. In some embodiments, at least one fretting crown includes a rounded edge between the upward facing face and the forward facing surface.

In some embodiments, each fretting crown includes two lateral ends. The block may be configured to couple to the body of the stringed musical instrument such that a first lateral end of at least one fretting crown is laterally between the proto string of the stringed musical instrument and a deutero string of the stringed musical instrument. The stringed musical instrument may be configurable with the deutero string of the stringed musical instrument extending i) from the body of the stringed musical instrument, ii) above the neck of the stringed musical instrument, iii) to the nut of the stringed musical instrument. The deutero string of the stringed musical instrument may be laterally spaced from the proto string of the stringed musical instrument.

In some embodiments, the block is configured to couple to the body of the stringed musical instrument such that a first lateral side of the block is laterally between the proto string of the stringed musical instrument and a deutero string of the stringed musical instrument. The stringed musical instrument may be further configurable with the deutero string of the stringed musical instrument extending i) from the body of the stringed musical instrument, ii) above the neck of the stringed musical instrument, iii) to the nut of the stringed musical instrument. The deutero string of the stringed musical instrument may be laterally spaced from the proto string of the stringed musical instrument.

In some embodiments, a lateral width of the block is equal to or less than 50 millimeters (mm). In some embodiments, a lateral width of the block is equal to or less than 40 mm. According to some embodiments, a lateral width of the block is equal to or less than 30 mm. A lateral width of the block may be equal to or less than 20 mm. In some embodiments, a lateral width of at least one fretting crown is equal to or less than 50 mm. According to some embodiments, a lateral width of at least one fretting crown is equal to or less than 40 mm. A lateral width of at least one fretting crown may be equal to or less than 30 mm. In some embodiments, a lateral width of at least one fretting crown is equal to or less than 20 mm.

According to some embodiments, a longitudinal position of the saddling interface and a longitudinal position of at least one fretting crown are adjustable relative to one another. A position of the saddling interface and at least one fretting crown may be adjustable on the block.

In some embodiments, a first lateral side of the block is configured to contact a support of the stringed musical instrument coupled to the body of the stringed musical instrument.

According to some embodiments, a longitudinal position of the block is adjustable relative to the body of the stringed musical instrument.

In some embodiments, the block is configured to at least partly insert into a slot in a support of the stringed musical instrument coupled to the body of the stringed musical instrument. In some embodiments, a longitudinal position of the block is adjustable relative to the body of the stringed musical instrument by manipulating the block along the slot of the support.

In some embodiments, the block includes a slot configured to receive an insert of the stringed musical instrument connected to the body of the stringed musical instrument. When the insert of the stringed musical instrument is inserted into the slot, the longitudinal position of the block may be adjustable by manipulating the block, via the slot, along the insert of the stringed musical instrument.

In some embodiments, a vertical position of the block is adjustable relative to the body of the stringed musical instrument. A vertical position of a longitudinally forward end of the block may be adjustable relative to the body of the stringed musical instrument. A vertical position of a longitudinally rearward end of the block may be adjustable relative to the body of the stringed musical instrument.

In some embodiments, the block includes a longitudinally forward end and a longitudinally rearward end opposite the longitudinally forward end. The block may include a height adjustment hole configured to receive a height screw of the stringed musical instrument configured to adjust a vertical position of the longitudinally forward end of the block relative to the body of the stringed musical instrument.

In some embodiments, the block includes a longitudinally forward end and a longitudinally rearward end opposite the longitudinally forward end. The block may include a height adjustment hole configured to receive a height screw of the stringed musical instrument configured to adjust a vertical position of the longitudinally rearward end of the block relative to the body of the stringed musical instrument.

Some embodiments include a first height adjustment hole in the block configured to receive a first height screw, which configured to adjust a vertical position of a longitudinally rearward end of the block relative to the body of the stringed musical instrument. The block may further include a second height adjustment hole configured to receive a second height screw of the stringed musical instrument configured to adjust a vertical position of a longitudinally forward end of the block relative to the body of the stringed musical instrument.

In some embodiments, the component includes a pivot. A vertical position of a longitudinally forward end of the block may be adjustable relative to the body of the stringed musical instrument by pivoting the block on the pivot.

The component may include a pivot. A vertical position of a longitudinally rearward end of the block may be adjustable relative to the body of the stringed musical instrument by pivoting the block on the pivot.

According to some embodiments, a downward surface of the block is configured such that the vertical position of the block is adjustable relative to the body of the stringed musical instrument by pushing against the downward surface of the block with a height screw of the stringed musical instrument.

A vertical position of at least one fretting crown may be adjustable relative to the proto string of the stringed musical instrument by adjusting the vertical position of at least one longitudinal end of the block. In some embodiments, a vertical position of the saddling interface is adjustable relative to the body of the stringed musical instrument by adjusting the vertical position of at least one longitudinal end of the block. According to some embodiments, the block is disposed on the body of the stringed musical instrument with the fretting crown disposed longitudinally between the saddling interface and the neck.

Also included in the present disclosure is an assembly for a stringed musical instrument. In some embodiments, the assembly includes a block having a saddling interface and a first fretting crown spaced longitudinally forward from the saddling interface. The block may be adjustably positionable on a body of the stringed musical instrument such that the stringed musical instrument is configurable with a proto string of the stringed musical instrument extending i) from a proto string longitudinally rearward critical contact point on the saddling interface, ii) at a wrist fretable vertical distance above the first fretting crown, iii) above a neck of the stringed musical instrument connected to the body of the stringed musical instrument, iv) to a proto string longitudinally forward critical contact point on a nut of the stringed musical instrument disposed on the neck of the stringed musical instrument.

In some embodiments, the block includes a string guide indentation configured to position the proto string of the stringed musical instrument on the saddling interface.

According to some embodiments, the block includes a second fretting crown spaced longitudinally forward from the first fretting crown. The block may further include a third fretting crown spaced longitudinally forward from the second fretting crown. In some embodiments, the block further includes a fourth fretting crown spaced longitudinally forward from the third fretting crown.

According to some embodiments, a distance from the saddling interface to the second fretting crown is inclusively from 180% to 194.39% of a distance from the saddling interface to the first fretting crown. A distance from the saddling interface to the second fretting crown may be inclusively from 194.39% to 220% of a distance from the saddling interface to the first fretting crown. In some embodiments, a distance from the saddling interface to the second fretting crown is inclusively from 194.72% to 220% of a distance from the saddling interface to the first fretting crown. According to some embodiments, a distance from the saddling interface to the second fretting crown is inclusively from 195.04% to 220% of a distance from the saddling interface to the first fretting crown. A distance from the saddling interface to the second fretting crown may be inclusively from 195.37% to 220% of a distance from the saddling interface to the first fretting crown.

In some embodiments, a distance from the saddling interface to the second fretting crown is inclusively from 138% to 152% of a distance from the saddling interface to the first fretting crown. A distance from the saddling interface to the third fretting crown may be inclusively from 255% to 283.48% of the distance from the saddling interface to the first fretting crown. According to some embodiments, a distance from the saddling interface to the third fretting crown is inclusively from 283.48% to 325% of a distance from the saddling interface to the first fretting crown. A distance from the saddling interface to the third fretting crown may be inclusively from 284.12% to 325% of a distance from the saddling interface to the first fretting crown. In some embodiments, a distance from the saddling interface to a longitudinally forward extent the block is equal to or less than 525% of the distance from the saddling interface to the first fretting crown.

A lateral width of the block may be equal to or less than 50 millimeters (mm). In some embodiments, a lateral width of at least one fretting crown is equal to or less than 50 mm.

According to some embodiments, a vertical position of the block is adjustable relative to the body of the stringed musical instrument. A vertical position of a longitudinally forward end of the block may be adjustable relative to the body of the stringed musical instrument. A vertical position of a longitudinally rearward end of the block may be adjustable relative to the body of the stringed musical instrument.

According to some embodiments, the assembly includes a height screw configured to adjust a vertical position of a longitudinally forward end of the block relative to the body of the stringed musical instrument. The assembly may include a height screw configured to adjust a vertical position of a longitudinally rearward end of the block relative to the body of the stringed musical instrument.

In some embodiments, the assembly includes a first height screw and a second height screw. The first height screw may be configured to adjust a vertical position of a longitudinally forward end of the block relative to the body of the stringed musical instrument. The second height screw may be configured to adjust a vertical position of a longitudinally rearward end of the block relative to the body of the stringed musical instrument.

In some embodiments, the assembly includes a pivot configured to adjust a vertical position of the block.

According to some embodiments, a longitudinal position of the block is adjustable relative to the body of the stringed musical instrument.

The assembly may include a fastener configured to lock the longitudinal position of the block. In some embodiments, the assembly includes a fastener configured to lock the vertical position of the block. According to some embodiments, the assembly includes a fastener configured to lock the vertical position of the longitudinally forward end of block. The assembly may include a fastener configured to lock the vertical position of the longitudinally rearward end of block. In some embodiments, the assembly includes a fastener configured to couple the block to the body of the stringed musical instrument.

According to some embodiments, a vertical position of at least one fretting crown is adjustable relative to the proto string of the stringed musical instrument by adjusting the vertical position of at least one longitudinal end of the block. A vertical position of the saddling interface may be adjustable relative to the body of the stringed musical instrument by adjusting the vertical position of at least one longitudinal end of the block. In some embodiments, the block is disposed on the body of the stringed musical instrument with the fretting crown disposed longitudinally between the saddling interface and the neck.

Also included in the present disclosure is an assembly for a stringed musical instrument. The assembly may include a support. The assembly may include a block having a saddling interface and a first fretting crown spaced longitudinally forward from the saddling interface.

The support may be coupleable to a body of the stringed musical instrument. The block may be adjustably positionable on the support such that the stringed musical instrument is configurable with a proto string of the stringed musical instrument extending i) from a proto string longitudinally rearward critical contact point on the saddling interface, ii) at a wrist fretable vertical distance above the first fretting crown, iii) above a neck of the stringed musical instrument connected to the body of the stringed musical instrument, iv) to a proto string longitudinally forward critical contact point on a nut of the stringed musical instrument disposed on the neck of the stringed musical instrument.

According to some embodiments, the support is configured to couple the block to a soundboard of the body of the stringed musical instrument.

The support may include a stringing opening longitudinally rearward of the saddling interface. In some embodiments, the stringing opening is configured to receive the proto string of the stringed musical instrument therethrough.

According to some embodiments, the assembly further includes a vibrato mechanism configured to alter a pitch of the proto string.

The assembly may further include a tuning machine. In some embodiments, the tuning machine is positioned on the body of the stringed musical instrument, and configured to tension the proto string of the stringed musical instrument.

According to some embodiments, the block includes a string guide indentation configured to position the proto string of the stringed musical instrument on the saddling interface.

The block may include a second fretting crown spaced longitudinally forward from the first fretting crown. In some embodiments, the block further includes a third fretting crown spaced longitudinally forward from the second fretting crown. According to some embodiments, the block further includes a fourth fretting crown spaced longitudinally forward from the third fretting crown.

A distance from the saddling interface to a longitudinally forward extent of the block may be equal to or less than 370% of a distance from the saddling interface to the first fretting crown. In some embodiments, the distance from the saddling interface to a longitudinally forward extent of the block is equal to or less than 450% of a distance from the saddling interface to the first fretting crown. According to some embodiments, a distance from the saddling interface to a longitudinally forward extent of the block is equal to or less than 525% of a distance from the saddling interface to the first fretting crown.

A lateral width of the block may be equal to or less than 50 millimeters (mm). In some embodiments, a lateral width of the block is equal to or less than 40 mm. According to some embodiments, a lateral width of the block is equal to or less than 30 mm. A lateral width of at least one fretting crown may be equal to or less than 50 mm. In some embodiments, a lateral width of at least one fretting crown is equal to or less than 40 mm. According to some embodiments, a lateral width of at least one fretting crown is equal to or less than 30 mm.

The assembly may include a saddle means positionable on the body of the stringed musical instrument. The saddle means may be configurable such that the stringed musical instrument is configurable with a deutero string of the stringed musical instrument i) contacting the saddle means at a deutero string longitudinally rearward critical contact point, laterally spaced from the proto string longitudinally rearward critical contact point, and ii) extending above the neck of the stringed musical instrument to a deutero string longitudinally forward critical contact point on the nut of the stringed musical instrument. The block may be adjustably positionable relative to this saddle means.

The saddle means may position the deutero string of the stringed musical instrument laterally consecutively to the proto string of the stringed musical instrument. A lateral string spacing is defined by a spacing between the proto string longitudinally rearward critical contact point and the deutero string longitudinally rearward critical contact point. In some embodiments, the block has a lateral width less than 500% of the lateral string spacing. In some embodiments, the block has a lateral width less than 300% of the lateral string spacing.

Each fretting crown may include two lateral ends. The support may be configured to couple the block to the body of the stringed musical instrument such that a first lateral end of at least one fretting crown is laterally between the proto string of the stringed musical instrument and the deutero string of the stringed musical instrument.

In some embodiments, the support is configured to couple the block to the body of the stringed musical instrument such that a first lateral side of the block is laterally between the proto string of the stringed musical instrument and the deutero string of the stringed musical instrument.

A longitudinal position of the block is adjustable relative to the support.

The assembly may include a positioning screw configured to connect the block to the support. In some embodiments, turning the positioning screw in a first direction adjusts a longitudinal position of the block by moving the block longitudinally rearward.

The support may include a substantially longitudinal slot. A longitudinal position of the block may be adjustable by manipulating the block along the slot. In some embodiments, at least a portion of the block is configured to insert into the slot of the support.

The assembly may include an insert connected to the block. The slot of the support may be configured to receive the insert. The longitudinal position of the block may be adjustable by manipulating the block along the slot with the insert inserted into the slot.

The assembly may include an insert connected to the support. The block may include a slot configured to receive the insert. With the insert inserted into the slot, a longitudinal position of the block may be adjustable by manipulating the block, via the slot, along the insert.

According to some embodiments, a vertical position of the block is adjustable relative to the support. The assembly may include a height screw configured to adjust a vertical position of the block relative to the support.

In some embodiments, the assembly further includes a pivot. The block may include a first longitudinal end and a second longitudinal end opposite the first longitudinal end. A vertical position of the first longitudinal end, a vertical position of the second longitudinal end, or both, may be adjustable relative to the support by pivoting the block on the pivot.

In some embodiments, the assembly includes a height screw configured to adjust a vertical position of a longitudinally forward end of the block relative to the support. The assembly may include a height screw configured to adjust a vertical position of a longitudinally rearward end of the block relative to the support.

The assembly may include a first height screw and a second height screw. The block may include a longitudinally forward end and a longitudinal rearward end opposite the longitudinally forward end. The first height screw may be configured to adjust a vertical position of the longitudinally forward end of the block relative to the support. The second height screw may be configured to adjust a vertical position of the longitudinally rearward end of the block relative to the support.

In some embodiments, the assembly further includes a height screw. The block may include a first longitudinal end and a second longitudinal end opposite the first longitudinal end. The block may include a height adjustment hole configured to be disposed above the support. The height screw may be configured to insert into the height adjustment hole and to adjust a vertical position of the first longitudinal end of the block by pushing against the support.

According to some embodiments, the assembly includes a height screw. The block may include a first longitudinal end and a second longitudinal end opposite the first longitudinal end. The support may include a height adjustment hole configured to be disposed under the block. The height screw may be configured to insert into the height adjustment hole and to adjust a vertical position of the first longitudinal end of the block by pushing against the block.

The assembly may further include a shim configured to adjust a vertical position of the block relative to the body of the stringed musical instrument.

In some embodiments, at least one longitudinal end of the block is vertically adjustable by pivoting the block on at least one height screw.

In some embodiments, the support includes a substantially longitudinal slot configured to receive an insert. The insert may be a fastener. The block may include an opening configured to receive the fastener. The fastener may be configured to insert through the slot of the support into the opening in the block. A longitudinal position of the block may be adjusted by manipulating the block along the slot. The fastener may be configured to lock the longitudinal position of the block.

In some embodiments, the block includes a slot configured to receive an insert. The insert may be a fastener. The support may include an opening configured to receive the fastener. The fastener may be configured to insert through the slot of the block into the opening in the support. A longitudinal position of the block may be adjusted by manipulating the block, via the slot, along the fastener. The fastener may be further configured to lock the longitudinal position of the block.

In some embodiments, the assembly includes a fastener configured to lock the block to the support by locking a height screw, inserted into a height adjustment hole in a block, to the support. The height screw may be configured to adjust a vertical position of the block.

According to some embodiments, the assembly includes a fastener configured to lock the block to the support by locking a height screw, inserted into a height adjustment hole in the support, to the block. The height screw may be configured to adjust a vertical position of the block.

The assembly may further include a fastener configured to couple the block to the support.

In some embodiments, the assembly includes a fastener configured to lock the longitudinal position of the block. The assembly may include a fastener configured to lock the vertical position of the block. The assembly may include a fastener configured to lock the vertical position of the first longitudinal end of the block. The assembly may include a fastener configured to lock the vertical position of the longitudinally forward end of the block. The assembly may include a fastener configured to lock the vertical position of the longitudinally rearward end of the block.

A longitudinal position of the block may be adjustable relative to the support. In some embodiments, the assembly includes a first fastener configured to couple the block to the support and a second fastener configured to couple the block to the support. The first fastener may be longitudinally spaced from the second fastener.

The block may be a first block and the first fretting crown may be a first fretting crown of the first block. The assembly may include a second block. The second block may include a first fretting crown of the second block. The second block may be adjustably positionable on the body of the stringed musical instrument with the first fretting crown of the second block at a wrist fretable vertical distance under a deutero string of the stringed musical instrument. The stringed musical instrument may be configurable with the deutero string of the stringed musical instrument extending i) from the body of the stringed musical instrument, ii) above the neck of the stringed musical instrument, iii) to the nut of the stringed musical instrument. The deutero string of the stringed musical instrument may be laterally spaced from the proto string of the stringed musical instrument.

The block may be a first block, the first fretting crown may be a first fretting crown of the first block, and the saddling interface may be a first saddling interface. In some embodiments, the assembly includes a second block. The second block may include a second saddling interface and a first fretting crown of the second block spaced longitudinally forward of the second saddling interface. The second block may be adjustably positionable on the body of the stringed musical instrument such that the stringed musical instrument is further configurable with a deutero string of the stringed musical instrument extending i) from a deutero string longitudinally rearward critical contact point on the second saddling interface, ii) at a wrist fretable vertical distance above the second block fretting crown, iii) above the neck of the stringed musical instrument, iv) to a deutero string longitudinally forward critical contact point on the nut of the stringed musical instrument. The deutero string of the stringed musical instrument may be laterally spaced from the proto string of the stringed musical instrument.

A vertical position of at least one fretting crown may be adjustable relative to the proto string of the stringed musical instrument by adjusting the vertical position of at least one longitudinal end of the block. A vertical position of the saddling interface may be adjustable relative to the body of the stringed musical instrument by adjusting the vertical position of at least one longitudinal end of the block. The block may be disposed on the body of the stringed musical instrument with the fretting crown longitudinally between the saddling interface and the neck.

Also included in the present disclosure is a stringed musical instrument. In some embodiments, the stringed musical instrument includes a body. The stringed musical instrument may include a neck having a longitudinally rearward end connected to the body and a longitudinally forward end located away from the body. The stringed musical instrument may include a fingerboard connected to the neck. The stringed musical instrument may include a nut disposed on the longitudinally forward end of the neck. The stringed musical instrument may include a block having a saddling interface and a first fretting crown spaced longitudinally forward from the saddling interface. The block may be adjustably positionable on the body such that the stringed musical instrument is configurable with a proto string i) contacting the saddling interface at a proto string longitudinally rearward critical contact point, ii) extending above the first fretting crown and the fingerboard, and iii) contacting the nut at a proto string longitudinally forward critical contact point. The block may be positionable such that the first fretting crown is configured to define a wrist fretable note above an open note of the proto string.

According to some embodiments, the body is hollow. The body may include a soundboard. In some embodiments, the block is coupled to the soundboard. According to some embodiments, the block includes a string guide indentation configured to position the proto string on the saddling interface.

The stringed musical instrument may include a vibrato mechanism configured to alter a pitch of the proto string.

In some embodiments, the stringed musical instrument includes a sequence of fingerboard frets on the fingerboard. The sequence of fingerboard frets may include a first fingerboard fret. A distance from the saddling interface to the first fretting crown may be inclusively from 100% to 120% of a distance from the nut to the first fingerboard fret.

In some embodiments, the stringed musical instrument includes a sequence of fingerboard frets on the fingerboard. The sequence of fingerboard frets may include a first fingerboard fret. A distance from the saddling interface to the first fretting crown may be inclusively from 80% to 100% of a distance from the nut to the first fingerboard fret.

In some embodiments, the stringed musical instrument includes a sequence of fingerboard frets on the fingerboard. The sequence of fingerboard frets may include a first fingerboard fret. A distance from the saddling interface to the first fretting crown may be inclusively from 80% to 99.5% of a distance from the nut to the first fingerboard fret.

In some embodiments, the stringed musical instrument includes a sequence of fingerboard frets on the fingerboard. The sequence of fingerboard frets may include a first fingerboard fret. A distance from the saddling interface to the first fretting crown may be inclusively from 80% to 99% of a distance from the nut to the first fingerboard fret.

In some embodiments, the stringed musical instrument includes a sequence of fingerboard frets on the fingerboard. The sequence of fingerboard frets may include a first fingerboard fret. A distance from the saddling interface to the first fretting crown may be inclusively from 80% to 98.5% of a distance from the nut to the first fingerboard fret.

In some embodiments, the stringed musical instrument includes a sequence of fingerboard frets on the fingerboard. The sequence of fingerboard frets may include a first fingerboard fret. A distance from the saddling interface to the first fretting crown may be inclusively from 80% to 120% of a distance from the nut to the second fingerboard fret.

In some embodiments, the stringed musical instrument includes a pickup coupled to the body between the first fretting crown and the neck.

According to some embodiments, the stringed musical instrument further includes a sequence of fingerboard frets on the fingerboard. The fingerboard may include a fret attachment surface which is curved and to which the sequence of fingerboard frets is attached. The first fretting crown may include a first fingerboard matching angle matching a first fingerboard angle of the fret attachment surface relative to the proto string.

According to some embodiments, the stringed musical instrument includes at least one tuning machine having a mass of 70 grams (g) or less on an averaged per string basis. The longitudinally forward end of the neck may include a headstock. In some embodiments, the at least one tuning machine is attached to the headstock. According to some embodiments, the at least one tuning machine is configured to tension the proto string.

The block may include a second fretting crown spaced longitudinally forward from the first fretting crown. In some embodiments, the block further includes a third fretting crown spaced longitudinally forward from the second fretting crown. According to some embodiments, the block further includes a fourth fretting crown spaced longitudinally forward from the third fretting crown.

A distance from the saddling interface to a longitudinally forward extent of the block may be equal to or less than 370% of the distance from the saddling interface to the first fretting crown. In some embodiments, a distance from the saddling interface to a longitudinally forward extent of the block is equal to or less than 450% of the distance from the saddling interface to the first fretting crown. In some embodiments, a distance from the saddling interface to a longitudinally forward extent of the block is equal to or less than 525% of the distance from the saddling interface to the first fretting crown.

A lateral width of the block may be equal to or less than 50 millimeters (mm). In some embodiments, a lateral width of the block is equal to or less than 40 mm. In some embodiments, a lateral width of the block is equal to or less than 30 mm.

A lateral width of at least one fretting crown may be equal to or less than 50 mm. In some embodiments, a lateral width of at least one fretting crown is equal to or less than 40 mm. In some embodiments, a lateral width of at least one fretting crown is equal to or less than 30 mm.

The stringed musical instrument may be configurable with a deutero string extending i) from the body, ii) above the fingerboard, iii) to the nut. The deutero string may be laterally spaced from the proto string. A first lateral side of the block may be laterally between the proto string and the deutero string.

The stringed musical instrument may be configurable with a deutero string extending from the body, above the fingerboard, to the nut. The deutero string may be laterally spaced from the proto string. Each fretting crown may include two lateral ends. A first lateral end of at least one fretting crown may be laterally between the proto string and the deutero string.

In some embodiments, the stringed musical instrument includes saddle means, positioned on the body, configured for a deutero string, a trito string, and a tetarto string. The stringed musical instrument may be configurable with the deutero string contacting the saddle means at a deutero string longitudinally rearward critical contact point, extending above the fingerboard, and contacting the nut at a deutero string longitudinally forward critical contact point. The stringed musical instrument may be configurable with the trito string contacting the saddle means at a trito string longitudinally rearward critical contact point, extending above the fingerboard, and contacting the nut at a trito string longitudinally forward critical contact point. The stringed musical instrument may be configurable with the tetarto string contacting the saddle means at a tetarto string longitudinally rearward critical contact point, extending above the fingerboard, and contacting the nut at a tetarto string longitudinally forward critical contact point. The deutero string may be laterally spaced from and consecutive to the proto string. The trito string may be laterally spaced from and consecutive to the deutero string. The tetarto string may be laterally spaced from and consecutive to the trito string.

A lateral string spacing may be defined by a spacing between the proto string longitudinally rearward critical contact point and the deutero string longitudinally rearward critical contact point. The block may have a lateral width less than 500% of the lateral string spacing.

A lateral string spacing may be defined by a spacing between the proto string longitudinally rearward critical contact point and the deutero string longitudinally rearward critical contact point. The block may have a lateral width less than 300% of the lateral string spacing.

A lateral string spacing may be defined by a spacing between the proto string longitudinally rearward critical contact point and the deutero string longitudinally rearward critical contact point. In some embodiments, the block has a lateral width less than 200% of the lateral string spacing.

According to some embodiments, a vertical position of a longitudinally forward end of the block is adjustable relative to the body. A vertical position of a longitudinally rearward end of the block may be adjustable relative to the body.

In some embodiments, the stringed musical instrument includes a height screw configured to adjust a vertical position of a longitudinally forward end of the block relative to the body. The stringed musical instrument may include a height screw configured to adjust a vertical position of a longitudinally rearward end of the block relative to the body.

The stringed musical instrument may include a first height screw and a second height screw. The first height screw may be configured to adjust a vertical position of a longitudinally forward end of the block relative to the body. The second height screw may be configured to adjust a vertical position of a longitudinally rearward end of the block relative to the body.

A stringed musical instrument may include a shim configured to adjust a vertical position of the block relative to the body.

In some embodiments, the stringed musical instrument includes a pivot. The block may include a longitudinally forward end and a longitudinally rearward end opposite the longitudinally forward end. A vertical position of the longitudinally forward end of the block, a vertical position of the longitudinally rearward end of the block, or both may be adjustable relative to the body by pivoting the block on the pivot.

In some embodiments, the block is pivotal on at least one height screw.

According to some embodiments, the stringed musical instrument includes a fastener configured to lock the vertical position of the longitudinally forward end of the block.

The stringed musical instrument may include a fastener configured to lock the vertical position of the longitudinally rearward end of the block.

In some embodiments, a longitudinal position of the block is adjustable relative to the body. The stringed musical instrument may include a fastener configured to lock the longitudinal position of the block.

The stringed musical instrument may include a first fastener and a second fastener. A longitudinal position of the block may be adjustable relative to the body. The first fastener may be configured to lock the longitudinal position of the block. The second fastener may be configured to lock the longitudinal position of the block. In some embodiments, the first fastener is longitudinally spaced from the second fastener.

According to some embodiments, the stringed musical instrument is configurable with a deutero string extending i) from the body, ii) above the fingerboard, iii) to the nut. The deutero string may be laterally spaced from the proto string. The block may be a first block and the first fretting crown is a first fretting crown of the first block. The stringed musical instrument may include a second block having a first fretting crown of the second block. The second block may be adjustably positionable i) on the body, ii) with the first fretting crown of the second block under the deutero string, and iii) such that the first fretting crown of the second block is configurable to define a wrist fretable note above an open note of the deutero string.

In some embodiments, the block is a first block, the saddling interface is a first saddling interface, and the first fretting crown is a first fretting crown of the first block. The stringed musical instrument may include a second block. The second block may include a second saddling interface and a first fretting crown of the second block spaced longitudinally forward of the second saddling interface. The second block may be adjustably positionable on the body such that the stringed musical instrument is configurable with a deutero string i) contacting the second saddling interface at a deutero string longitudinally rearward critical contact point, ii) extending above the first fretting crown of the second block and the fingerboard, and iii) contacting the nut at a deutero string longitudinally forward critical contact point. The deutero string may be laterally spaced from the proto string. The second block may be positionable such that the first fretting crown of the second block defines a wrist fretable note above an open note of the deutero string.

A longitudinal position of the first block may be adjustable relative to the second block and relative to the body. A vertical position of the first block may be adjustable relative to the second block and relative to the body.

The stringed musical instrument may include a height screw configured to adjust the vertical position of the first block. The stringed musical instrument may include a fastener configured to lock the longitudinal position of the first block. The stringed musical instrument may include a fastener configured to lock the vertical position of the first block.

A vertical position of at least one fretting crown may be adjustable relative to the proto string by adjusting the vertical position of at least one longitudinal end of the block. A vertical position of the saddling interface may be adjustable relative to the body by adjusting the vertical position of at least one longitudinal end of the block. The block may be disposed on the body with the fretting crown longitudinally between the saddling interface and the neck.

The stringed musical instrument may include a fastener configured to couple the block to the body. In some embodiments, with two blocks, the stringed musical instrument includes a fastener configured to couple the first block to the body. The stringed musical instrument may include a fastener configured to couple the second block to the body.

Also included in the present disclosure is a component for a stringed musical instrument. In some embodiments, the component includes a block having: a saddling interface; a fretting crown spaced longitudinally forward of the saddling interface; and a slot configured to receive an insert of the stringed musical instrument. The block may be adjustably positionable on a body of the stringed musical instrument such that a string of the stringed musical instrument extends i) from a longitudinally rearward critical contact point on the saddling interface, ii) at a wrist fretable vertical distance above the fretting crown, iii) above a neck of the stringed musical instrument connected to the body of the stringed musical instrument, iv) to a longitudinally forward critical contact point on a nut of the stringed musical instrument disposed on the neck of the stringed musical instrument. The insert of the stringed musical instrument may connect to the body of the stringed musical instrument. With the insert of the stringed musical instrument inserted into the slot, a longitudinal position of the block may be adjustable relative to the body of the stringed musical instrument by manipulating the block, via the slot, along the insert of the stringed musical instrument.

Also included in the present disclosure is an assembly for a stringed musical instrument. In some embodiments, the assembly includes a block having a saddling interface and a fretting crown spaced longitudinally forward of the saddling interface. The block may be adjustably positionable on a body of the stringed musical instrument such that a proto string of the stringed musical instrument extends i) from a proto string longitudinally rearward critical contact point on the saddling interface, ii) at a wrist fretable vertical distance above the fretting crown, iii) above a neck of the stringed musical instrument connected to the body of the stringed musical instrument, iv) to a proto string longitudinally forward critical contact point on a nut of the stringed musical instrument disposed on the neck of the stringed musical instrument.

The fretting crown may include a first lateral end and a second lateral end opposite the first lateral end. The block may be configured to couple to the body of the stringed musical instrument such that the first lateral end of the fretting crown is laterally between the proto string of the stringed musical instrument and a deutero string of the stringed musical instrument. The deutero string of the stringed musical instrument may extend i) from the body of the stringed musical instrument, ii) above the neck of the stringed musical instrument, iii) to the nut of the stringed musical instrument. The deutero string of the stringed musical instrument may be laterally spaced from the proto string of the stringed musical instrument.

In some embodiments, the block includes a first lateral side and a second lateral side opposite the first lateral side. The block may be configured to couple to the body of the stringed musical instrument such that the first lateral side of the block is laterally between the proto string of the stringed musical instrument and a deutero string of the stringed musical instrument. The deutero string of the stringed musical instrument may extend i) from the body of the stringed musical instrument, ii) above the neck of the stringed musical instrument, iii) to the nut of the stringed musical instrument. The deutero string of the stringed musical instrument may be laterally spaced from the proto string of the stringed musical instrument.

According to some embodiments, a longitudinal position of the block is adjustable relative to the body of the stringed musical instrument. A vertical position of the block may be adjustable relative to the body of the stringed musical instrument.

In some embodiments, the block includes a string guide indentation configured to position the proto string of the stringed musical instrument on the saddling interface.

In some embodiments, the block is configured to pivotally mount on the body of the stringed musical instrument. The block may further include a longitudinally forward end and a longitudinally rearward end opposite the longitudinally forward end. The block may pivot to adjust i) a vertical position of the longitudinally rearward end of the block, ii) a vertical position of the longitudinally forward end of the block, or iii) both relative to the body of the stringed musical instrument.

According to some embodiments, the assembly further includes a height screw configured to adjust a vertical position of the block relative to the body of the stringed musical instrument. The block may include a height adjustment hole configured to receive a height screw configured to adjust a vertical position of the block relative to the body of the stringed musical instrument.

In some embodiments, the assembly includes a support coupleable to the body of the stringed musical instrument. The support may include a height adjustment hole configured to receive a height screw configured to adjust a vertical position of the block relative to the body of the stringed musical instrument.

The assembly may further include a fastener configured to couple the block to the body of the stringed musical instrument. The block may include an opening configured to receive a fastener configured to couple the block to the body of the stringed musical instrument.

According to some embodiments, the assembly includes a support coupleable to the body of the stringed musical instrument. The support may include an opening configured to receive a fastener configured to couple the block to the body of the stringed musical instrument.

In some embodiments, the assembly includes a support coupleable to the body of the stringed musical instrument. The support may include a substantially longitudinal slot. A longitudinal position of the block may be adjustable, relative to the body of the stringed musical instrument, by manipulating the block along the slot.

In some embodiments, the fretting crown is a first fretting crown. The block may include a second fretting crown spaced longitudinally forward of the first fretting crown.

The assembly may further include a support coupleable to the body of the stringed musical instrument. In some embodiments, the support is configured to couple the block to the body of the stringed musical instrument.

According to some embodiments, a lateral width of the fretting crown is equal to or less than 50 millimeters (mm). A distance from the saddling interface to a longitudinally forward extent of the block may be equal to or less than 525% of a distance from the saddling interface to the fretting crown.

In some embodiments, the assembly further includes a fastener configured to lock the longitudinal position of the block. In some embodiments, the assembly further includes a fastener configured to lock the vertical position of the block.

Also included in the present disclosure is a stringed musical instrument. In some embodiments, the stringed musical instrument includes a body. According to some embodiments, the stringed musical instrument includes a neck having a longitudinally rearward end connected to the body and a longitudinally forward end located away from the body. The stringed musical instrument may include a fingerboard connected to the neck. In some embodiments, the stringed musical instrument includes a nut disposed on the longitudinally forward end of the neck. According to some embodiments, the stringed musical instrument includes a block having a saddling interface and a fretting crown spaced longitudinally forward of the saddling interface. The block may be adjustably positionable on the body such that a proto string i) contacts the saddling interface at a proto string longitudinally rearward critical contact point, ii) extends above the fretting crown and the fingerboard, and iii) contacts the nut at a proto string longitudinally forward critical contact point. The block may be positionable such that the fretting crown defines a wrist fretable note above an open note of the proto string.

A vertical position of the block may be adjustable relative to the body. A longitudinal position of the block may be adjustable relative to the body.

The fretting crown may include a first lateral end and a second lateral end opposite the first lateral end. A deutero string may extend i) from the body, ii) above the fingerboard, iii) to the nut. The deutero string may be laterally spaced from the proto string. The first lateral end of the fretting crown may be laterally between the proto string and the deutero string.

In some embodiments, the block is a first block and the fretting crown is a fretting crown of the first block. The stringed musical instrument may include a second block having a fretting crown of the second block. The second block may be adjustably positionable on the body, with the fretting crown of the second block under a deutero string, and such that the fretting crown of the second block defines a wrist fretable note above an open note of the deutero string. The deutero string may extend i) from the body, ii) above the fingerboard, iii) to the nut. The deutero string may be laterally spaced from the proto string.

In some embodiments, the block includes a first lateral side and a second lateral side opposite the first lateral side. A deutero string may extend i) from the body, ii) above the fingerboard, iii) to the nut. The deutero string may be laterally spaced from the proto string. The first lateral side of the block may be laterally between the proto string and the deutero string.

According to some embodiments, the stringed musical instrument includes a height screw configured to adjust a vertical position of the block. The stringed musical instrument may include a sequence of fingerboard frets on the fingerboard. The sequence of fingerboard frets may include a sixth fingerboard fret. A distance from the saddling interface to a longitudinally forward extent of the block may be equal to or less than 105% of a distance from the nut to the sixth fingerboard fret.

The stringed musical instrument may include a fastener. In some embodiments, the fastener has a non locking configuration and a locking configuration. According to some embodiments, when the fastener is in the non locking configuration, a position of the block is adjustable relative to the body. When the fastener is in the locking configuration, the fastener may fix the position of the block.

The foregoing, and other features and advantages of the invention, will be apparent from the following, more particular description of the preferred embodiments of the invention, the accompanying drawings, and the claims.

BRIEF DESCRIPTION OF DRAWINGS

These and other features, aspects, and advantages are described below with reference to the drawings, which are intended to illustrate, but not to limit, the invention.

In FIG. 1, the pisiform bone wrist area of the picking is shown depressing a string.

As illustrated in FIG. 3, the broken line represents a fretting saddling member hidden by the picking hand.

As illustrated in FIG. 4, a string contacts a saddling interface and extends above a sequence of fretting crowns.

As illustrated in FIG. 5, the pisiform bone wrist area is used to depress a string against a fretting crown.

As illustrated in FIG. 6, the broken line represents a fretting saddling member hidden by the picking hand.

As illustrated in FIGS. 20 and 21, an instrument includes a forward member fastening slot and a rearward member fastening slot in a fretting saddling member.

FIG. 21 illustrates a partial cross-sectional view, along 21-21 in FIG. 20, of a body and an assembly.

FIGS. 24 and 25 illustrate a fretting crown form.

FIG. 25 illustrates a partial isometric view of a fretting saddling member

As illustrated in FIG. 26, an instrument includes fretting saddling members inserted into channels in a support, and includes saddles on the support.

As illustrated in FIGS. 27-31, a support includes channels for fretting saddling members.

FIG. 28 illustrates a partial isometric view of an assembly with strings on a body.

FIG. 29 illustrates a partial exploded view of an assembly.

FIG. 30 illustrates a partial cross-sectional view, along 30-30 in FIG. 28, of a body and an assembly.

FIG. 31 illustrates a partial isometric view of an assembly showing forward member ends of fretting saddling members in channels in a support.

As illustrated in FIGS. 33 and 34, a rearward member end of a fretting saddling member includes a pivot.

FIG. 34 illustrates a partial isometric view of a rearward member end of a fretting saddling member with a pivot.

As illustrated in FIGS. 35 and 36, a barrier of a support inserts into a channel in a fretting saddling member.

FIG. 36 illustrates a partial cross-sectional view, along 36-36 in FIG. 35, of an assembly on a body.

DETAILED DESCRIPTION OF THE INVENTION

Figure 1:
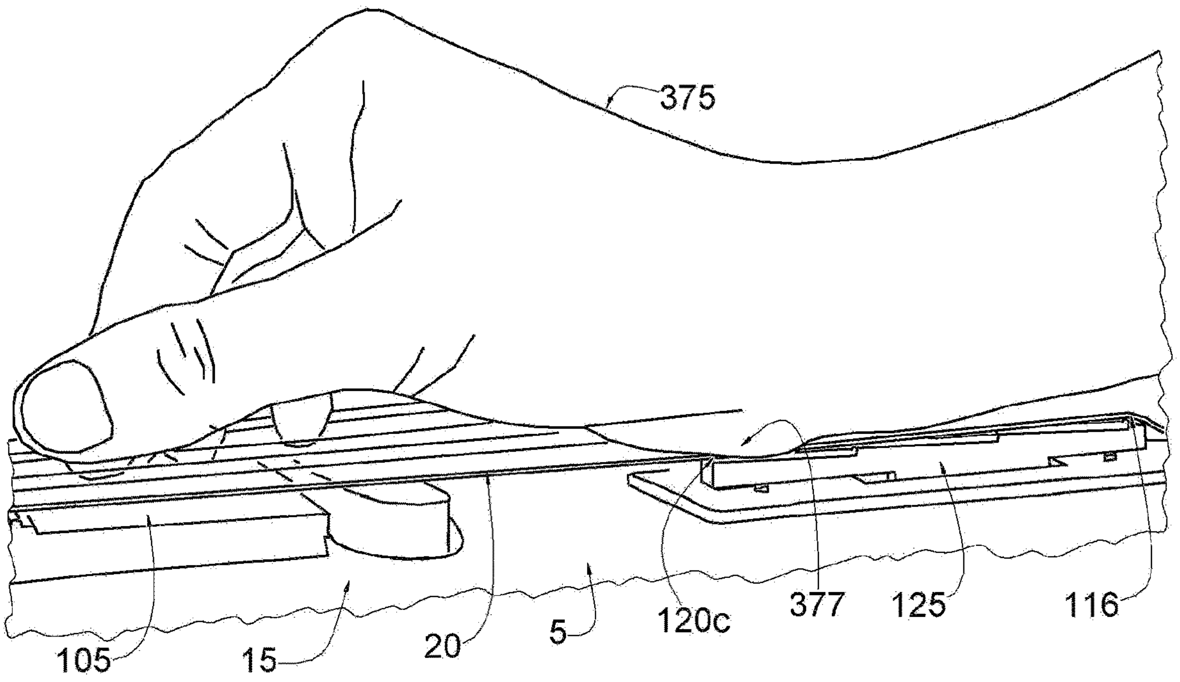
FIG. 1 illustrates a perspective view of an assembly including a fretting saddling member on a body and a picking hand.

As illustrated in FIG. 1, an instrument 5 with a fretting saddling member 125 (which includes a sequence of fretting crowns) on a body 15 under a string 20 is played by wrist fretting. Wrist fretting is a previously unknown method of stopping a string, in which the pisiform bone wrist area 377 of the picking hand 375 wrist may be used to depress the string. A player may shorten the sounding length of the string by wrist fretting. The pisiform bone wrist area may depress the string slightly longitudinally to the rear of a third fretting crown 120*c* of the sequence of fretting crowns of the fretting saddling member until the string contacts the third fretting crown. A shortened sounding length of the string between the third fretting crown and a nut may have a pitch above an open note of the string. The player may pluck the string between the third fretting crown and the nut with the picking hand thumb to produce a wrist fretted note, while the remaining fingers of the picking hand may pluck distal strings. The string may contact a saddling interface of the fretting saddling member at a rearward critical contact point 116. An accessibility surface 105 of the fingerboard may provide space for the thumb and fingers of the picking hand. Both "hand" and "wrist" may be used to indicate the location of the pisiform bone wrist area of the human body. The wrist may be understood to be part of the hand.

In some embodiments, some strings 20 on an instrument 5 are configured with fretting saddling members 125. Other strings are not configured for wrist fretting; these strings may be called "single direction fretting strings."

As illustrated in FIG. 1, a laterally outermost proximal string 20 is a wrist fretting string. Other strings may be single direction fretting strings.

Figure 2:
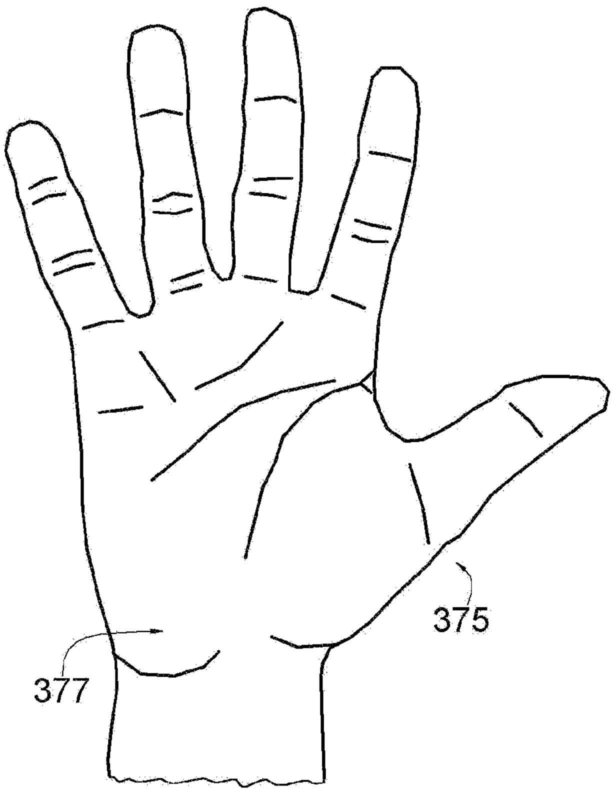
FIG. 2 illustrates an orthographic view of a picking hand of a right-handed player, showing the pisiform bone wrist area.

As illustrated in FIG. 2, the picking hand 375 includes the pisiform bone wrist area 377. The pisiform bone wrist area, of the wrist of the picking hand, including the flesh, bones, and skin surrounding the pisiform bone, may be usable for wrist fretting.

Figure 3:
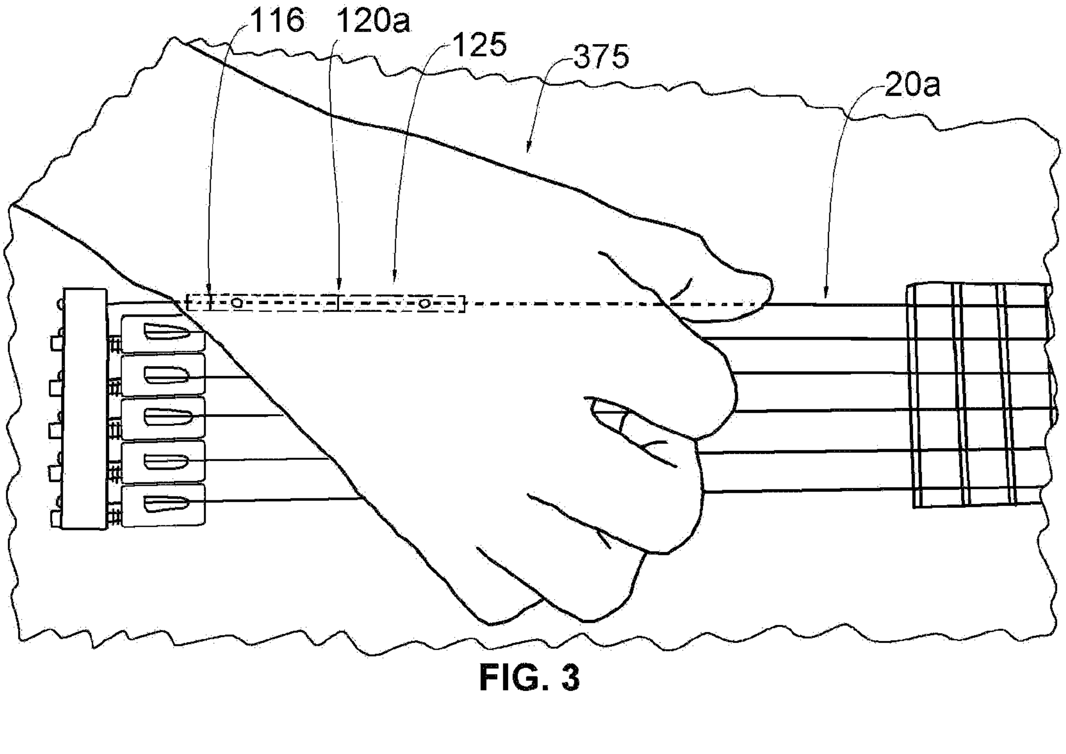
FIG. 3 illustrates an orthographic view of an instrument and a picking hand.

As illustrated in FIG. 3, a player is wrist fretting. The picking hand 375 may be positioned to enable the pisiform bone wrist area to depress a proto string 20*a*, which may be a laterally outermost proximal string, forward of a rearward critical contact point 116 of the proto string on a saddling interface and rearward of a first fretting crown 120*a* on a fretting saddling member 125. The picking hand may cover the fretting saddling member, which may be positioned in conjunction with the laterally outermost proximal string. The fretting saddling member, hidden by the hand, is indicated by a broken line. The thumb may pluck a wrist fretted note on the laterally outermost proximal string, while other fingers may pluck other strings. In a real-world situation, from this view, a viewer may not be able to see whether a wrist fretting action is taking place.

Figure 4:
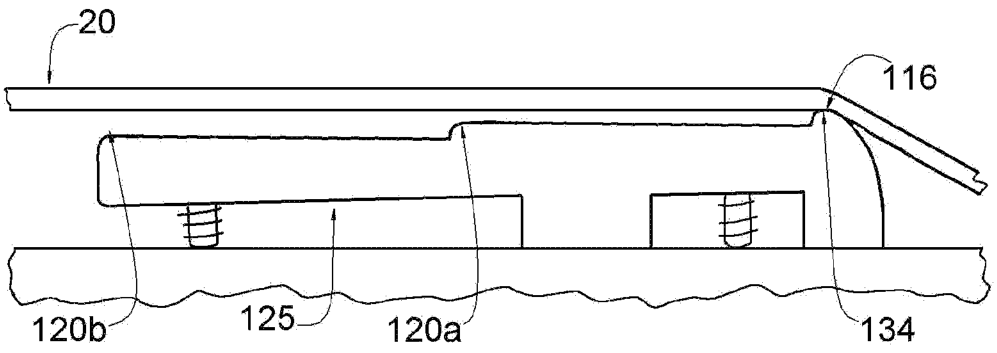
FIG. 4 illustrates a partial orthographic side view of a body, a fretting saddling member, and a string.

As illustrated in FIG. 4, a fretting saddling member 125 is under a string 20. The distance between a sequence of fretting crowns (including a first fretting crown 120*a* and a second fretting crown 120*b*) of the fretting saddling member and the string may allow fretted fingerboard notes and an open note of the string to be sounded by plucking or strumming. A fretting action on a fingerboard fret may bring the string nearer to the fretting crowns without bringing the string into contact with the fretting crowns. The string may contact a saddling interface 134 of the fretting saddling member at a rearward critical contact point 116.

Figure 5:
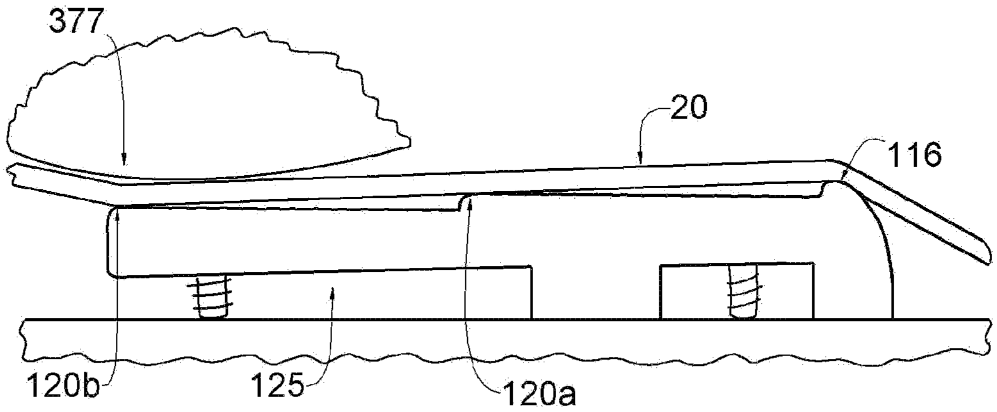
FIG. 5 illustrates a partial orthographic side view of a body, a fretting saddling member, a string, and a wrist.

As illustrated in FIG. 5, the pisiform bone wrist area 377 of the picking hand is bringing a string 20 into contact with a second fretting crown 120*b* of a sequence of fretting crowns of a fretting saddling member 125. The pisiform bone wrist area may depress the string, slightly rearward of the second fretting crown, until the string contacts the second fretting crown, shortening the sounding length of the string. The string may be depressed forward of a rearward critical contact point 116 of the string on a saddling interface and forward of a first fretting crown 120*a*. The wrist fretting action may bring the string nearer to a sequence of fingerboard frets without bringing the string into contact with a fingerboard fret.

Figure 6:
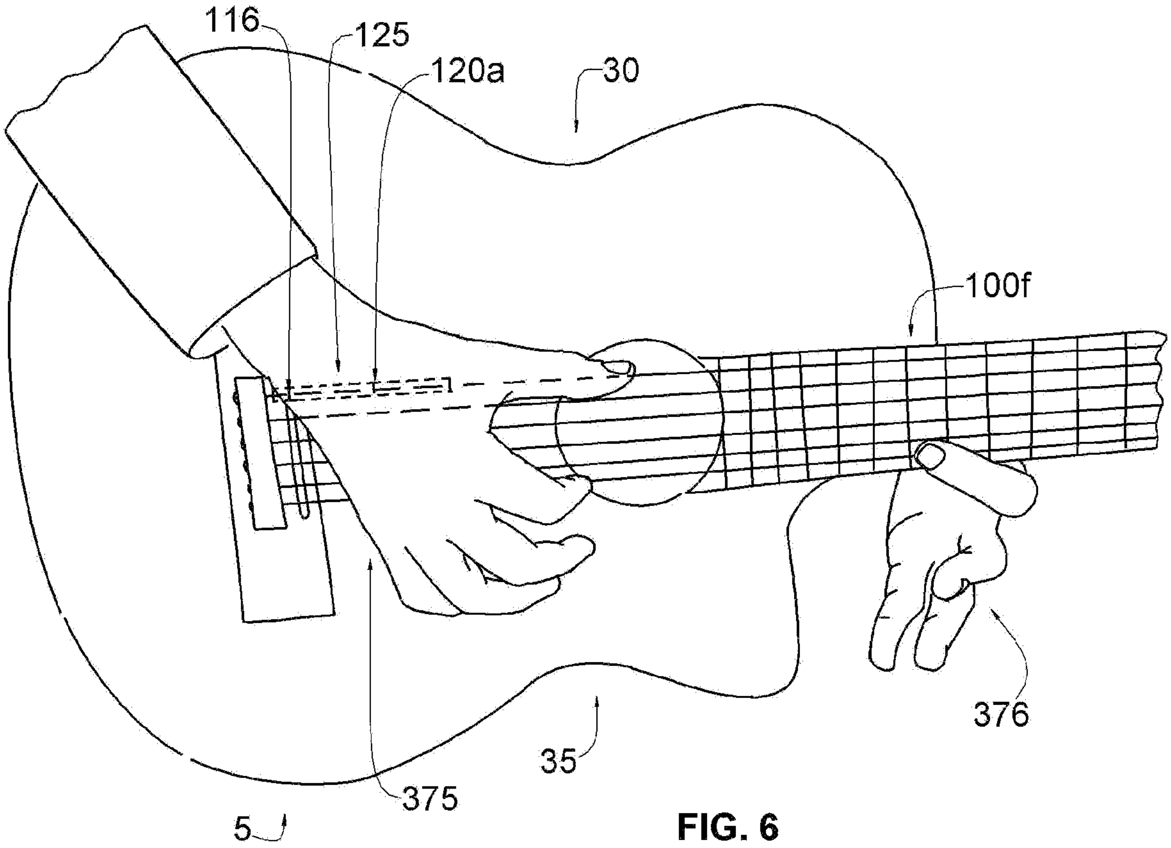
FIG. 6 illustrates an orthographic view of an instrument, a picking hand, and a fretting hand.

As illustrated in FIG. 6, a player is wrist fretting with the pisiform bone wrist area of the picking hand 375, using a first fretting crown 120*a* of a sequence of fretting crowns of a fretting saddling member 125 under a laterally outermost proximal string. The laterally outermost proximal string may contact a saddling interface of the fretting saddling member at a rearward critical contact point 116. The fretting saddling member, hidden by the picking hand, is indicated by a broken line. The player may use the index finger of the fretting hand 376 to fret a laterally outermost distal string at a thirteenth fingerboard fret 100*f*. If the instrument 5 were in standard guitar tuning, the picking hand thumb might be plucking F2 on the laterally outermost proximal string, and the picking hand index finger might be plucking F5 on the laterally outermost distal string. A proximal body side 30 may be nearer to the player's chest, and a distal body side 35 may be nearer to the player's legs.

Figure 7:
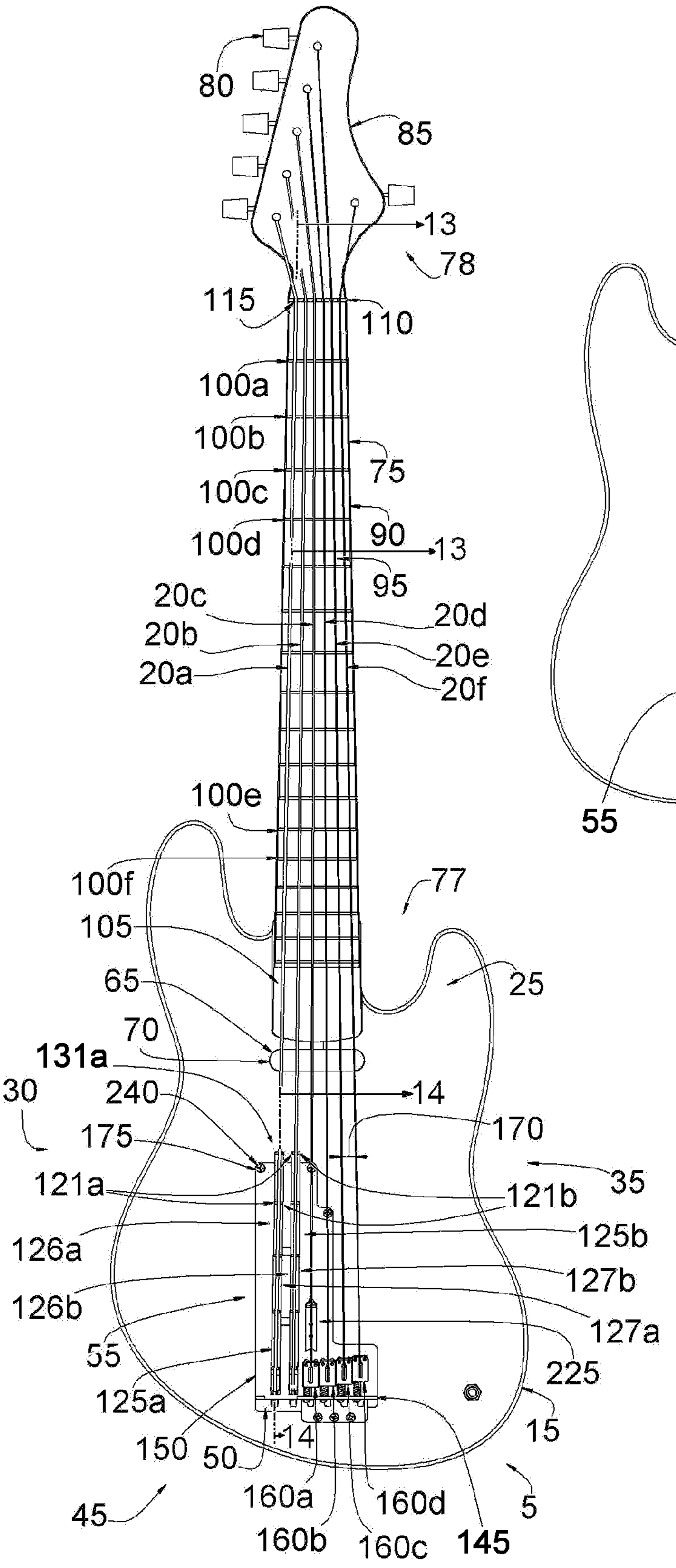
FIG. 7 illustrates an orthographic view of an instrument and an assembly. As illustrated in combination by FIGS. 7-18, an instrument includes a body, a neck, and an assembly including a support, fretting saddling members, and a fretting appendage.
Figure 8:
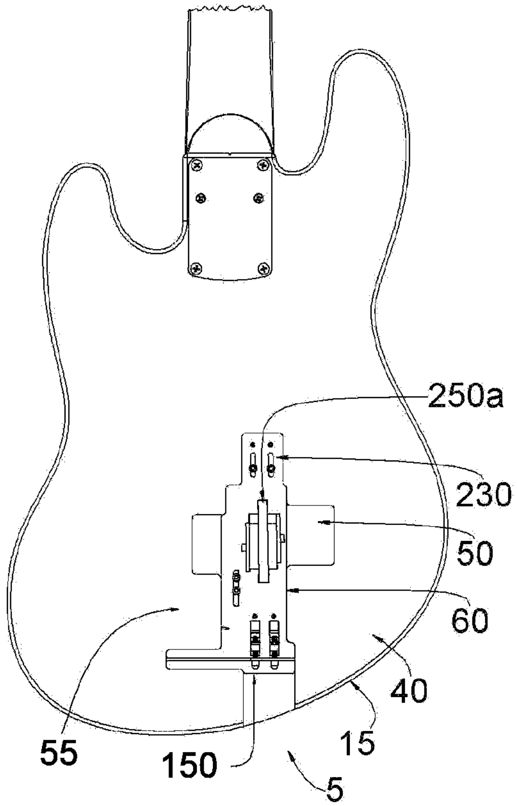
FIG. 8 illustrates an orthographic view of an instrument from the back.
Figure 14:
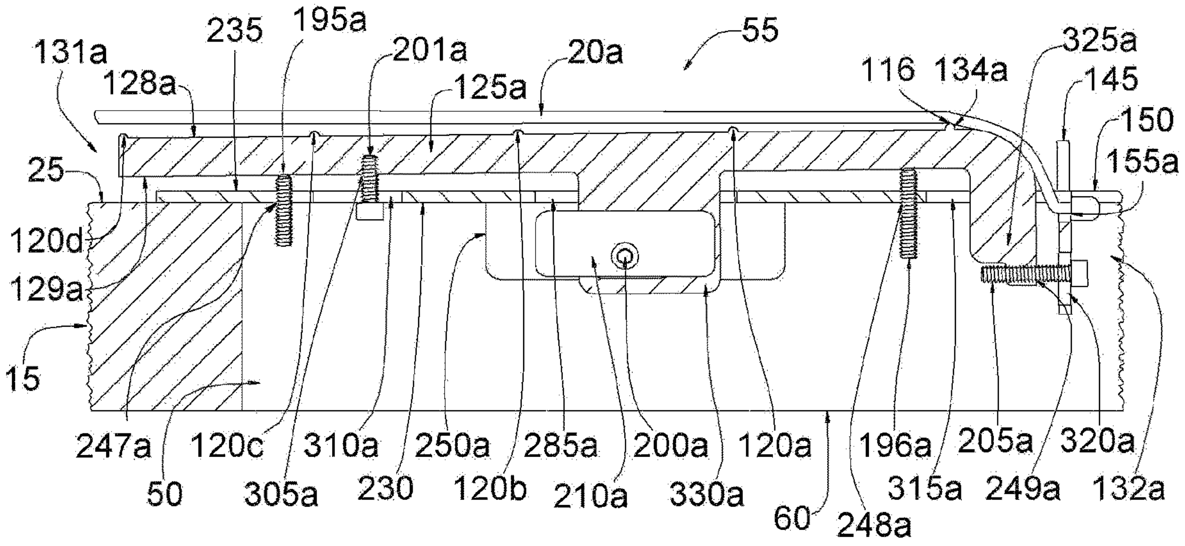
FIG. 14 illustrates a partial cross-sectional view of a body and an assembly, along 14-14 in FIG. 7.
Figure 15:
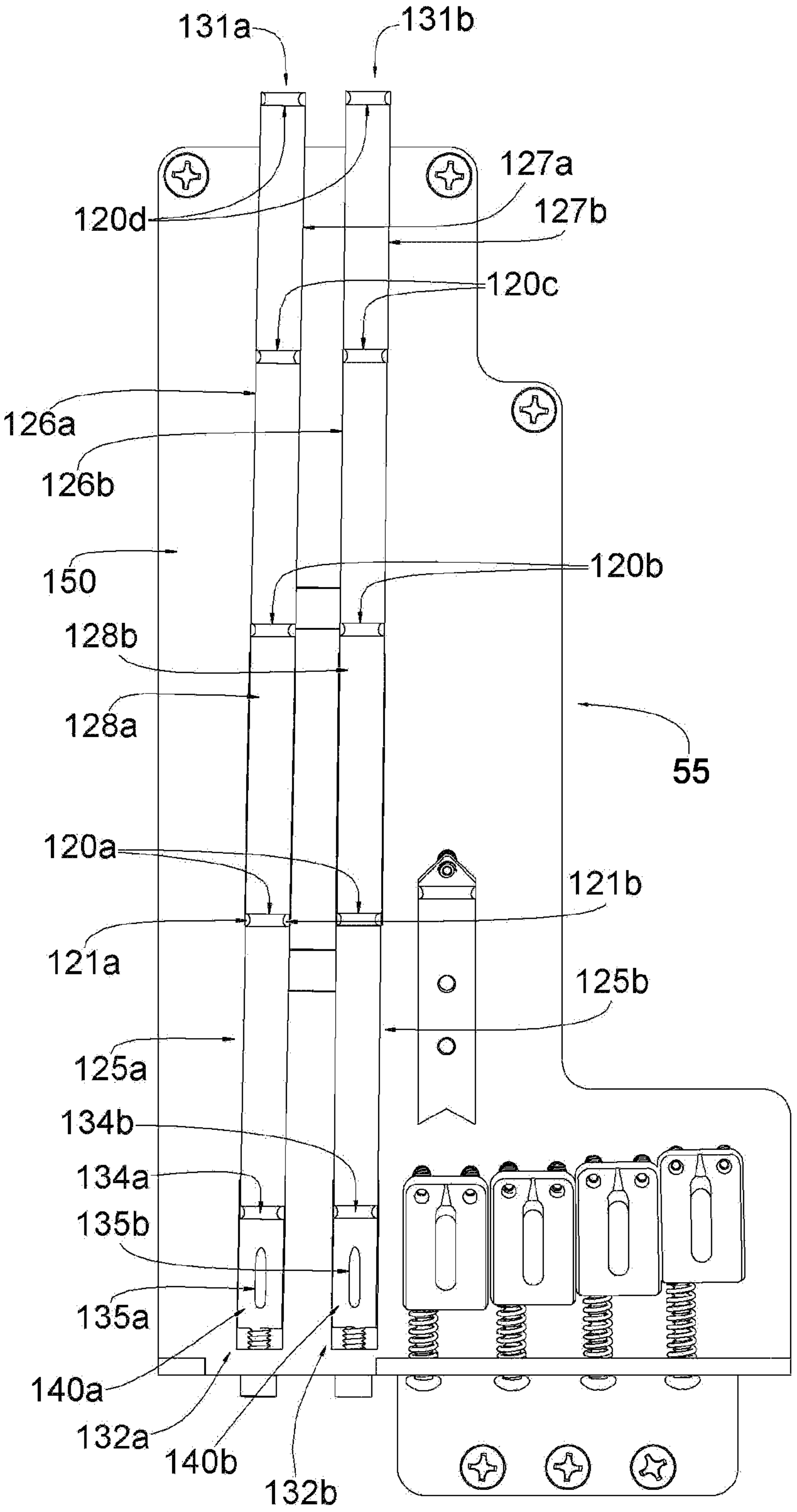
FIG. 15 illustrates a partial orthographic top view of an assembly.
Figure 17:
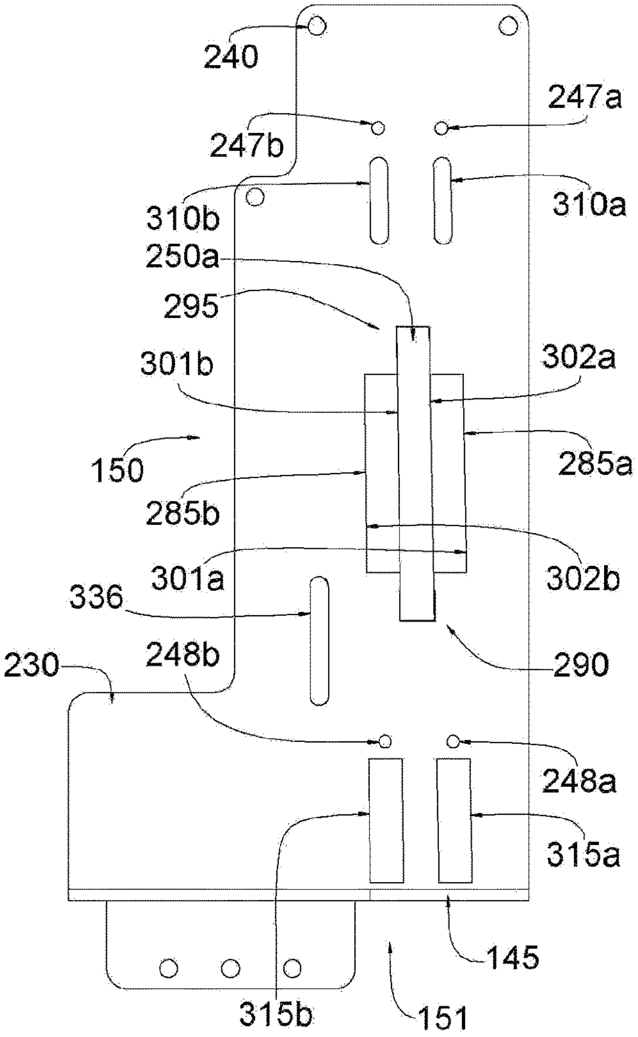
FIG. 17 illustrates an orthographic bottom view of a support.
Figure 16:
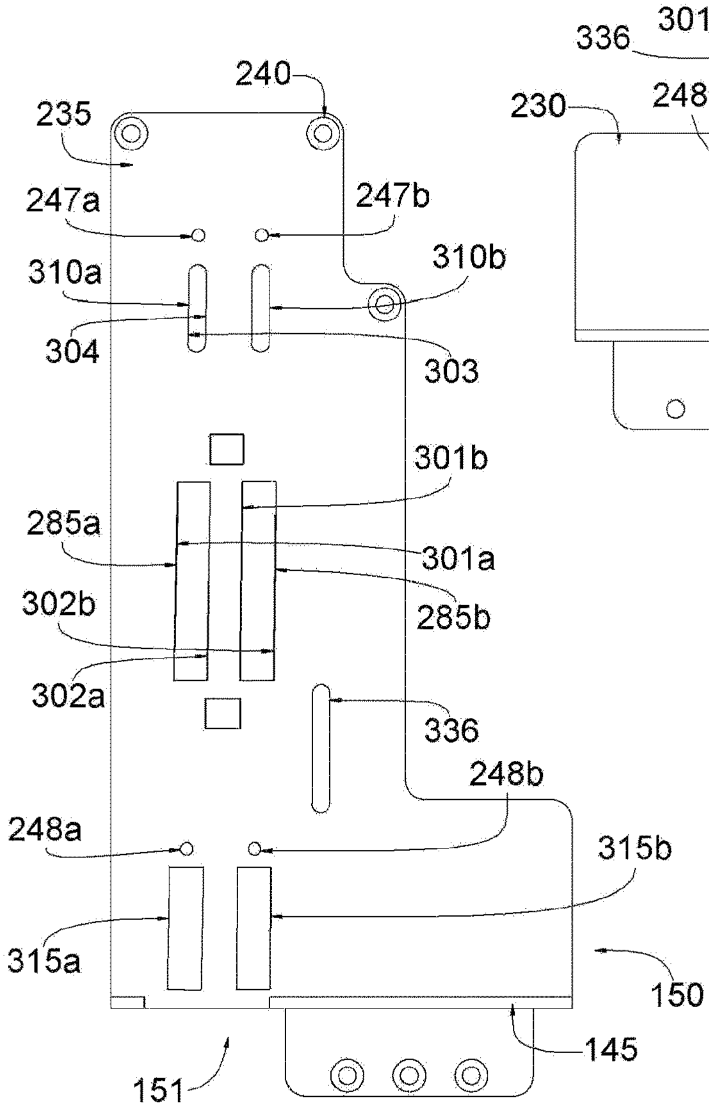
FIG. 16 illustrates an orthographic top view of a support.

In combination, FIGS. 7, 8, and 14 illustrate the following: An instrument 5 may have a form of a guitar family type. The instrument may further be of a six string bass guitar type. The instrument may include a body 15. The body may include a top 25, a proximal body side 30, a distal body side 35, a back 40, and a rearward bout 45. A body cavity 50 may extend from the top to the back and into the rearward bout, and may allow a part of an assembly 55 to insert. An aperture 60 of the body cavity at the back and at the rearward bout may allow access to fastener and height screw heads and drives, and may include space necessary for tool insertion and sixty degree tool rotation during adjustment. A pickup 65 may be installed in a pickup opening 70 of the body and under a plurality of strings. The pickup opening may be continuous with or separate from the body cavity.

As illustrated in FIG. 7, a proto string 20*a*, which is a laterally outermost proximal string, a deutero string 20*b*, and a trito string 20*c* are wrist fretting strings. A tetarto string 20*d*, a pempto string 20*e*, and a hecto string 20*f* may be single direction fretting strings.

As illustrated in FIG. 7, a rearward end 77 of a neck 75 is connected to a body 15. The neck may extend longitudinally away from the body. A forward end 78 of the neck may be away from (remote from) the body. Tuning machines 80 may be coupled to a headstock 85 of the forward end of the neck. A fingerboard 90 may be connected to the neck. The fingerboard on the neck may include a fret attachment surface 95 to which a sequence of fingerboard frets may be coupled. An accessibility surface 105 of the fingerboard at the rearward end of the neck may be at a lower vertical level than the fret attachment surface. On the fingerboard, a first fingerboard fret 100*a* may run perpendicular to a centerline of the neck, under a plurality of strings. The first fingerboard fret may extend laterally across the fingerboard, and may be longitudinally spaced from a second fingerboard fret 100*b*, which may be consecutive to the first fingerboard fret. The fingerboard may be included by the neck.

Figure 13:
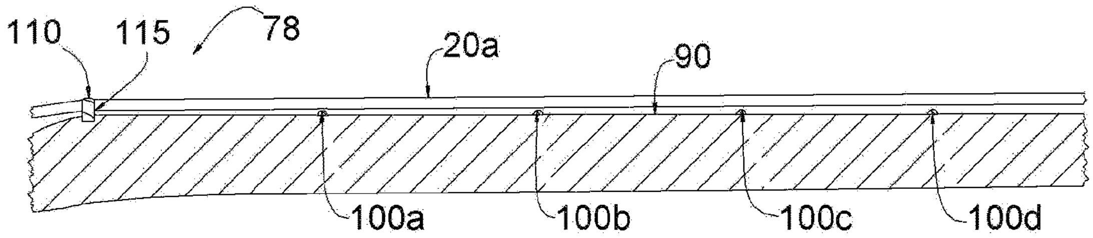
FIG. 13 illustrates a partial cross-sectional view of a longitudinally forward end of a neck, along 13-13 in FIG. 7.

As illustrated in FIG. 7 and FIG. 13, a sequence of fingerboard frets on a fingerboard 90 includes a first fingerboard fret 100*a*, a second fingerboard fret 100*b*, a third fingerboard fret 100*c*, a fourth fingerboard fret 100*d*. The sequence of fingerboard frets may include fifth fingerboard fret, a sixth fingerboard fret, a seventh fingerboard fret, an eighth fingerboard fret, a ninth fingerboard fret, a tenth fingerboard fret, an eleventh fingerboard fret, a twelfth fingerboard fret 100*e*, a thirteenth fingerboard fret 100*f*, a fourteenth fingerboard fret, a fifteenth fingerboard fret, a sixteenth fingerboard fret, and a seventeenth fingerboard fret, which may define fretted fingerboard notes a semitone, a whole step, a minor third, a major third, a perfect fourth, a tritone, a perfect fifth, a minor sixth, a major sixth, a minor seventh, a major seventh, an octave, an octave and a semitone, an octave and a whole step, an octave and a minor third, an octave and a major third, and an octave and a perfect fourth above an open note of a string 20. Of the sequence of fingerboard frets, the first fingerboard fret may be longitudinally foremost. The exact number of fingerboard frets may vary in an alternative embodiment, which may include more or fewer.

As illustrated in FIGS. 7 and 13, a first fingerboard fret 100*a* is positioned at a nominal semitone oddment length from a nut 110. Nominal oddment lengths are described in further detail below with respect to a neck scale length. A second fingerboard fret 100*b* may be positioned at a nominal whole step oddment length from the nut. A third fingerboard fret 100*c* may be positioned at a nominal minor third oddment length from the nut. A fourth fingerboard fret 100*d* may be positioned at a nominal whole step oddment length from the nut.

Figure 9:
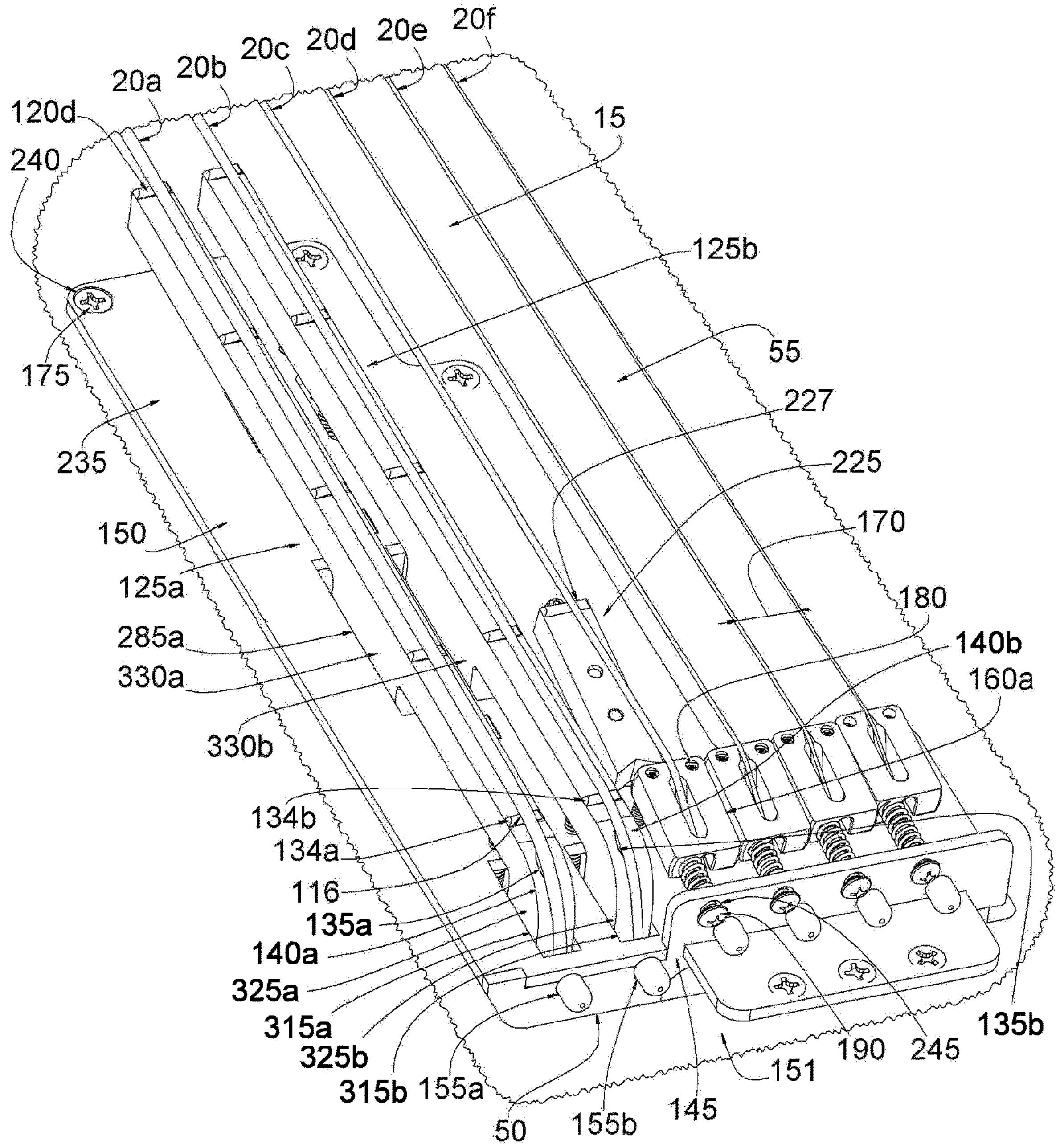
FIG. 9 illustrates a partial isometric view of an assembly on a body.
Figure 10:
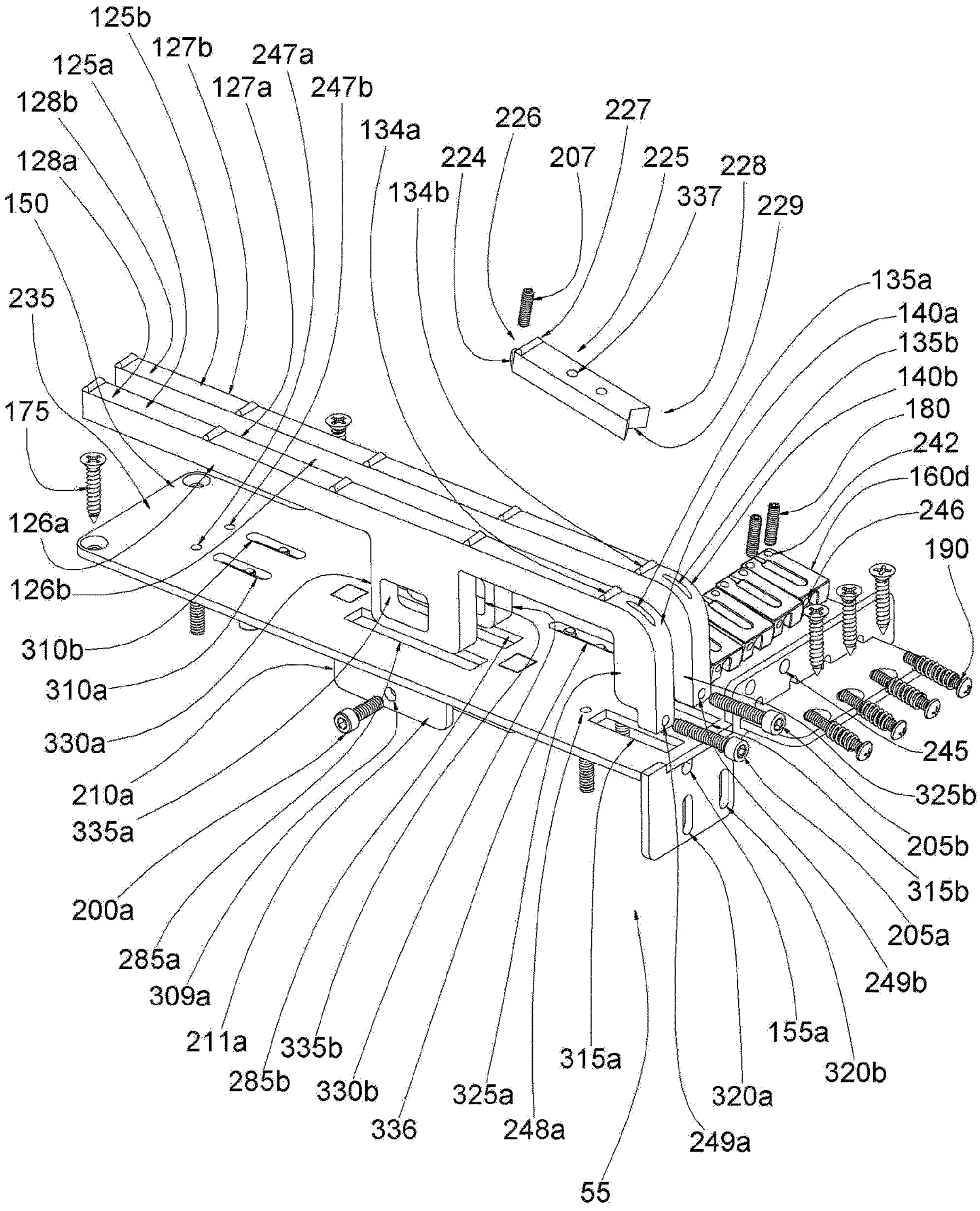
FIG. 10 illustrates a partial exploded view of an assembly.
Figure 11:
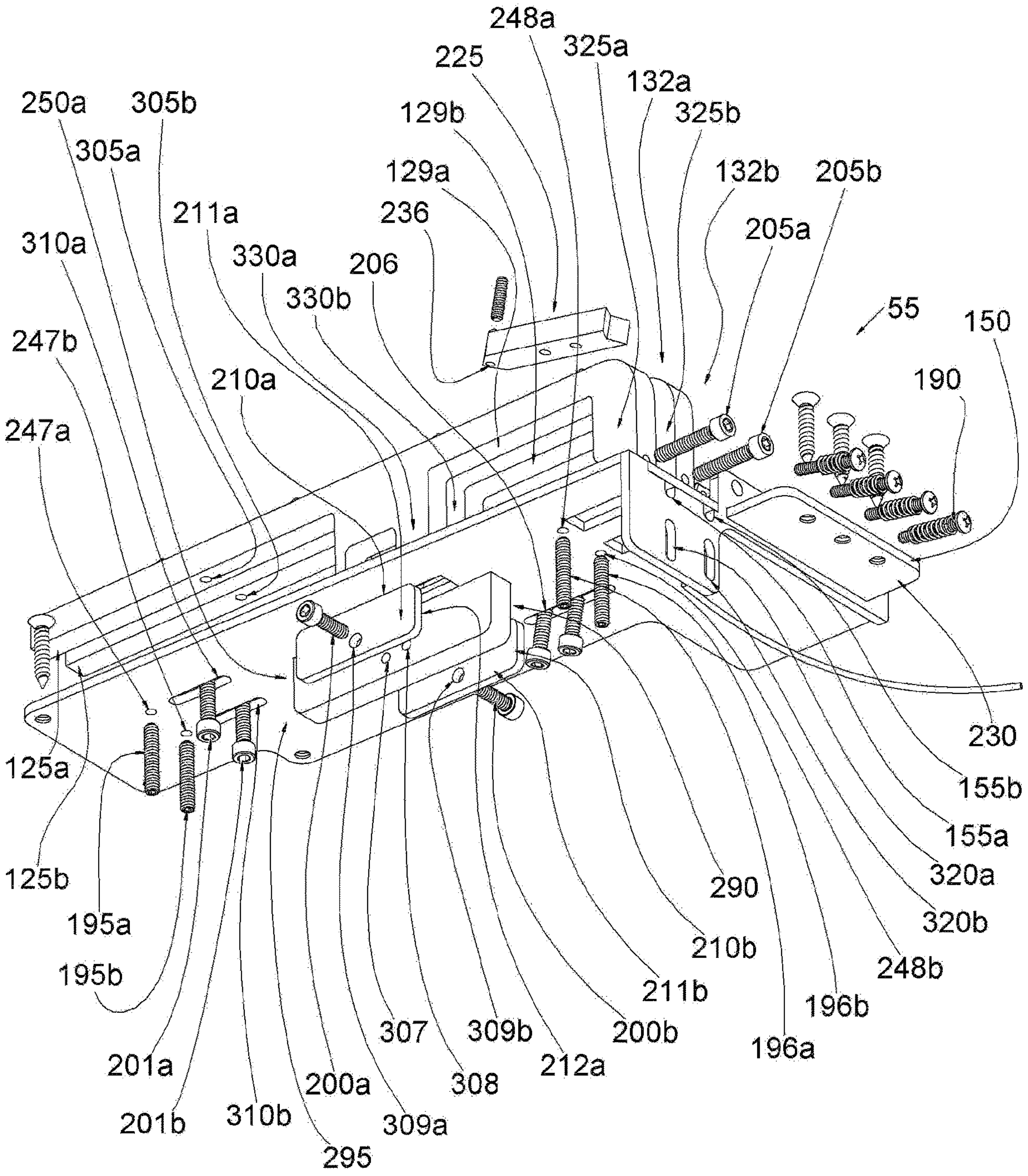
FIG. 11 illustrates a partial exploded view of an assembly.

In combination, FIG. 7 and FIG. 9 illustrate the following: A nut 110 may be coupled to the forward end 78 of a neck 75. A plurality of laterally spaced strings may attach at the forward end of the neck to tuning machines 80, which may tension the strings. The strings may contact the nut, extend substantially longitudinally above a fingerboard 90 and fingerboard frets 100, contact an assembly 55 on a body 15, and attach at the body. The strings may consecutively include a proto string 20*a*, a deutero string 20*b*, a trito string 20*c*, a tetarto string 20*d*, a pempto string 20*e*, and a hecto string 20*f*. The proto string may be a laterally outermost proximal string. The hecto string may be a laterally outermost distal string. The strings may be closer together at the nut than at the assembly on the body. Two consecutive strings may be, relative to one another, a laterally proximal string and a laterally distal string.

In combination FIGS. 7, 9, 13, and 14 illustrate the following: a proto string 20*a* may contact a nut 110 at a forward critical contact point 115 where the proto string is coupled by the nut to the forward end of a neck 78. The proto string may extend above a fingerboard 90, fingerboard frets 100, an accessibility surface 105, a body 15, a pickup 65, and a first sequence of fretting crowns of a first fretting saddling member 125*a*. The proto string may contact a first saddling interface 134*a* of the first fretting saddling member at a rearward critical contact point 116, where the proto string may be coupled to the body by the first fretting saddling member. The proto string may contact a first string guide indentation 135*a* of a first clearance surface 140*a* of the first fretting saddling member, and may insert through a rear wall 145 of a support 150 at a first stringing opening 155*a*.

A ball end of a proto string 20*a* may be seated behind a rear wall 145. The proto string may insert through a first stringing opening 155*a*, may contact and be guided by a first string guide indentation 135*a*, and may be in contact with a first saddling interface 134*a* at a rearward critical contact point 116. The proto string may be directed by the first saddling interface at a wrist fretable vertical distance above a first sequence of fretting crowns. The proto string may extend above a body 15, a pickup 65, an accessibility surface 105, and the sequence of fingerboard frets, to a nut 110.

In combination FIG. 7 and FIG. 9 illustrate the following: A deutero string 20*b* may contact a nut 110 at a forward critical contact point where the deutero string is coupled by the nut to a forward end 78 of the neck 75. The deutero string may extend above a fingerboard 90, fingerboard frets, an accessibility surface 105, a body 15, a pickup 65, and a second sequence of fretting crowns of a second fretting saddling member 125*b*. The deutero string may contact a second saddling interface 134*b* of the second fretting saddling member at a rearward critical contact point, where the deutero string may be coupled to the body by the second fretting saddling member. The deutero string may contact a second string guide indentation 135*b* of a second clearance surface 140*b* of the second fretting saddling member, and may insert through a rear wall 145 of a support 150 at a second stringing opening 155*b*.

A ball end of a deutero string 20*b* may seat behind a rear wall 145. The deutero string may insert through a second stringing opening 155*b*, may contact and be guided by a second string guide indentation 135*b*, and may be in contact with a second saddling interface 134*b* at a rearward critical contact point. The deutero string may be directed by the second saddling interface at a wrist fretable vertical distance above a second sequence of fretting crowns. The deutero string may extend above a body 15, a pickup 65, an accessibility surface 105, and the sequence of fingerboard frets, to a nut 110.

In combination, FIGS. 7 and 9-12 illustrate the following: A trito string 20*c*, a tetarto string 20*d*, a pempto string 20*e*, and a hecto string 20*f*, may contact a nut 110 at respective forward critical contact points where those strings are coupled by the nut to a forward end 78 of the neck 75. The trito, the tetarto, the pempto, and the hecto strings may extend above: a fingerboard 90, fingerboard frets, an accessibility surface 105, a body 15, and a pickup 65. The trito, the tetarto, the pempto, and the hecto strings may contact a trito string saddle 160*a*, a tetarto string saddle 160*b*, a pempto string saddle 160*c*, and a hecto string saddle 160*d* at respective rearward critical contact points, where those strings may be coupled to the body by their respective saddles. The trito, the tetarto, the pempto, and the hecto strings may insert through a rear wall 145 of a support 150 at a third, a fourth, a fifth, and a sixth stringing opening. Ball ends of the trito, the tetarto, the pempto, and the hecto strings may seat behind the rear wall.

As illustrated in FIGS. 7, 9, 13, and 14, an instrument includes strings 20. There may be a small vertical distance between the strings and a sequence of fingerboard frets. A forward critical contact point 115 of a string on a nut 110 and a rearward critical contact point 116 of that string may establish the sounding length of the open note of that string. Two consecutive strings at their rearward critical contact points may be spaced, center to center, at a lateral string spacing 170. For purposes of clarity, the lateral string spacing may be indicated slightly forward from the specified measuring location.

A fretting crown 120, which defines a wrist fretable note, may be usable to establish a sounding length of a string 20 by stopping the string, and that sounding length of the string may be used to play the defined note. A fretting crown, which defines a wrist fretable note, may be at a wrist fretable vertical distance under a string; the string may be at a wrist fretable vertical distance above the fretting crown. To define a wrist fretable note, a fretting saddling member may be adjusted such that a fretting crown is in a position in which it is vertically high enough to be used for wrist fretting with a string and vertically low enough that the string may be used to play an open note.

A fingerboard fret 100, which defines a fretted fingerboard note, may be usable to establish a sounding length of a string 20 by stopping the string, and that sounding length of the string may be used to play the defined note. A string that may be fretted may be said to be at a “fretable” vertical distance above a playable fingerboard fret.

In combination, FIGS. 7-12 and 14-15 illustrate the following: An instrument 5 may include an assembly 55. Features included by the assembly may be positioned on and coupled to a body 15. The assembly may include features involved in saddling function, support function, wrist fretting function, locking function, positional adjustment function, pickup function, string retaining function, and other functions. The assembly may include a support 150, a support screw 175, a saddle 160, an action screw 180, a saddle spring, an intonation screw 190, a fretting saddling member 125, a height screw, a fastener, a positioning screw 205, a pickup 65, a ground wire, a fretting appendage 225, and other features. A part of an assembly, such as a support, a fretting saddling member, or a fastener, may insert into a body cavity 50.

In combination, FIGS. 7-12 and 14-17 illustrate the following: A support 150 may be positioned on and coupled to a body 15. The support may include a planar lower support surface 230 contacting a top 25 of the body, and a planar upper support surface 235. Support screws 175 may insert downward into support screw holes 240 in the support and may couple the support to the body. A rear wall 145 may run laterally across the lower support surface and the upper support surface at a rearward support end 151. A proximal region of the rear wall, which may be rearward of fretting saddling members 125, may extend downward, vertically lower than the top and the lower support surface, into a body cavity 50. A distal region of the rear wall and the proximal region of the rear wall may be distal and proximal to one another, but not necessarily to a centerline of the neck. A distal region of the rear wall, which may be rearward of saddles 160, may extend upward, vertically higher than the top of the body and the upper support surface. The rearward support end may extend rearward of the distal region, providing space for support screws and support screw holes to couple the support to the body. In the distal region there may be four laterally spaced intonation openings 245 above and slightly proximal to four respective laterally spaced stringing openings. The support and a pickup 65 may be grounded by a ground wire. The rear wall, with its stringing openings, may act as a string retainer for ball ends of strings. The support may include steel sheet metal, or another appropriate material, for the portion forming the upper and lower support surfaces, as well as for the rear wall. A proto-deutero barrier 250*a* of the support may be machined steel or another appropriate material; the support may be welded or otherwise assembled from multiple pieces.

Additional or alternative embodiments may use alternative materials for a support, such as wood, composites, polymers, etc.

In combination, FIGS. 7 and 9-11 illustrate the following: An assembly 55 includes a saddle 160. The saddle may be coupled to and positioned on a support 150 forward of a distal region of the rear wall. (Saddles may be distally, centrally, or proximally located, depending on the number of fretting saddling members and their positions.) The saddle may be coupled to and positioned on the body by the support. An intonation screw 190 may insert longitudinally through an intonation opening 245 of a rear wall 145 into an intonation hole 246 in the saddle. A head of the intonation screw may seat behind the distal region of the rear wall. The intonation opening may limit vertical and lateral movement of the intonation screw at the rear wall. The saddle may include two action holes 242 into which two action screws 180 may be inserted vertically. The saddle, the action screws, and the intonation screw may tilt at an angle as the saddle’s vertical position may be adjusted. A saddle spring may maintain the position of the saddle. A string 20 may insert into a stringing opening, may seat behind the rear wall, may be in contact with the saddle at a rearward critical contact point, and may be directed by the saddle above a body 15, a pickup 65, an accessibility surface 105, and a fingerboard 90 and a sequence of fingerboard frets, to a nut 110. Turning the intonation screw may adjust a longitudinal position of the saddle and the rearward critical contact point of the string. An action screw may act as a height screw for the saddle. Turning the action screws may adjust the vertical position of the saddle, and the vertical distance between the string and the fingerboard. The saddle may be independently vertically positionable and longitudinally positionable, and may enable positioning of the rearward critical contact point of its respective string in an intonated position, fine tuning the fretted fingerboard notes of the string relative to an open note of the open string. A part of a saddle contacting a string may act as a saddling interface. A saddle, including a rearward critical contact point of a string, may be longitudinally and vertically adjusted relative to a body, a support, a neck, a fingerboard, a sequence of fingerboard frets, a fretting appendage 225 (including an appendage fretting crown 227), a nut, and a forward critical contact point of the string. An action screw and an action hole may be threaded.

In combination, FIGS. 8-12 and 14-17 illustrate the following: A support 150 may include a proto-deutero barrier 250*a* laterally between a proto string and a deutero string. A lower support surface 230 of the support may connect to the proto-deutero barrier. The proto-deutero barrier may extend downward from the lower support surface. A first intermediate insertion slot 285*a* and a second intermediate insertion slot 285*b* may respectively be proximal and distal to the proto-deutero barrier. The proto-deutero barrier may extend longitudinally and may be tapered such that it is slightly laterally wider at a rearward barrier end 290 than at a forward barrier end 295, allowing sliding longitudinal movement of a fretting saddling member in contact with the proto-deutero barrier along the line of a string. The proto-deutero barrier may include a planar lateral guide surface which may contact a planar lateral member side of a fretting saddling member. The proto-deutero barrier may be coupled to another part of the support. A forward barrier fastening opening 307 and a rearward barrier fastening opening 308 may extend laterally through the proto-deutero barrier, and may be threaded. The first intermediate insertion slot for a first fretting saddling member 125*a* and the second intermediate insertion slot for a second fretting saddling member 125*b* may be laterally on either side of the proto-deutero barrier.

In combination, FIGS. 7, 9-12, 14, 16, and 17 illustrate the following: A fretting saddling member 125 may contact and be aligned with a respective string 20. The fretting saddling member may be longitudinally elongated. Some features of a support 150, which may be aligned with and centered under the string, may be, in longitudinal order, a forward height adjustment hole 247, a forward base fastening slot 310, an intermediate insertion slot 285, a rearward height adjustment hole 248, and a rearward insertion slot 315. The rearward insertion slot, the intermediate insertion slot, and the forward base fastening slot may run longitudinally along the line of the string, and may be longitudinally elongated vertical through holes in the support. A proximal region of a rear wall may be longitudinally behind the fretting saddling member. In the proximal region, rearward of the rearward insertion slot, may be a stringing opening 155, which may be vertically above a vertically running positioning slot 320. The stringing opening and the positioning slot may be aligned with the string and with the fretting saddling member, and may be vertically lower than a lower support surface 230. The forward height adjustment hole, the forward base fastening slot, and the rearward height adjustment hole may be centered under the fretting saddling member. The intermediate insertion slot and the rearward insertion slot may form a discontinuous longitudinal slot into which the fretting saddling member may be inserted. The intermediate insertion slot, the proto-deutero barrier, and the rearward insertion slot may form a discontinuous and planar lateral guide surface, which may contact a planar lateral member side of the fretting saddling member. The intermediate insertion slot and the rearward insertion slot may form an opposite discontinuous lateral guide surface, which may contact an opposite planar lateral member side of the fretting saddling member. The support may be partly between a laterally outermost proximal string and a laterally outermost distal string.

In combination, FIGS. 7, 9-12, 14-15, and 18 illustrate the following: A fretting saddling member 125 may include an upper member surface 128, a downward member surface 129, a proximal lateral member side 126, a distal lateral member side 127, a positioning projection 325, a rearward member end 132, a fastening projection 330, a forward member end 131, a clearance surface 140, a string guide indentation 135, a saddling interface 134, a sequence of fretting crowns, a positioning hole 249, a forward upright fastening opening 305, and a projection fastening slot 335. The saddling interface and the sequence of fretting crowns may include a fingerboard matching angle 345 matching a fingerboard angle 350 of the fingerboard 90. A lateral edge of the upper member surface may be beveled, rounded, or both. The fretting saddling member may be coupled to and positioned on a support 150, which may couple the fretting saddling member to and position the fretting saddling member on a body 15. The fretting saddling member may be inserted into the support and a body cavity 50. The positioning projection may project downward at the rearward member end of the fretting saddling member, and the fastening projection may project downward from the downward member surface about halfway between the rearward member end and the forward member end. At the rearward member end, rearward of the saddling interface, the clearance surface may curve downward from the upper member surface, and may include the string guide indentation. The string guide indentation may be at a lower vertical level than the saddling interface. The string guide indentation may center the string on the fretting saddling member, establishing a lateral position of the string and preventing lateral movement of the string. The fretting saddling member may sit partly above, and partly below, an upper support surface 235 and a lower support surface 230. The fretting saddling member may sit in the discontinuous longitudinal slot formed by the insertion slots and against the proto-deutero barrier. The sequence of fretting crowns may be on the upper member surface at longitudinally spaced distances forward of the saddling interface. A sequence of fretting crowns may include four fretting crowns 120. The clearance surface may curve downward to the positioning projection. The positioning hole may be in a lower location of the positioning projection, and may allow longitudinal insertion of a positioning screw 205 from the rear. The forward upright fastening opening may be in the downward member surface, forward of the fastening projection. The fastening projection may include the projection fastening slot, which may allow insertion of a lateral fastener 200 in a lateral direction. The string guide indentation, the positioning hole, and the forward upright fastening opening may be centered between the lateral member sides of the fretting saddling member. The sequence of fretting crowns may be positioned on the fretting saddling member in a wrist fretting direction of use, and may be usable to shorten the sounding length of a string 20 opposite the direction of use of fingerboard frets. Each fretting crown may include a string contactable area, which may be used to stop the string. Each fretting crown may run perpendicular to the line of the string, and may include a proximal lateral end 121*a* and a distal lateral end 121*b*. The saddling interface may include a string contactable area, which may establish a rearward critical contact point 116 of the string. A rearmost contact point of the string may be on the clearance surface, rearward of the saddling interface, and rearward of the rearward critical contact point. The saddling interface and the sequence of fretting crowns may be machined into the upper member surface of the fretting saddling member. The saddling interface and the sequence of fretting crowns may be coplanar. The sequence of fretting crowns may define a sequence of wrist fretable notes, which may be a sequence of successive semitones above an open note of the string. In longitudinal order, a fretting saddling member may include a string guide indentation, a saddling interface, a first fretting crown 120*a*, a second fretting crown 120*b*, a third fretting crown 120*c*, and a fourth fretting crown 120*d*. The fourth fretting crown may be the foremost fretting crown, may be at the forward member end, and may be nearest to the fingerboard. A fretting crown or a saddling interface may be integrated with or attached to a fretting saddling member.

In an additional or alternative embodiment, a sequence of fretting crowns may include one, two, three, five, or more fretting crowns.

In combination, FIGS. 7-12 and 14-17 illustrate the following: An upper member surface 128 of a fretting saddling member 125 may be vertically higher than an upper support surface 235. A positioning projection 325 may insert downward into a rearward insertion slot 315. A fastening projection 330 may insert downward into an intermediate insertion slot 285. A forward height screw 195 may insert vertically into a forward height adjustment hole 247 in a support 150, may extend upward, and may contact a downward member surface 129 under a forward member end 131, forward of a saddling interface 134. A forward upright fastener 201 may insert upward through the forward base fastening slot 310 into a forward upright fastening opening 305, which may be above the upper support surface. A head of the forward upright fastener may seat under the support against a lower support surface 230. A rearward height screw 196 may insert vertically into the rearward height adjustment hole 248 in the support, may extend upward, and may contact a downward member surface of a rearward member end 132 longitudinally near the saddling interface (the saddling interface may be on the upper member surface). In some positions, the rearward height screw may contact the fretting saddling member under the rearmost contact point of the string. The forward upright fastener, the forward base fastening slot, and the forward upright fastening opening may be forward of the rearward height screw and the rearward height adjustment hole, and may be rearward of the forward height screw and the forward height adjustment hole. A positioning screw 205 may insert substantially longitudinally through a positioning slot 320 into a positioning hole 249. A head of the positioning screw may seat behind a rear wall 145.

The fretting saddling member and a sequence of fretting crowns may be centered under and aligned with the string by one or more of: a proto-deutero barrier 250*a*, the rearward insertion slot, the intermediate insertion slot, the forward base fastening slot, the forward upright fastener, the positioning slot, the positioning screw, a bracket 210, and a lateral fastener 200. The saddling interface may establish the position the rearward critical contact point of the string vertically, longitudinally, and laterally, and may direct the string at a wrist fretable vertical distance above the sequence of fretting crowns, and above a body 15, a pickup 65, and the sequence of fingerboard frets, to a nut 110. A height screw, a height adjustment hole, a fastener, a fastening opening, a positioning screw, and/or a positioning hole may be threaded. A height screw, a positioning screw, and/or a fastener may be accessible for adjustment through an aperture 60. A lateral fastener may be accessible by inserting an L-shaped tool into the aperture. A proximal lateral member side 126 of a fretting saddling member and a distal lateral member side 127 (of the same fretting saddling member) may be parallel, allowing insertion into a discontinuous longitudinal slot formed by the intermediate insertion slot and a rearward insertion slot 315, in contact with a proximal lateral guide surface and a distal lateral guide surface of the insertion slots. The proto-deutero barrier may form a part of a (discontinuous) lateral guide surface in common with insertion slots. With fasteners in a non locking configuration, a sliding adjustment of the longitudinal position of the fretting saddling member may be effected against a lateral guide surface in parallel with the line of the respective string. The fretting saddling member may be independently longitudinally and vertically positionable of another fretting saddling member, a fretting appendage, and of saddles 160. The fretting saddling member may be adjustably positioned without moving another fretting saddling member, a fretting appendage, or a saddle.

In combination FIGS. 7-12 and 14-17 illustrate the following: A fretting saddling member 125 may slide vertically and longitudinally in the insertion slots, along and against the lateral guide surfaces, during adjustment of a vertical position or of a longitudinal position of the fretting saddling member, when any respective fasteners are in a non locking configuration. The fretting saddling member may slide along and against its respective height screws during an adjustment of its longitudinal or vertical position. A forward upright fastener 201 may slide longitudinally in a forward base fastening slot 310 during adjustment of the longitudinal position of the fretting saddling member. A projection fastening slot 335 of the fretting saddling member may be manipulated longitudinally and vertically along and around the lateral fastener 200 during adjustment of the vertical position or of the longitudinal position of the fretting saddling member. A positioning screw 205 may slide up and down in a positioning slot 320 during adjustment of a vertical position of the fretting saddling member. The fretting saddling member may be positionable on an instrument 5 such that a string 20 contacts a saddling interface 134 of the fretting saddling member at a rearward critical contact point 116. A sequence of fretting crowns may be on the fretting saddling member, under the string, and between a neck 75 and the saddling interface. The fretting saddling member may be movable along a line of longitudinal adjustment that is substantially parallel with the string.

In combination, FIGS. 7, 9-12, 14, 15, and 18 illustrate the following: A sequence of fretting crowns (on an upper member surface 128 of a fretting saddling member 125) may include four fretting crowns 120. The sequence of fretting crowns may define a chromatic sequence of wrist fretable notes above an open note of a respective string 20. A first fretting crown 120*a*, a second fretting crown 120*b*, a third fretting crown 120*c*, and a fourth fretting crown 120*d* of the sequence of fretting crowns may respectively define wrist fretable notes a semitone, a whole step, a minor third, and a major third above the open note of the open string. If a deutero string 20*b* is tuned a perfect fourth above the open note of a proto string 20*a*, and a trito string 20*c* is tuned a perfect fourth above the open note of the deutero string, the full chromatic scale may be played by wrist fretting (a fretting appendage 225 may be used to wrist fret a wrist fretted note a semitone above the open note of the trito string). The fretting saddling member may be longitudinally and vertically positionable such that: i) the first fretting crown defines a wrist fretable note a semitone above an open note of the string, ii) the second fretting crown defines a wrist fretable note a whole step above the open note of the string, iii) the third fretting crown defines a wrist fretable note a minor third above the open note of the string, and iv) the fourth fretting crown defines a wrist fretable note a major third above the open note of the string. The fretting saddling member may be positionable such that the string is at a wrist fretable vertical distance above the first fretting crown, the second fretting crown, the third fretting crown, and the fourth fretting crown; at the same time, each fingerboard fret 100 in a sequence of fingerboard frets may define a fretted fingerboard note, and the open string may be playable.

In additional or alternative embodiments, a sequence of fretting crowns of a fretting saddling member includes one, two, three, five, or more fretting crowns.

Depending on the desired setup of an instrument, several possibilities exist for chromatic positioning of fretting crowns. A first fretting crown may be positioned i) nearer than, ii) exactly at, or iii) farther than a nominal semitone oddment length from a saddling interface (more specifically, from the expected location of a rearward critical contact point of a string on the saddling interface). The second fretting crown of a sequence of fretting crowns may be positioned i) nearer than, ii) exactly at, or iii) farther than a nominal whole step oddment length from a saddling interface. The third fretting crown of a sequence of fretting crowns may be positioned i) nearer than, ii) exactly at, or iii) farther than a nominal minor third oddment length from a saddling interface. The fourth fretting crown of a sequence of fretting crowns may be positioned i) nearer than, ii) exactly at, or iii) farther than a nominal major third oddment length from a saddling interface. In some assemblies, each fretting crown may be positioned slightly nearer to a respective saddling interface than a nominal oddment length of the respective interval, to achieve in tune intonation.

In combination, FIGS. 7, 9, 10, 14, 15, and 18 illustrate the following: A saddling interface 134 may be a raised ridge, in the shape of a “fret.” A saddling interface may have the same shape as a fretting crown 120. A fretting crown may be in the form of a raised ridge, in the shape of a "fret." The string contactable area on a fingerboard fret, a fretting crown, or a saddling interface may face upward, towards a string 20. Fretting crowns and a saddling interface of a fretting saddling member 125 may be positioned such that a planar surface, such as a file, may contact them to ensure levelness. A sequence of fretting crowns may be numbered starting with the fretting crown closest to the saddling interface. In some embodiments, each fretting crown in a sequence of fretting crowns is positioned to define the same note as a fingerboard fret with the same ordinal number.

In additional or alternative embodiments, a fretting crown may be a rounded edge between an upward facing face and a forward facing surface of a fretting saddling member; a saddling interface may be formed in a similar manner. In additional or alternative embodiments, fretting crowns have a diatonic or microtonal spacing.

In combination, FIGS. 7, 9-11, and 14-18 illustrate the following: A support 150 may include a first forward height adjustment hole 247*a* aligned with a proto string 20*a* and a first fretting saddling member 125*a*, a first forward base fastening slot 310*a*, a first intermediate insertion slot 285*a*, a first rearward height adjustment hole 248*a*, a first rearward insertion slot 315*a*, a first stringing opening 155*a*, and a first positioning slot 320*a*. The first intermediate insertion slot, the first rearward insertion slot, and a proto-deutero barrier 250*a* may include a first distal lateral guide surface 302*a*. The first intermediate insertion slot and the first rearward insertion slot may include a first proximal lateral guide surface 301*a*. The first fretting saddling member may include a first upper member surface 128*a*, a first distal lateral member side 127*a*, a first proximal lateral member side 126*a*, a first downward member surface 129*a*, a first forward member end 131*a*, a first rearward member end 132*a*, a first saddling interface 134*a*, a first clearance surface 140*a*, a first string guide indentation 135*a*, a first fastening projection 330*a*, a first projection fastening slot 335*a*, a first positioning projection 325*a*, a first positioning hole 249*a*, and a first forward upright fastening opening 305*a*. The first fretting saddling member may include a first sequence of fretting crowns, including a first fingerboard matching angle 345*a* matching a first fingerboard angle 350*a* respective to the proto string. The assembly may include a first bracket 210*a*, a first lateral fastener 200*a*, a first forward height screw 195*a*, a first rearward height screw 196*a*, a first positioning screw 205*a*, and a first forward upright fastener 201*a* respective to the proto string and the first fretting saddling member. The first sequence of fretting crowns may include a first fretting crown 120*a*, a second fretting crown 120*b*, a third fretting crown 120*c*, and a fourth fretting crown 120*d*, and the first fretting saddling member may be positionable such that they define wrist fretable notes a semitone, a whole step, a minor third, and a major third above the open note of the proto string. The first fretting saddling member may be positionable such that the first, second, third, and fourth fretting crowns of the first sequence of fretting crowns are at wrist fretable vertical distances under the proto string. The first distal lateral guide surface may contact the first distal lateral member side, and may prevent rotation of the first fretting saddling member around an axis parallel with the proto string. The first proximal lateral guide surface may contact the first proximal lateral member side.

In combination, FIGS. 7, 9-12, and 15-18 illustrate the following: A support 150 may include a second forward height adjustment hole 247*b* aligned with a deutero string 20*b* and a second fretting saddling member 125*b*, a second forward base fastening slot 310*b*, a second intermediate insertion slot 285*b*, a second rearward height adjustment hole 248*b*, a second rearward insertion slot 315*b*, a second stringing opening 155*b*, and a second positioning slot 320*b*. The second intermediate insertion slot, a second rearward insertion slot, and a proto-deutero barrier 250*a* may include a second proximal lateral guide surface 301*b*. The second intermediate insertion slot and the second rearward insertion slot may include a second distal lateral guide surface 302*b*. The second fretting saddling member may include a second upper member surface 128*b*, a second distal lateral member side 127*b*, a second proximal lateral member side 126*b*, a second downward member surface 129*b*, a second forward member end 131*b*, a second rearward member end 132*b*, a second saddling interface 134*b*, a second clearance surface 140*b*, a second string guide indentation 135*b*, a second fastening projection 330*b*, a second projection fastening slot 335*b*, a second positioning projection 325*b*, a second positioning hole 249*b*, and a second forward upright fastening opening 305*b*. The second fretting saddling member may include a second sequence of fretting crowns, including a second fingerboard matching angle 345*b* matching a second fingerboard angle 350*b* respective to the deutero string. An assembly 55 may include a second bracket 210*b*, a second lateral fastener 200*b*, a second forward height screw 195*b*, a second rearward height screw 196*b*, a second positioning screw 205*b*, and a second forward upright fastener 201*b* respective to the deutero string and the second fretting saddling member. The second sequence of fretting crowns may include a first fretting crown 120*a*, a second fretting crown 120*b*, a third fretting crown 120*c*, and a fourth fretting crown 120*d*, and the second fretting saddling member may be positionable such that they define wrist fretable notes a semitone, a whole step, a minor third, and a major third above the open note of the deutero string. The second fretting saddling member may be positionable such that the first, second, third, and fourth fretting crowns of the second sequence of fretting crowns are at wrist fretable vertical distances under the deutero string. The second distal lateral guide surface may contact the second distal lateral member side. The second proximal lateral guide surface may contact the second proximal lateral member side, and may prevent rotation of the second fretting saddling member around an axis parallel with the deutero string.

In combination, FIGS. 10-12, 14, and 15 illustrate the following: A positioning screw 205 may be used to adjust the longitudinal position of a fretting saddling member 125, including a saddling interface 134, a rearward critical contact point 116 of a respective string 20, and a sequence of fretting crowns, when the fasteners respective to the fretting saddling member are in a non locking configuration. The tension on the string may push forward and downward on the fretting saddling member at the saddling interface and at a clearance surface 140. The string may hold the fretting saddling member in place against the height screws and a support 150. The string may pull a head of the positioning screw against a rear wall 145, preventing forward movement of the fretting saddling member. By turning the positioning screw, the fretting saddling member may be moved forward or rearward, towards or away from a nut. This may allow the user to change the longitudinal position of the saddling interface, the longitudinal position of the rearward critical contact point of the string, and the longitudinal position of the sequence of fretting crowns by the same amount, adjusting them equally. The location of a positioning hole 249 and a positioning slot 320, below a top 25 of a body 15, may prevent contact with a hand of the user. The positioning screw in the positioning slot may be vertically lower than a rearward insertion slot 315, an intermediate insertion slot 285, and a forward base fastening slot 310, preventing rotation of the fretting saddling member around an axis parallel with the string. The stringing opening in the rear wall may be vertically above the positioning slot, and may enable attachment of the string. The positioning screw and positioning slot may be aligned with the string, such that the fretting saddling member may be movable along a line of longitudinal adjustment that is parallel with the string. Using the positioning screw, the longitudinal position of the fretting saddling member may be altered, while keeping the sequence of fretting crowns centered under the string. When a forward or a rearward height screw adjusts a vertical position of the fretting saddling member, the positioning screw may slide up or down in the positioning slot, which may be aligned vertically with the string and the neck, maintaining the fretting saddling member's lateral position throughout its vertical positioning range.

In combination, FIGS. 7, 9-12, 14, and 15-17 illustrate the following: The vertical position of the fretting saddling member 125 may be adjustable when its fasteners are in a non locking configuration. A forward height screw 195, may adjust the vertical distance between i) a forward member end 131 and ii) a support 150 and a body 15. The forward height screw may adjust the vertical distance between a sequence of fretting crowns and a respective string 20. A rearward height screw 196 may adjust the vertical distance between i) a rearward member end 132 (including a saddling interface 134 and a rearward critical contact point 116 of the string) and ii) the support and the body. Adjusting the vertical position of the saddling interface and the rearward critical contact point of the string, by moving the rearward member end up or down, may adjust the vertical distance between the string and a fingerboard 90 (including a sequence of fingerboard frets). The angle, which may have the saddling interface at its vertex, between the string and the sequence of fretting crowns may be adjusted with each of the height screws. By using the two height screws, the vertical position of the sequence of fretting crowns and the vertical position of the saddling interface and the rearward critical contact point of the string may be adjusted independently. A forward height adjustment hole 247 may be longitudinally spaced from a rearward height adjustment hole 248 to enable separate height adjustment of the forward member end and the rearward member end. The forward height screw hole may be near a foremost fretting crown, and the rearward height screw may be near the saddling interface.

Figure 12:
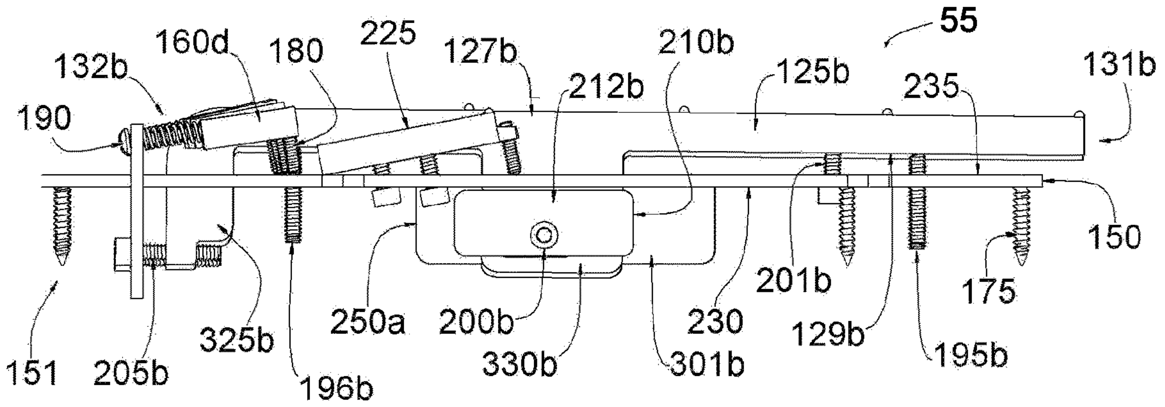
FIG. 12 illustrates a partial orthographic side view of an assembly.

As illustrated in FIGS. 12 and 14, the effect of a height screw on the vertical position of the member end opposite the height screw may vary depending on the longitudinal position of the opposite member end, because the opposite height screw may act as a pivot. A point directly above the opposite height screw may be vertically adjusted not at all or very little, while a point farther away from the opposite height screw may be adjusted by a larger amount. When the forward height screw is raised or lowered, the fretting saddling member may pivot on the rearward height screw. When the rearward height screw is raised or lowered, the fretting saddling member may pivot on the forward height screw. A downward member surface 129 may pivot against the height screws. A height screw may cooperate with a forward upright fastener 201 in locking a position of the fretting saddling member. The forward upright fastener, in a locking configuration, may apply force through the support and the fretting saddling member to the height screw, locking them together. As illustrated, a height screw may be a headless set screw; however, other forms, including screws with heads, may be used.

FIGS. 7-12 and 14-15 include an assembly 55. The assembly may include a fastening means, which may include fasteners. A fastener may couple and lock a fretting saddling member 125 to a support 150, coupling and locking the fretting saddling member to a body 15. The fretting saddling member may be detached from the support and the body by removal of the fasteners. A fastener may have a non locking configuration and a locking configuration. With the fasteners in the non locking configuration, a longitudinal position of the fretting saddling member (including a sequence of fretting crowns, a saddling interface 134, and a rearward critical contact point 116 of a string 20), a vertical position of a forward member end 131, and a vertical position of a rearward member end 132 (including the saddling interface and the rearward critical contact point of the string) may be adjustable relative to the body, the support, and a neck 75. With the fasteners in a non locking configuration, the angle of the sequence of fretting crowns to the string, which has the saddling interface as its vertex, may be adjustable. In the locking configuration, a fastener may lock the lateral position, the longitudinal position, and the vertical position of the fretting saddling member (including the saddling interface, the rearward critical contact point of the string, and the sequence of fretting crowns) relative to the body, the support, and the neck, and may lock the angle of the sequence of fretting crowns relative to the string. A fastener may be locked or unlocked by turning it. For the convenience of the user, each fastener respective to a fretting saddling member may be independently fully capable of locking the longitudinal position, vertical position, and lateral position of the fretting saddling member without the use of another fastener.

As illustrated in FIG. 14, a forward upright fastener 201 locks the fretting saddling member against height screws and against lateral guide surfaces of the support, and locks a positioning screw 205 against a rear wall 145. A lateral fastener 200 may lock a lateral member side of the fretting saddling member against a lateral guide surface of the support, which may be formed by a proto-deutero barrier **250*a*** and by the insertion slots. A fastening opening may be tapped into the material of the fretting saddling member.

In combination, FIGS. 10-12, 14, 16, and 17 illustrate the following: A forward base fastening slot 310 may be a longitudinal through slot, in the form of a longitudinally elongated vertical hole in a support 150. The forward base fastening slot may be aligned with the line of a string 20 and centered under the string. A forward upright fastening opening 305 may be a blind hole (or alternatively a through hole) in a fretting saddling member 125. The forward upright fastener 201 may fit snugly in the forward base fastening slot, which may include a base fastening slot proximal lateral guide surface 303 and a base fastening slot distal lateral guide surface 304, which may contact the forward upright fastener, preventing lateral movement. The fretting saddling member may sit against the support in a lower vertical position, and the forward upright fastener may insert vertically. As a height screw may raise and tilt the fretting saddling member, the forward upright fastener and a positioning screw 205 may tilt with it. The forward upright fastener may slide longitudinally against the lateral guide surfaces of the forward base fastening slot when the fretting saddling member is longitudinally repositioned. The forward upright fastener may lock the longitudinal position, the vertical position, the lateral position, and the angular position of the fretting saddling member, without the use of another fastener. With a lateral fastener 200 removed, the positioning screw may prevent rotation of the fretting saddling member around an axis parallel with the string. With the lateral fastener inserted, and in a non locking configuration, a bracket may loosely hold the fretting saddling member against the proto-deutero barrier 250*a*, preventing rotation of the fretting saddling member around an axis parallel with the string.

In combination FIGS. 10-12 and 14-17 illustrate the following: A lateral fastener 200 may insert through a bracket opening 309 in a bracket 210 through a projection fastening slot 335 of a fretting saddling member 125 into a forward barrier fastening opening 307 or a rearward barrier fastening opening 308. Tightening the lateral fastener in the barrier fastening opening may make the lateral fastener pull the bracket against a lateral member side of the fretting saddling member, while the fretting saddling member is pulled against a lateral guide surface of its respective insertion slots and the proto-deutero barrier 250*a*. The bracket may be sized to catch a fastening projection 330 at several points around the projection fastening slot, regardless of the longitudinal position and vertical position of the fretting saddling member. The bracket may act as a washer. With the lateral fastener in a non locking configuration, the longitudinal position of the fretting saddling member, the vertical position of a forward member end 131, the vertical position of a rearward member end 132, and the angle of a sequence of fretting crowns to a string 20 may each be adjusted. The lateral fastener may lock the longitudinal position, the vertical position, and the lateral position of the fretting saddling member, and lock the angle of the sequence of fretting crowns relative to the string, by itself, without another fastener.

In combination, FIGS. 10-12 and 14-17 illustrate the following: A barrier side of the proto-deutero barrier 250*a* may form part of a discontinuous first distal lateral guide surface 302*a* formed by a first intermediate insertion slot 285*a* and a first rearward insertion slot 315*a*. An opposite barrier side may form part of a discontinuous second proximal lateral guide surface 301*b* formed by a second intermediate insertion slot 285*b* and a second rearward insertion slot 315*b*. A first lateral fastener 200*a* and a first bracket 210*a* may lock a first fretting saddling member 125*a* against the first distal lateral guide surface of the first insertion slots and the proto-deutero barrier. A second lateral fastener 200*b* and a second bracket 210*b* may lock a second fretting saddling member 125*b* against the second proximal lateral guide surface of the second insertion slots and the proto-deutero barrier.

In combination, FIGS. 10, 11, and 14-17 illustrate the following: A first distal bracket side 212*a* of a first bracket 210*a* may contact a first proximal lateral member side 126*a* of a first fretting saddling member 125*a*. The first bracket may include a first bracket opening 309*a*. A first lateral fastener 200*a* may insert laterally through the first bracket opening, through a first projection fastening slot 335*a*, and into the forward barrier fastening opening 307. The first lateral fastener may pull the first bracket against the first fretting saddling member, and may lock a first distal lateral member side 127*a* against a first distal lateral guide surface of a first intermediate insertion slot 285*a*, a first rearward insertion slot 315*a*, and a proto-deutero barrier 250*a*. A head of the first lateral fastener may seat against a first proximal bracket side 211*a* of the first bracket.

In combination, FIGS. 10-12 and 15-17 illustrate the following: A second proximal bracket side 211*b* of a second bracket 210*b* may contact a second distal lateral member side 127*b* of a second fretting saddling member 125*b*. The second bracket may include a second bracket opening 309*b*. A second lateral fastener 200*b* may insert laterally through the second bracket opening, through a second projection fastening slot 335*b*, and into a rearward barrier fastening opening 308. The second lateral fastener may pull the second bracket against the second fretting saddling member, and may pull a second proximal lateral member side 126*b* against a second proximal lateral guide surface of a second intermediate insertion slot 285*b*, a second rearward insertion slot 315*b*, and a proto-deutero barrier 250*a*. A head of the second lateral fastener may seat against a second distal bracket side 212*b* of the second bracket.

In combination, FIGS. 7, 9, 15, and 18 illustrate the following: A first proximal lateral member side 126*a* and proximal lateral ends 121*a* of the fretting crowns of a first sequence of fretting crowns of a first fretting saddling member 125*a* may be at a lateral distance in a proximal direction (ignoring any difference in vertical position) from a proto string which is less than a lateral string spacing 170. A first distal lateral member side 127*a* and distal lateral ends 121*b* of the fretting crowns of the first sequence of fretting crowns of the first fretting saddling member may be laterally between the proto string 20*a* and the deutero string 20*b*. A second proximal lateral member side 126*b* and proximal lateral ends 121*a* of the fretting crowns of a second sequence of fretting crowns of a second fretting saddling member 125*b* may be laterally between the proto string and the deutero string. A second distal lateral member side 127*b* and distal lateral ends 121*b* of the fretting crowns of the second sequence of fretting crowns of the second fretting saddling member may be laterally between the deutero string and a trito string 20*c*. There may be a small lateral distance between the first fretting saddling member and the second fretting saddling member.

In combination, FIGS. 13 and 14 illustrate the following: The angle of the sequence of fretting crowns to the proto string 20*a*, which has the saddling interface 134 as its vertex, may be greater than the angle of the sequence of fingerboard frets to the proto string, which has the nut 110 as its vertex. On a fretting saddling member with a chromatic spacing, each fretting crown 120 may be farther from the proto string than a fingerboard fret 100 with the same ordinal number is from the proto string. This may allow the string to be fretted against the fingerboard frets without coming into contact with a fretting crown. The distance between each fretting crown and the saddling interface may be less than the distance between a fingerboard fret with the same ordinal number and the nut. As a result, a sounding length defined by a fretting crown may be longer than a sounding length defined by a fingerboard fret with the same ordinal number. The longer sounding length may compensate for the larger amount of force required to wrist fret at that fretting crown than to fret at the corresponding fingerboard fret. The position of the fretting saddling member 125 may be such that the open note of the proto string is playable, seventeen fingerboard frets are playable and intonated, and the fretting crowns are playable and intonated.

In an alternative embodiment, fretting crowns may be positioned in another manner on the fretting saddling member. In an alternative embodiment, the neck may have a different number of fingerboard frets.

Figure 18:
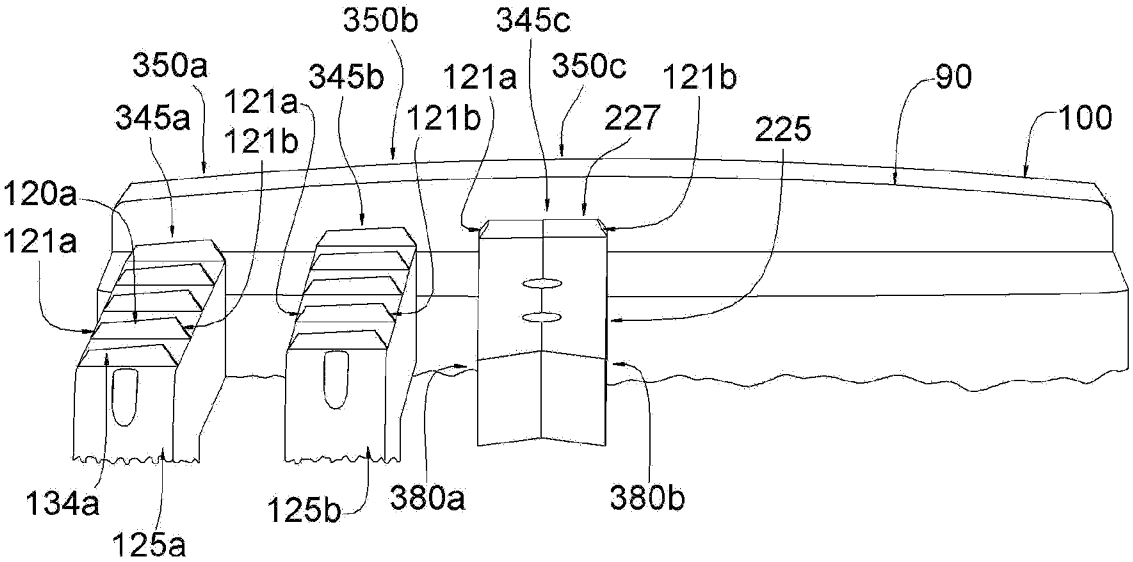
FIG. 18 illustrates a partial view, from a longitudinally rearward viewpoint, of fretting saddling members and a fretting appendage of an assembly and a fingerboard fret on a fingerboard.

As illustrated in FIG. 18, a first sequence of fretting crowns (including a first fretting crown 120*a*) and a first saddling interface 134*a* on a first fretting saddling member 125*a* may include a first fingerboard matching angle 345*a* matching a first fingerboard angle 350*a* associated with a proto string. A second sequence of fretting crowns and a second saddling interface on a second fretting saddling member 125*b* may include a second fingerboard matching angle 345*b* matching a second fingerboard angle 350*b* associated with a deutero string. An appendage fretting crown 227 of a fretting appendage 225 may include a third fingerboard matching angle 345*c*, matching a third fingerboard angle 350*c* associated with the trito string. The fingerboard 90 (and a fingerboard fret 100 on the fingerboard) may be curved. A fingerboard matching angle may allow a string above a fretting crown to vibrate freely when a player plucks an open note or a fretted fingerboard note. The fingerboard matching angle may allow the fretting hand to bend the string without "fretting out" on a fretting crown. Each of the fretting crowns in a sequence of fretting crowns and the respective saddling interface may share the same fingerboard matching angle. A fingerboard angle of a curved fingerboard may manifest as a tangent to a curve of a fret attachment surface of the fingerboard under a string; a fingerboard angle may be measured near the rearmost of a sequence of fingerboard frets. A fingerboard angle corresponding to a string, which is nearer to the centerline of a neck, may be smaller than a fingerboard angle corresponding to a string which is nearer to an edge of the neck.

In combination, FIGS. 9-12 and 15-18 illustrate the following: A fretting appendage 225 may be coupled to and positioned on an upper support surface 235 of a support 150 under a trito string 20*c*. The fretting appendage may be coupled to and positioned on a body 15 by the support. The fretting appendage may include a fretting end 226 including an appendage fretting crown 227. Opposite the fretting end, the fretting appendage may include a supporting end 228 including an appendage pivot 229 longitudinally spaced from the appendage fretting crown. With the two appendage fasteners 206 in a non locking configuration, a longitudinal position of the fretting appendage, including the appendage fretting crown, may be adjustable relative to the support, the body, and a rearward critical contact point of the trito string. An appendage height screw 207 may insert into an appendage height adjustment hole 236 in a height tab 224 of the fretting end, may extend downward, and may contact the support. With the appendage fasteners in a non locking configuration, a vertical position of the fretting end (including the appendage fretting crown) may be adjustable relative to the trito string, the support, and the body, by pivoting the fretting appendage on the appendage pivot, which may be done by turning the appendage height screw. Each of the two appendage fasteners may independently lock the longitudinal position of the fretting appendage (including the appendage fretting crown), and lock the vertical position of the fretting appendage, including the fretting end (including the appendage fretting crown), without the use of the other. The two appendage fasteners may insert upwards through an appendage through slot 336 in the support, which may be centered under and aligned with the trito string, into two appendage fastening openings 337 centered between lateral sides of the fretting appendage. The heads of the appendage fasteners may seat against a lower support surface 230. The fretting appendage may be positionable such that the appendage fretting crown defines a wrist fretable note a semitone above an open note of the trito string. The appendage fretting crown of the fretting appendage may be positionable at a wrist fretable vertical distance under the trito string. The trito string saddle may direct the trito string at a wrist fretable height above the fretting appendage. A proximal lateral side 380*a* of the fretting appendage and a proximal lateral end 121*a* of the appendage fretting crown may be laterally between the deutero string 20*b* and the trito string. A distal lateral side 380*b* of the fretting appendage and a distal lateral end 121*b* of the appendage fretting crown may be laterally between the trito string and a tetarto string 20*d*. The appendage through slot may be a longitudinal slot and may be aligned with the line of the trito string. A longitudinal position of a fretting appendage may be adjusted such that the distance from the appendage fretting crown to a forward critical contact point of a respective string is less than, equal to, or greater than a nominal semitone sounding length. Nominal sounding lengths are described in further detail below with respect to a neck scale length. The longitudinal position of the appendage fretting crown may be adjusted such that the distance from the fretting crown to the forward critical contact point of the string is less than, equal to, or greater than the distance from a first fingerboard fret to a rearward critical contact point of the string. A saddle 160 and a fretting appendage (respective to a string) may be adjusted such that: i) the distance from the forward critical contact point to the rearward critical contact point is shorter than, equal to, or longer than twice the distance from the forward critical contact point to a twelfth fret, and ii) the distance from the appendage fretting crown to the forward critical contact point is shorter than, equal to, or longer than the distance from the first fingerboard fret to the rearward critical contact point of the string.

A fretting appendage 225 may be a shaped block of a material. The block may include multiple components, such as a threaded insert or a piece of fretwire. The block may include flat, curved, decorative, or rounded shapes. A block may be skeletonized, hollow, or may include sheet metal. Any feature or a function of a fretting appendage may be included by the block.

As illustrated in FIGS. 7 and 13, a nut 110 has a form typical for angled headstocks. A nut may be understood to be a feature establishing a forward critical contact point 115 of a string 20. A nut may include one or more components. A nut may include a feature of a Martin or Fender style nut, a compensated nut, a headless headpiece, a locking nut, a roller nut, a combination of a string guide and a "zero fret," or a nut of another variety.

Figure 19:
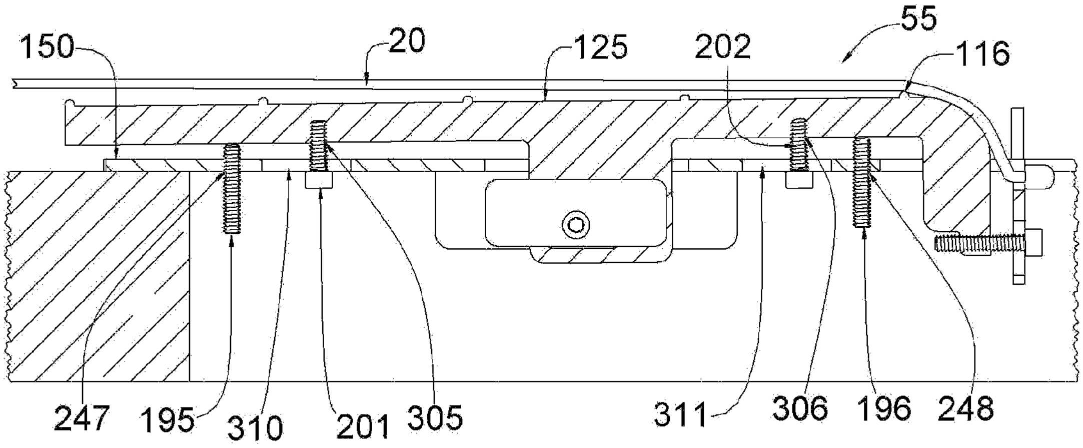
FIG. 19 illustrates a partial cross-sectional view of a body and an assembly of an instrument similar to an instrument in FIG. 14, with a rearward upright fastener and a rearward base fastening slot.

As illustrated in FIG. 19, an assembly 55 on an instrument (which may be similar to an instrument as shown and described FIGS. 7-18) includes a fretting saddling member 125 centered under and aligned with a string 20, which may contact a saddling interface of the fretting saddling member at a rearward critical contact point 116. A support 150 may include, centered under and aligned with the string, in longitudinal order, a forward height adjustment hole 247, a forward base fastening slot 310, a rearward base fastening slot 311, and a rearward height adjustment hole 248. The fretting saddling member may include a forward upright fastening opening 305 and a rearward upright fastening opening 306 in a downward member surface. A forward height screw 195 and a rearward height screw 196 may insert upward into the forward height adjustment hole and the rearward height adjustment hole, and contact the downward member surface. A forward upright fastener 201 may insert through the forward base fastening slot into the forward upright fastening opening, which may be centered between the lateral member sides of the fretting saddling member. A rearward upright fastener 202 may insert through the rearward base fastening slot into the rearward upright fastening opening, which may be centered between the lateral member sides of the fretting saddling member. A head of the rearward upright fastener may seat under the support.

With the fasteners in a non locking configuration, including the rearward upright fastener, the vertical, longitudinal, and angular positions of the fretting saddling member may be adjustable. The rearward upright fastener, without use of another fastener, may lock the vertical position, the longitudinal position, and the lateral position of the fretting saddling member, and may lock the angle of the sequence of fretting crowns to the string, functioning like the previously described forward upright fastener, but at a rearward location. The fretting saddling member may be aligned with and centered under the string by the forward upright fastener, the rearward upright fastener, and the support. An assembly may include a rearward upright fastener and a rearward base fastening slot in the support for each fretting saddling member, and each fretting saddling member may include a respective rearward upright fastening opening.

Figure 20:
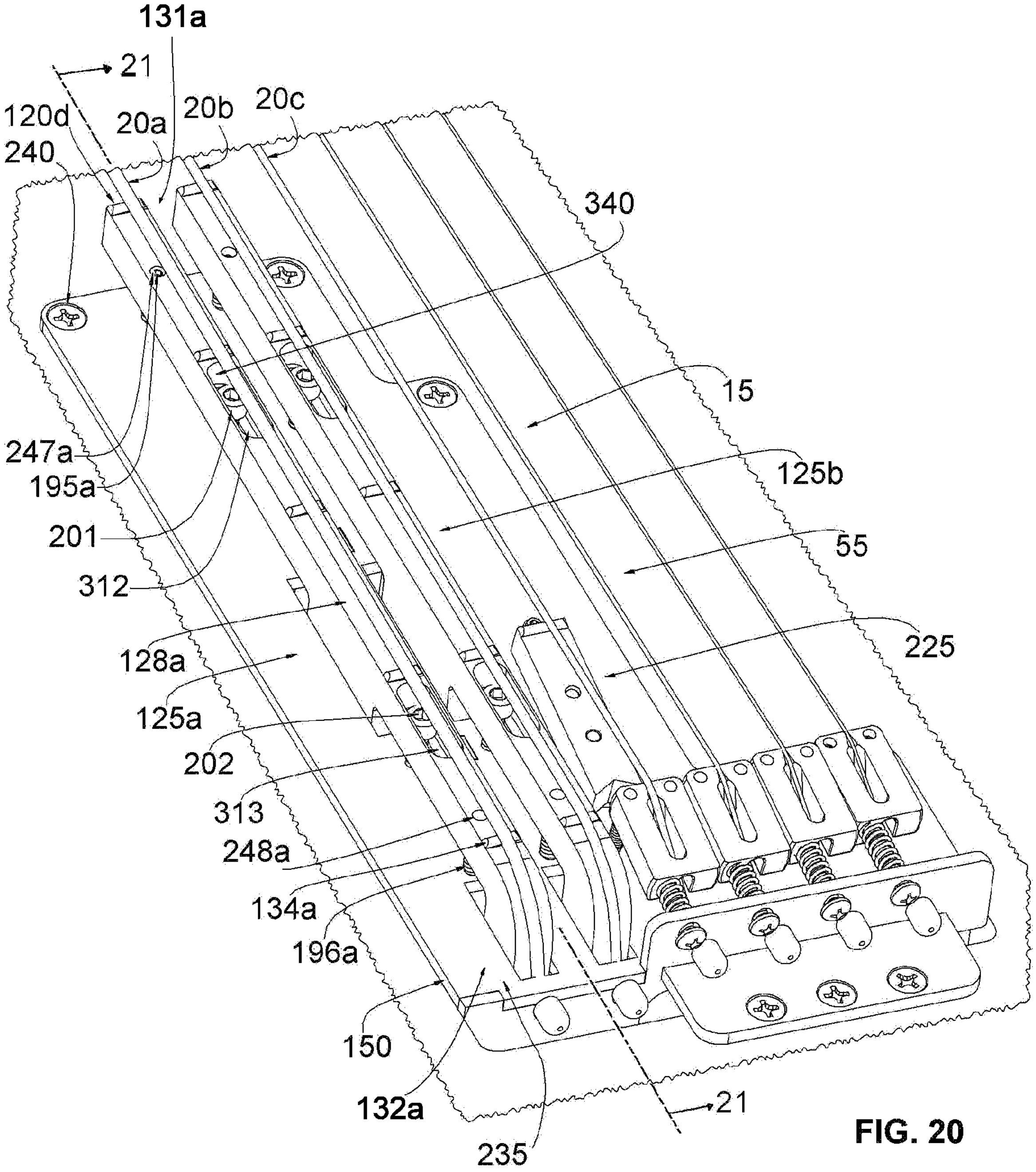
FIG. 20 illustrates a partial isometric view of an assembly on a body.
Figure 21:
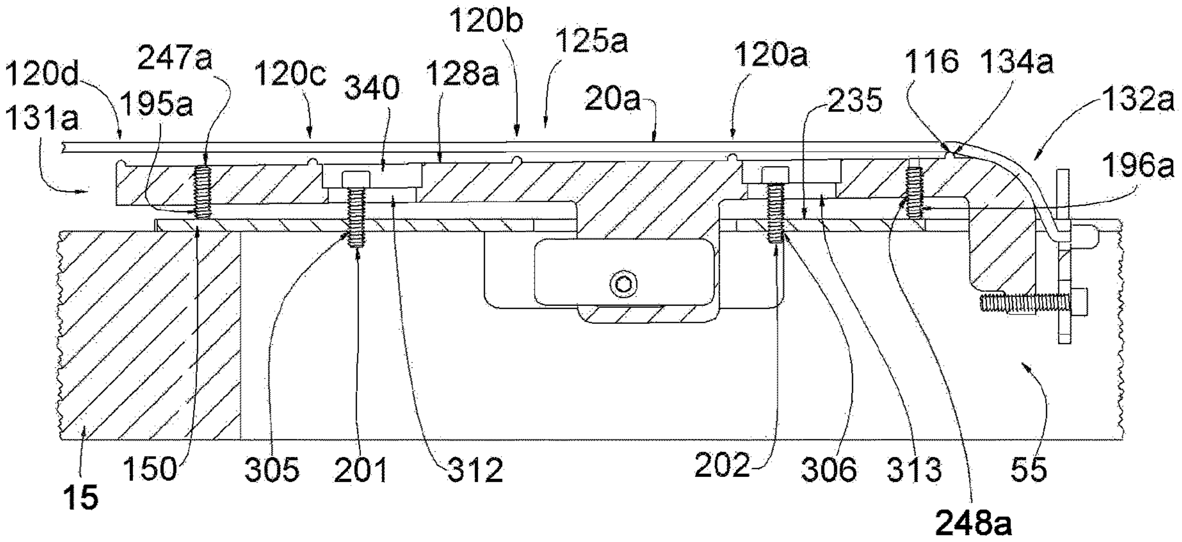

As illustrated in FIG. 20 and FIG. 21, an assembly 55 on a body 15 may be similar to assemblies in FIGS. 7-19, with several differences. Base fastening slots may be absent from a support 150, a forward member fastening slot 312 and a rearward member fastening slot 313 may be present in a fretting saddling member 125, a height adjustment hole 247 may be in a fretting saddling member instead of the support, an upright fastening opening may be in the support instead of in the fretting saddling member. An upright fastener may insert downward through a member fastening slot in a fretting saddling member into an upright fastening opening in the support. A height screw may insert into the height adjustment hole in the fretting saddling member and contact the support. The height adjustment holes, height screws, upright fasteners, and upright fastening openings may be threaded.

As illustrated in FIGS. 20 and 21, a first forward member end 131*a* of a first fretting saddling member 125*a* may include a first forward height adjustment hole 247*a*, which may be centered between the lateral member sides of the first fretting saddling member (and centered under a proto string 20*a*) and which may be positioned near a fourth fretting crown 120*d*, which may be longitudinally foremost of a first sequence of fretting crowns on the first fretting saddling member. (In an additional or alternative embodiment, a fretting saddling member has fewer fretting crowns and/or a forward height adjustment hole is nearer to a saddling interface.) The first sequence of fretting crowns may include the fourth fretting crown, a third fretting crown 120*c*, a second fretting crown 120*b*, and a first fretting crown 120*a*. A first forward height screw 195*a* may insert vertically into the first forward height adjustment hole and contact an upper support surface 235 of a support 150. The first forward height screw may extend vertically between the first fretting saddling member and the support, which may be under the first forward height adjustment hole. As the first fretting saddling member is longitudinally repositioned, the first forward height screw may also be longitudinally repositioned and may slide along and against the support while supporting the first fretting saddling member. A first rearward member end 132*a* of the first fretting saddling member may include a first rearward height adjustment hole 248*a*, which may be centered between the lateral member sides of the first fretting saddling member (and centered under the proto string), and which may be near the first saddling interface 134*a* of the first fretting saddling member. The first rearward height screw 196*a* may insert vertically into the first rearward height adjustment hole and contact the upper support surface. The first rearward height screw may extend vertically between the first fretting saddling member and the support, which may be under the first rearward height adjustment hole. The first forward height screw and the first rearward height screw may adjust the vertical position of the first fretting saddling member up and down, and they may tilt as the fretting saddling member tilts. As the first fretting saddling member is longitudinally repositioned, the first rearward height screw may also be longitudinally repositioned, and may slide along and against the support while supporting the first fretting saddling member. When the first forward height screw is actuated by turning, the first fretting saddling member may pivot on the first rearward height screw; the first rearward height screw may pivot against the support. When the first rearward height screw is actuated by turning, the first fretting saddling member may pivot on the first forward height screw; the first forward height screw may pivot against the support. The first forward height screw and first rearward height screw may adjust the vertical positions of the first forward member end and the first rearward member end. They may adjust the vertical positions of the first sequence of fretting crowns, the first saddling interface, and the rearward critical contact point of the proto string relative to the support, the body, and the neck, and may adjust the angle between the first sequence of fretting crowns and the proto string. The proto string may contact the first saddling interface at a critical contact point 116, and extend at a wrist fretable vertical distance above the first sequence of fretting crowns. The height screws may be headless set screws, though other forms may be used. A support screw hole 240 may be used to attach the support to the body with a support screw. Each of multiple fretting saddling members may include similar height screw holes and may be configured with similar height screws.

As illustrated in FIGS. 20 and 21, a first fretting saddling member 125*a* includes a forward member fastening slot 312 and a rearward member fastening slot 313, which are longitudinal through slots centered between the lateral member sides of the first fretting saddling member. The forward member fastening slot may be nearer to a first forward member end 131*a*, and the rearward member fastening slot may be nearer to the first rearward member end 132*a*. A forward upright fastener 201 may insert downward through the forward member fastening slot into a forward upright fastening opening 305 in an upper support surface 235 of a support 150 under the forward member fastening slot. A rearward upright fastener 202 may insert downward through the rearward member fastening slot into a rearward upright fastening opening 306 in the upper support surface under the rearward member fastening slot. A head of an upright fastener may seat in a recess 340 in a first upper member surface 128*a* of the first fretting saddling member; the recess may be above a respective member fastening slot. The forward upright fastening opening and rearward upright fastening opening may be longitudinally spaced and centered under a proto string 20*a*. The forward member fastening slot and the rearward member fastening slot may be centered under and aligned with the proto string. A member fastening slot and a respective upright fastening opening may be between a first forward height adjustment hole 247*a* and a first rearward height adjustment hole 248*a* in the first fretting saddling member. The first fretting saddling member (including the first saddling interface, a first string guide indentation, and the first sequence of fretting crowns) may be aligned with and centered under the proto string by the forward upright fastener, the rearward upright fastener, and the support. The first fretting saddling member may be centered under and aligned with the proto string at two longitudinally spaced points by i) the rearward upright fastener and the rearward upright fastening opening and ii)

the forward upright fastener and the forward upright fastening opening. The forward and rearward upright fasteners may remain stationary while the first fretting saddling member is repositioned; lateral guide surfaces of the forward member fastening slot and rearward member fastening slot may slide along the forward upright fastener and rearward upright fastener during adjustment of the longitudinal position or vertical position of the first fretting saddling member. With the fasteners in a non locking configuration, the vertical, longitudinal, and angular positions of the first fretting saddling member may be adjustable. The rearward upright fastener, without use of another fastener, may lock the vertical position, the longitudinal position, and the lateral position of the first fretting saddling member, and may lock the angle of the first sequence of fretting crowns to the proto string. The forward upright fastener, without the use of another fastener, may lock the vertical position, the longitudinal position, and the lateral position of the first fretting saddling member, and may lock the angle of the first sequence of fretting crowns to the proto string. Each upright fastener may lock the height screws against the support, and lock the fretting saddling member against a lateral guide surface of the support. The assembly may include a forward upright fastener, a rearward upright fastener, a forward upright fastening opening in the support, and a rearward upright fastening opening in the support for each of multiple fretting saddling members, which may each include a forward member fastening slot and a rearward member fastening slot. The assembly may include a second fretting saddling member 125*b* arranged with a deutero string 20*b*, and a fretting appendage 225 arranged with a trito string 20*c*. A fastening opening may be tapped into the material of the support.

In an alternative embodiment, a fretting saddling member may be configured with a member fastening slot for two upright fasteners or for one upright fastener.

Figure 22:
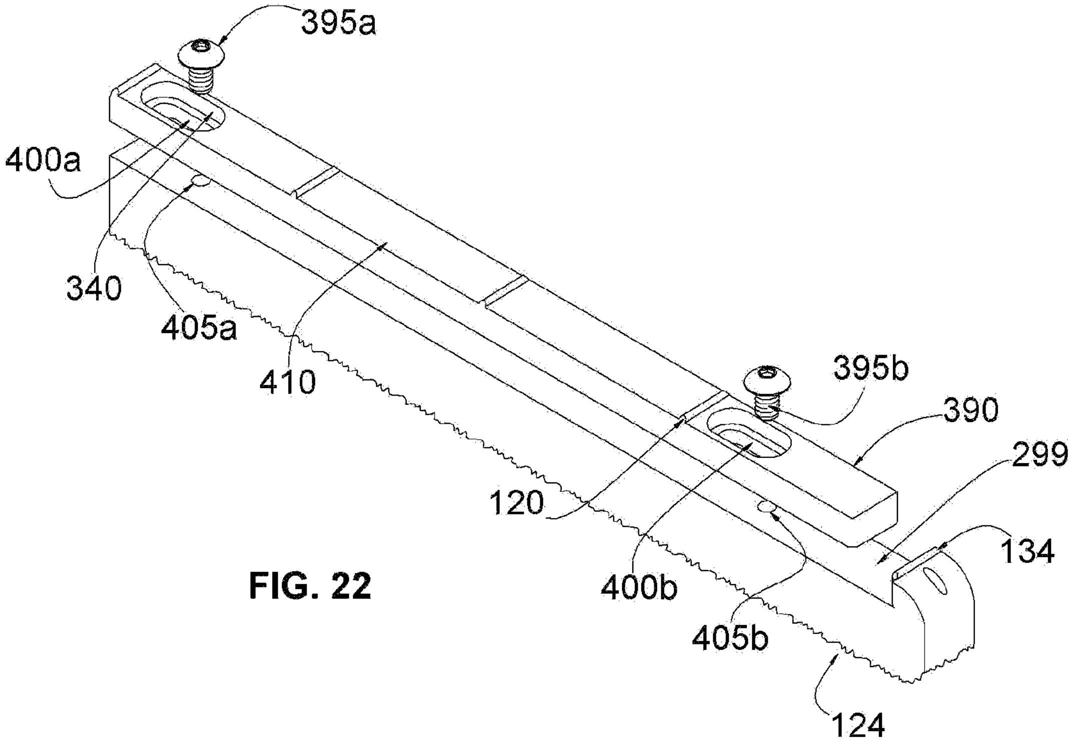
FIG. 22 illustrates a partial exploded view of a fretting saddling member, which includes a saddling member and an intonation block with fretting crowns.

As included in FIG. 22, a sequence of fretting crowns (including a fretting crown 120) may be located on an intonation block 390 that may adjustably couple to an upward facing guiding surface 299 of a saddling member 124, such that a longitudinal position of the intonation block is adjustable relative to a saddling interface 134 of the saddling member. The combination of the intonation block and the saddling member may be a fretting saddling member; the two may form a single block making up the fretting saddling member. An intonation block screw may insert through an intonation clamping slot in the intonation block and into an intonation clamping hole in the guiding surface. A head of the intonation clamping screw may seat in a recess 340 in an intonation block upper surface 410. The intonation block may be longitudinally elongated, and may have the same width as the saddling member. The intonation clamping slot may run longitudinally, allowing the intonation block to be adjusted longitudinally towards or away from the saddling interface of the saddling member. This may allow each fretting crown in a sequence of one, two, three, four, or more fretting crowns to be positioned at a distance from the saddling interface which is i) greater than a nominal oddment length respective to the intended interval of that fretting crown, ii) equal to a nominal oddment length respective to the intended interval of that fretting crown, or iii) less than a nominal oddment length respective to the intended interval of that fretting crown. The intonation block may include a forward intonation clamping slot 400*a* and a rearward intonation clamping slot 400*b*. The intonation block may be configured to slide longitudinally on the saddling member and lock in place with a forward intonation block screw 395*a* inserting through the forward intonation clamping slot into a forward intonation clamping hole 405*a* in the guiding surface of the saddling member, and a rearward intonation block screw 395*b* inserting through the rearward intonation clamping slot into a rearward intonation clamping hole 405*b* in the guiding surface. The two intonation clamping screws may maintain the alignment of the intonation block with the line of the string and with the saddling member. The repositionable intonation block may allow adjustable longitudinal positioning for intonation of the sequence of fretting crowns relative to the saddling interface. This fretting saddling member may be used as a testing device to determine positions of fretting crowns, or to enable personalized instrument setup. The saddling interface and/or a rearward critical contact point of a string on the saddling interface may remain coplanar with the sequence of fretting crowns during the longitudinal sliding of the intonation block on the guiding surface of the saddling member. The sequence of fretting crowns and the saddling interface may include a fingerboard matching angle.

Figure 23:
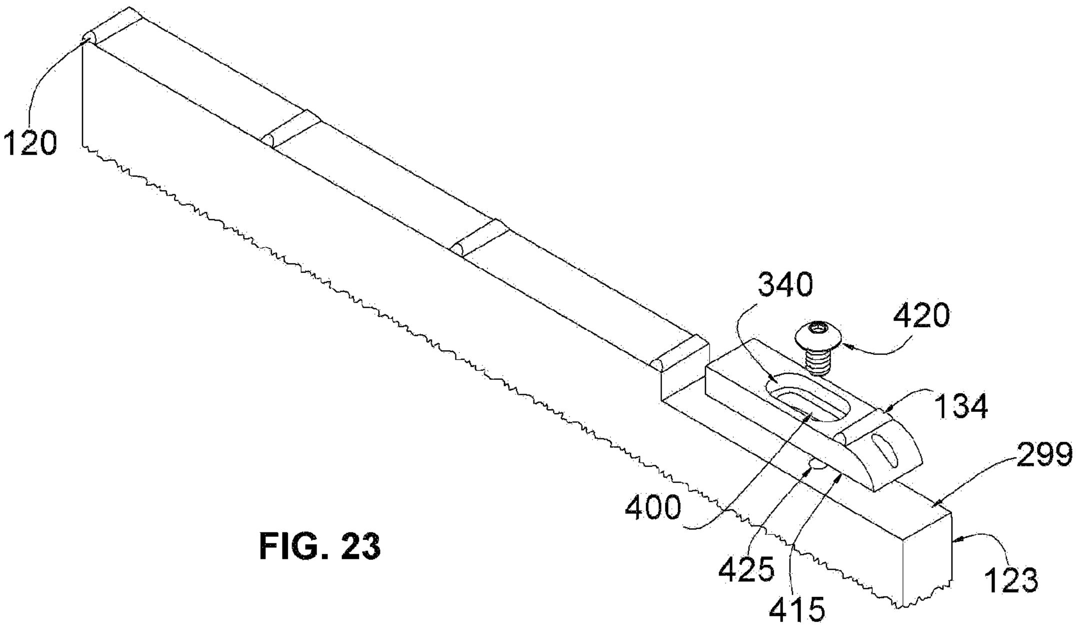
FIG. 23 illustrates a partial exploded view of a fretting saddling member, which includes a fretting member with fretting crowns and a saddle tab.

As illustrated in FIG. 23, a fretting saddling member is a combination of a saddling interface 134 on a longitudinally movable saddle tab 415 and a fretting member 123, which includes a sequence of fretting crowns (including a fretting crown 120); the longitudinal position of the saddle tab is adjustable. The saddle tab and the fretting member in combination may form a block making up the fretting saddling member. The saddle tab may contact an upward facing guiding surface 299 of the fretting member. An intonation clamping slot 400 in the saddle tab may run longitudinally, and may allow a saddle clamping screw 420 to insert through the intonation clamping slot into a saddle clamping hole 425 in the guiding surface. The saddle clamping screw may have a head, which may seat in a recess 340 above the intonation clamping slot in the saddle tab. The saddle clamping screw may, in a non locking configuration, allow the saddle tab to adjustably slide longitudinally such that each fretting crown in the sequence of fretting crowns may be at a distance from the saddling interface which is i) greater than a nominal oddment length respective to the intended interval of that fretting crown, ii) equal to a nominal oddment length respective to the intended interval of that fretting crown, or iii) less than a nominal oddment length respective to the intended interval of that fretting crown. The saddle clamping screw may have a locking configuration that locks the position of the saddle tab, and thus the saddling interface. This may allow adjustable longitudinal positioning for intonation of the sequence of fretting crowns relative to the saddling interface. The saddling interface and/or a rearward critical contact point of a string on the saddling interface may remain coplanar with the sequence of fretting crowns during the longitudinal sliding of the saddle tab on the guiding surface of the fretting member. The sequence of fretting crowns and the saddling interface may include a fingerboard matching angle. In alternative embodiments, any fretting saddling member may include a saddle tab and a fretting member.

Figure 24:
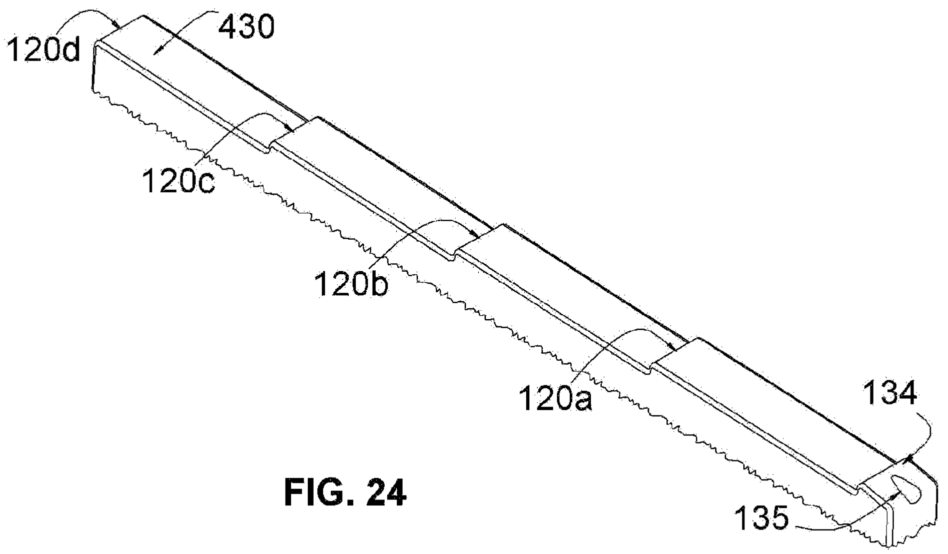
FIG. 24 illustrates a partial isometric view of a fretting saddling member.
Figure 25:
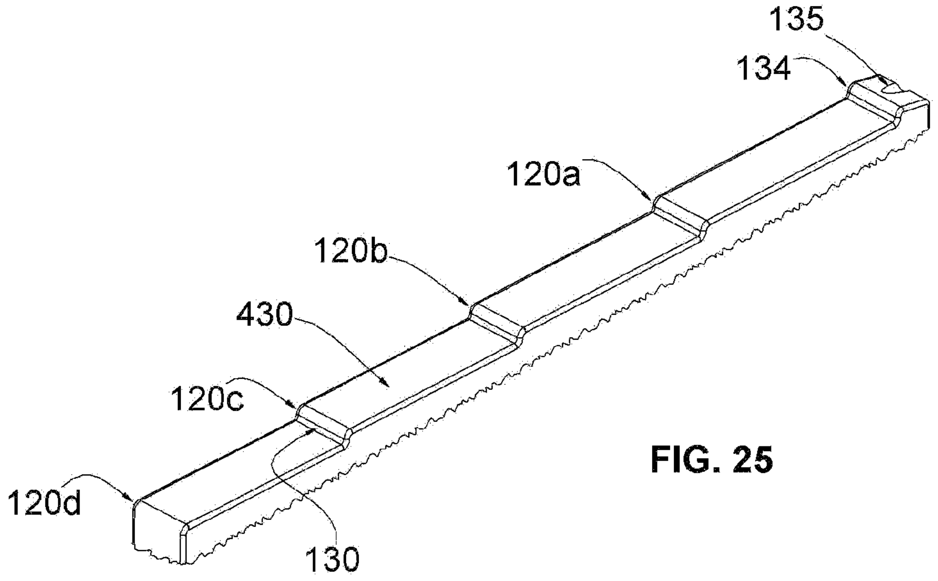

As illustrated in FIGS. 24 and 25, a fretting saddling member includes a first fretting crown 120*a*, a second fretting crown 120*b*, a third fretting crown 120*c*, and a fourth fretting crown 120*d*. Each fretting crown may be a rounded edge where an upward facing face 430 of an upper member surface and a forward facing member surface 130 meet. The upper surface may include multiple upward facing faces, which may be separated by multiple forward facing member surfaces. A lateral end of a fretting crown may be a forward end of an edge of an upwards facing face. A saddling interface 134 may be a rounded edge where an upward facing face of the upper member surface (this upwards facing face may transition to the clearance surface) meets a forward facing member surface. A string guide indentation 135 in the clearance surface may be rearward of the saddling interface. A fretting crown or saddling interface of this form may be machined into the material of a fretting saddling member, or otherwise formed by shaping a material. The sequence of fretting crowns and saddling interface may include a fingerboard matching angle. In additional or alternative embodiments, any fretting saddling member may include a sequence of one, two, three, four, or more fretting crowns and a saddling interface of these forms.

Figure 26:
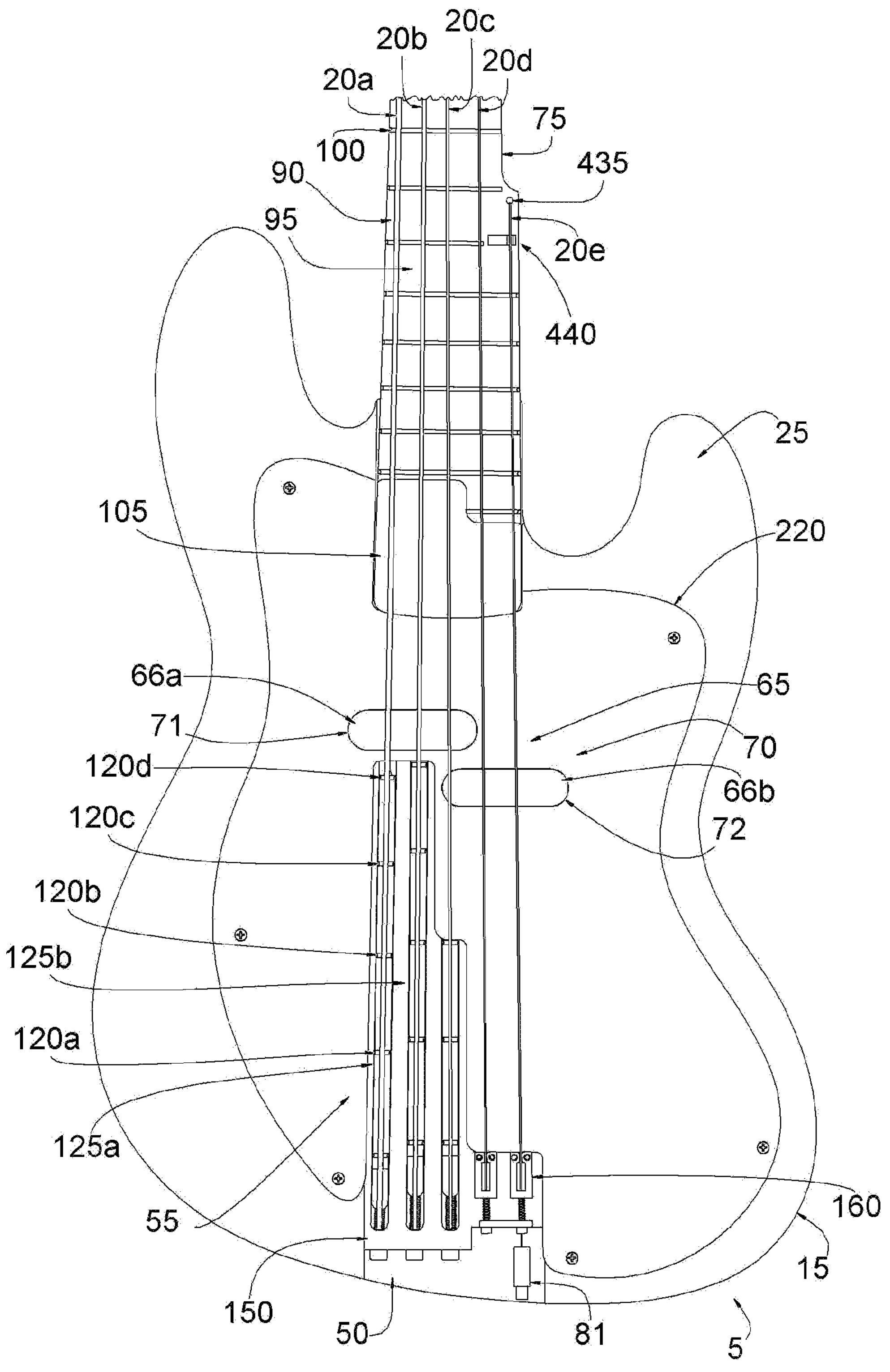
FIG. 26 illustrates an orthographic view of an instrument and an assembly, according to some embodiments.
Figure 27:
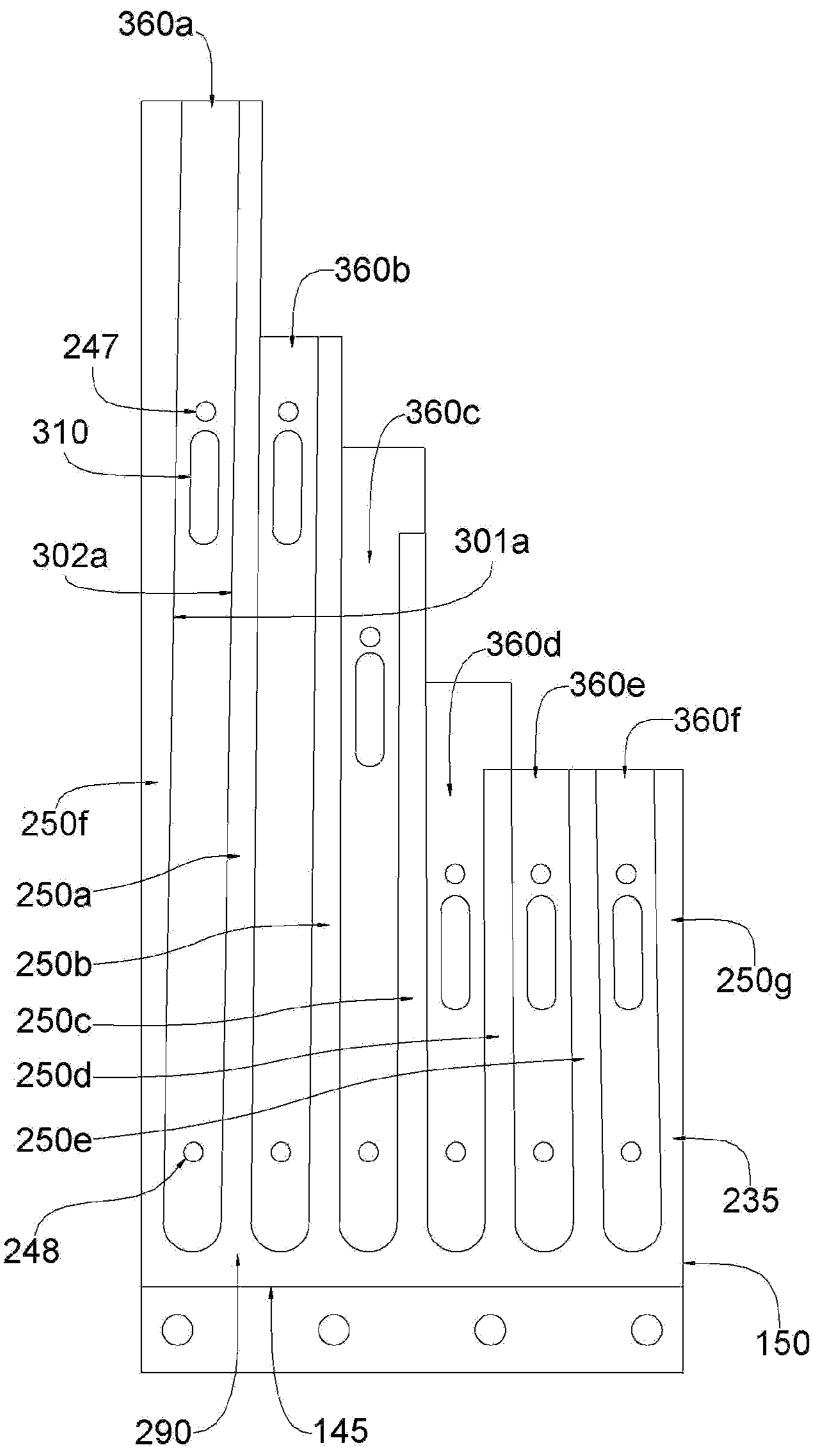
FIG. 27 illustrates an orthographic top view of a support.

As illustrated in FIG. 26, an accessibility surface 105 provides space for the fingers and thumb when a player is wrist fretting at a first fretting crown 120*a*, a second fretting crown 120*b*, a third fretting crown 120*c*, or a fourth fretting crown 120*d* of a sequence of fretting crowns. In these picking hand positions, the thumb and fingers may be above a fingerboard 90, which may be on the neck 75. Contact with the fingerboard or a fingerboard fret 100 by the picking hand fingers and thumb may make plucking strings difficult for some players; this may depend on hand size and finger length. The accessibility surface may be at a greater vertical distance from strings 20 than a fret attachment surface 95. The accessibility surface may be smooth, and may be flat or gently curved. The accessibility surface may prevent the thumb and fingers of the picking hand from colliding with the fingerboard or fingerboard frets. The accessibility surface may begin rearward of one or more rearmost fingerboard frets. (Depending on the needs of a player, a rearmost fret may be a twelfth, thirteenth, fourteenth, fifteenth, sixteenth, seventeenth, eighteenth, nineteenth, twentieth, twenty-first, twenty-second, twenty-third, or twenty-fourth, or other fingerboard fret.) A distal rearmost eighteenth fingerboard fret may extend only part of the way across the neck. A portion of the accessibility surface may be proximal to this fingerboard fret and forward from a seventeenth fingerboard fret. In an alternative embodiment, an accessibility surface may be omitted.

As illustrated in FIG. 26, a pickup 65 is mounted under strings 20, forward of a fretting saddling member 125 and rearward of fingerboard frets 100 on a fingerboard 90. When the string is wrist fretted and plucked, a rearward longitudinal end of a sounding length of the string may be nearer to the pickup than when the open string is plucked. This may produce a brightening of the sound that some players may enjoy; this effect may get stronger as the pickup is mounted nearer to a sequence of fretting crowns, which may include a fourth fretting crown 120*d*. Strings, the pickup, and a support may be grounded with a ground wire. A pickup may be vertically adjustable. In an alternative embodiment, if a pickup is mounted nearer to the fingerboard, the tone brightening effect may be less noticeable; this may produce a mellower tone that some players may enjoy. In an alternative embodiment, to take advantage of both sounds, a first pickup may be mounted next to the fretting saddling member, and a second pickup may be mounted next to the neck. In an alternative embodiment, a pickup may be omitted, or a third pickup may be added. In an alternative embodiment, pickup may be mounted in a variety of positions typical of electric guitars and bass guitars.

As illustrated in FIG. 26, a proximal lateral opening 71 and a distal lateral opening 72 of a pickup opening 70 in a pickguard 220 accommodate a first sequence of fretting crowns (on a first fretting saddling member 125*a*) including a first fretting crown 120*a*, a second fretting crown 120*b*, a third fretting crown 120*c*, and a fourth fretting crown 120*d* under a proto string 20*a*, which is a laterally outermost proximal string. The proto string may contact a saddling interface on the first fretting saddling member and extend at a wrist fretable vertical distance above the first sequence of fretting crowns. A second sequence of fretting crowns (on a second fretting saddling member 125*b*) may be positioned under a deutero string 20*b*, which may be consecutive to the proto string. A pickup 65 may include a proximal lateral coil 66*a* inserted into the proximal lateral opening, and may include a distal lateral coil 66*b* inserted into the distal lateral opening. The proximal lateral opening and proximal lateral coil may be longitudinally farther forward than the distal lateral opening and distal lateral coil. The distal lateral opening of the first pickup opening may be distal to the first fretting saddling member and second fretting saddling member. The proximal lateral opening and the proximal lateral coil may be under the proto string and the deutero string. The distal lateral opening and the distal lateral coil may be under a tetarto string 20*d*, and a pempto string 20*e*, which may be a laterally outermost distal string. In an alternative embodiment, the proximal lateral coil and distal lateral coil may be under different subsets of a varied number of strings. In an alternative embodiment, the number of fretting crowns in each sequence may be reduced, and the pickup may be nearer to the saddling interfaces As illustrated in FIG. 26, an assembly 55 includes a pickguard 220. Pickguard screws may couple the pickguard to a top 25 of a body 15 of an instrument 5 through pickguard screw holes of the pickguard. The pickguard may extend over a body cavity 50 of the body. A support 150 may be coupled to a pickguard. A first fretting saddling member 125*a* and a second fretting saddling member 125*b* may be coupled to the support. A pickguard may include a pickup opening 70. The pickguard and the support may establish positional relationships of the first fretting saddling member, the second fretting saddling member, the pickup opening, a pickup, a proto string 20*a*, and a deutero string 20*b*.

As illustrated in FIG. 26, a headless tuning machine 81 is positioned on the body 15 as a part of an assembly 55, rearward of a saddle 160, tensioning a pempto string 20*e*, which is the laterally outermost distal string; this string may not require a tuning machine on a headstock. A string anchor 435, for the laterally outermost distal string, may be attached to the neck 75, longitudinally forward of the first fingerboard fret and longitudinally rearward of the rearmost fingerboard fret. Forward of the string anchor, a mini nut 440 for the laterally outermost distal string may be attached to the fingerboard 90. In an alternative embodiment, headless tuners may be used with any string on an instrument, and a headstock may be omitted.

As illustrated in FIG. 26, a first fretting saddling member 125*a* for a proto string 20*a* inserts into a first channel in a support 150. A second fretting saddling member 125*b* for a deutero string 20*b* may insert into a second channel in the support. A third fretting saddling member for a trito string 20*c* may insert into a third channel in the support. Each channel may be parallel with the line of its respective string. A tetarto string 20*d* and a pempto string 20*e* may each contact a saddle 160 on the support. The instrument may have a five string bass guitar form.

As illustrated in FIGS. 27-31, a support 150 includes a channel 360. Channels in the support may be separated by barriers 250. A laterally outermost proximal barrier 250*f* may be laterally proximal to a laterally outermost proximal string, which may be a proto string 20*a*. A proto-deutero barrier 250*a* may be laterally between a proto string and a deutero string 20*b*. A deutero-trito barrier 250*b* may be laterally between the deutero string and a trito string 20*c*. A trito-tetarto barrier 250*c* may be laterally between the trito string and a tetarto string 20*d*. A tetarto-pempto barrier 250*d* may be laterally between the tetarto string and a pempto string 20*e*. A pempto-hecto barrier 250*e* may be laterally between the pempto string and a hecto string 20*f*. A laterally outermost distal barrier 250*g* may be laterally distal to the hecto string. A rearward barrier end 290 of each barrier may connect to a rear wall 145. A barrier side of the laterally outermost proximal barrier and a barrier side of the proto-deutero barrier may form a first proximal lateral guide surface 301*a* and a first distal lateral guide surface 302*a* of a longitudinal slot in the form of a first channel 360*a* included by the support. The first channel may be centered under and aligned with the proto string. A barrier side of the proto-deutero barrier and a barrier side of the deutero-trito barrier may form a second proximal lateral guide surface and a second distal lateral guide surface of a longitudinal slot in the form of a second channel 360*b* included by the support. The second channel may be centered under and aligned with the deutero string. A barrier side of the deutero-trito barrier and a barrier side of the trito-tetarto barrier may form a third proximal lateral guide surface and a third distal lateral guide surface of a longitudinal slot in the form of a third channel 360*c* included by the support. The third channel may be centered under and aligned with the trito string. A barrier side of the trito-tetarto barrier and a barrier side of the tetarto-pempto barrier may form a fourth proximal lateral guide surface and a fourth distal lateral guide surface of a longitudinal slot in the form of a fourth channel 360*d* included by the support. The fourth channel may be centered under and aligned with the tetarto string. A barrier side of the tetarto-pempto barrier and a barrier side of the pempto-hecto barrier may form a fifth proximal lateral guide surface and a fifth distal lateral guide surface of a longitudinal slot in the form of a fifth channel 360*e* included by the support. The fifth channel may be aligned with and centered under the pempto string. A barrier side of the pempto-hecto barrier and a barrier side of the laterally outermost distal barrier may form a sixth proximal lateral guide surface and a sixth distal lateral guide surface of a longitudinal slot in the form of a sixth channel 360*f* included by the support. The sixth channel may be centered under and aligned with the hecto string. The support may include a surface at the bottom of each channel. The support may be attached to the instrument 5 in a body cavity 50 of a body 15. Each barrier side, which is part of a channel, may extend longitudinally forward from the rear wall, and extend downward (in the support in the body cavity), such that the channel runs longitudinally (within the body cavity) below the vertical level of a top 25 of the body. Each barrier may extend longitudinally and may be tapered such that it is slightly laterally wider at a rearward barrier end than at a forward barrier end, allowing sliding longitudinal movement of a fretting saddling member 125 in contact with the barriers. Each channel may be of equal lateral width along its length, and may converge with other channels in the direction of the nut. The proximal lateral guide surface and the distal lateral guide surface of each channel may be parallel planes. The first proximal lateral guide surface and the first distal lateral guide surface of the first channel may contact a first proximal lateral member side and a first distal lateral member side of a first fretting saddling member 125*a*. The second proximal lateral guide surface and the second distal lateral guide surface of the second channel may contact a second proximal lateral member side and a second distal lateral member side of a second fretting saddling member 125*b*. The third proximal lateral guide surface and the third distal lateral guide surface of the third channel may contact a third proximal lateral member side and a third distal lateral member side of a third fretting saddling member 125*c*. The fourth proximal lateral guide surface and the fourth distal lateral guide surface of the fourth channel may contact a fourth proximal lateral member side and a fourth distal lateral member side of a fourth fretting saddling member 125*d*. The fifth proximal lateral guide surface and the fifth distal lateral guide surface of the fifth channel may contact a fifth proximal lateral member side and a fifth distal lateral member side of a fifth fretting saddling member 125*e*. The sixth proximal lateral guide surface and the sixth distal lateral guide surface of the sixth channel may contact a sixth proximal lateral member side and a sixth distal lateral member side of a saddling member 124, which may act as a saddle. Each fretting saddling member may insert downward into its respective channel. An upper support surface 235 may be even with the top of the body, and an upper member surface 128 of a fretting saddling member may be vertically higher than the top and the upper support surface. In an alternative embodiment, the saddling member may be combined with an intonation block (to make a sixth fretting saddling member) or replaced by a sixth fretting saddling member similar to the fifth fretting saddling member.

Figure 28:
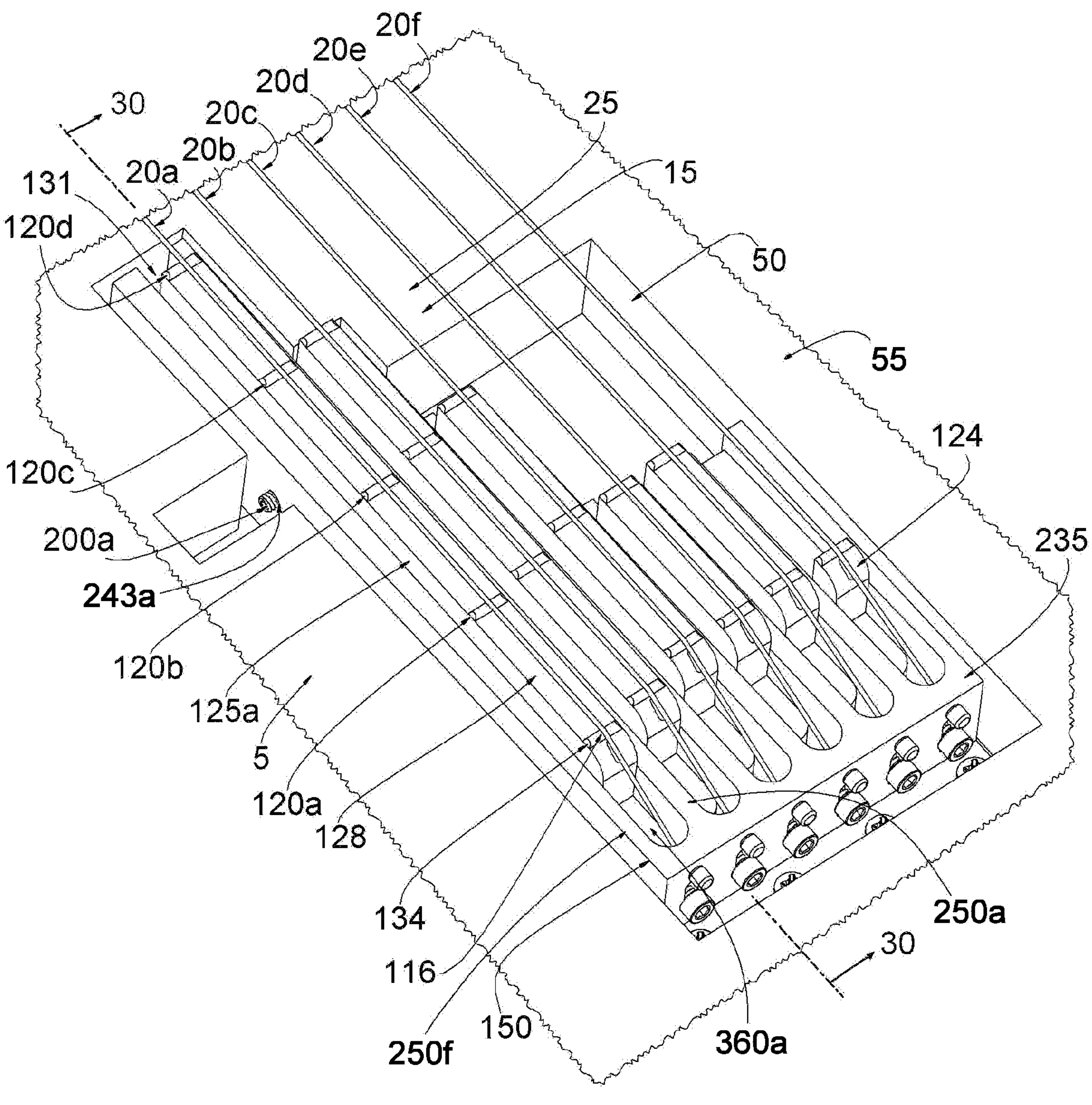

As illustrated in FIG. 28, a proto string 20*a*, which may be a laterally outermost proximal string, a deutero string 20*b*, a trito string 20*c*, a tetarto string 20*d*, and a pempto string 20*e* may be wrist fretting strings. A hecto string 20*f* may be a single direction fretting string.

Figure 29:
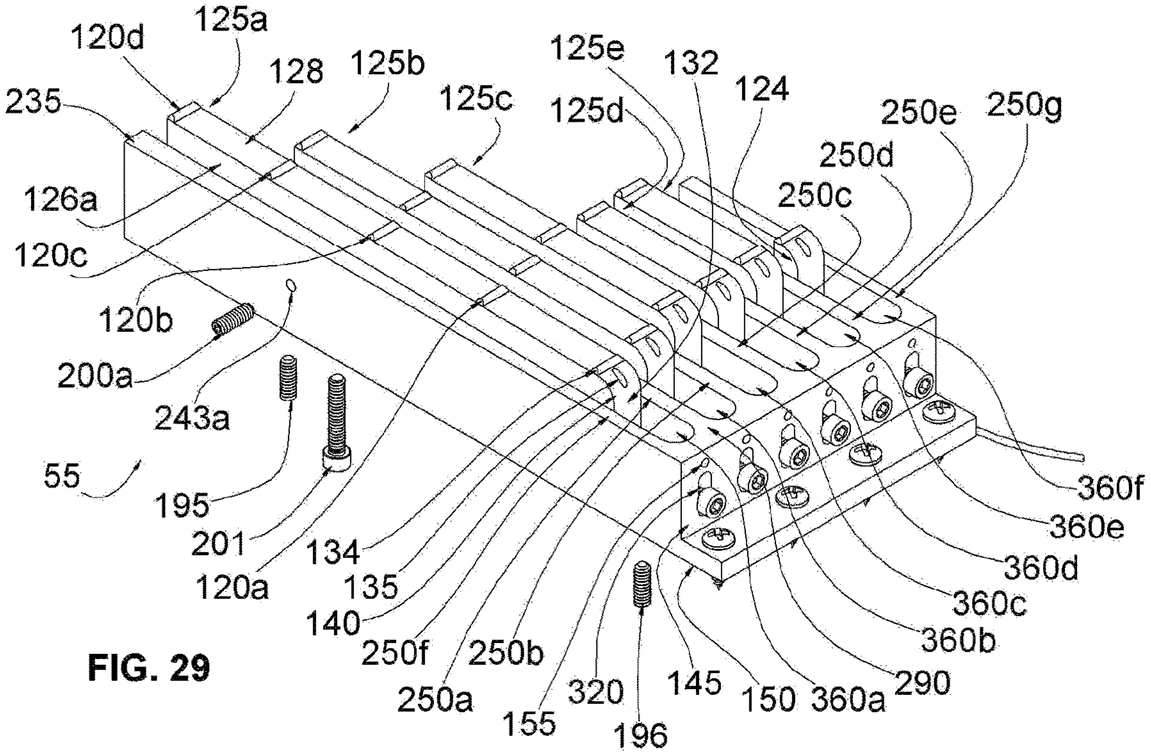
Figure 30:
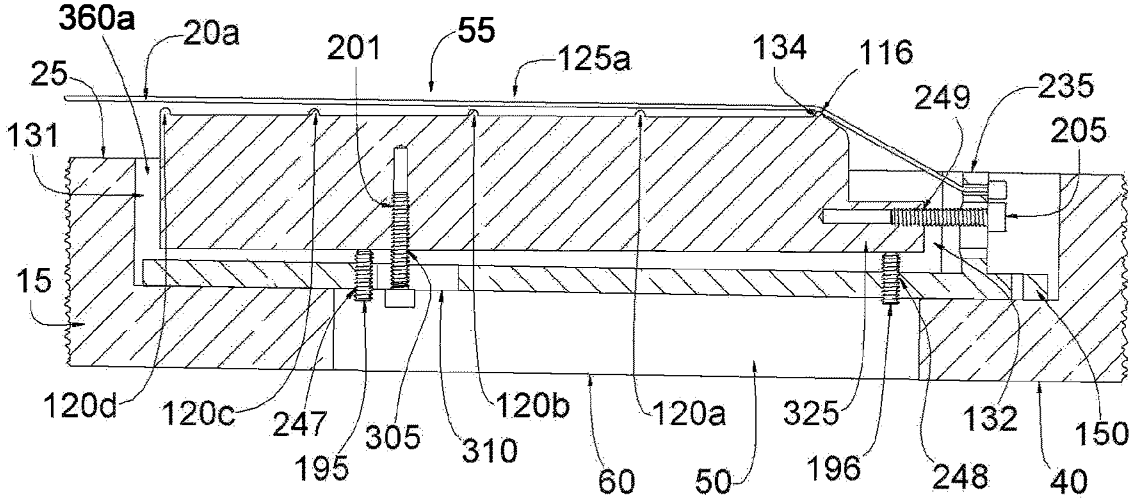

As illustrated in FIGS. 28 and 29, a laterally outermost proximal barrier 250*f* of a first channel 360*a* may include a lateral fastening opening in the form of a first side screw hole 243*a*. A first lateral fastener 200*a*, which may be a side screw, may insert into the first side screw hole, and contact a first proximal lateral member side 126*a* of a first fretting saddling member 125*a* respective to a proto string. In a non locking configuration, the first lateral fastener may allow longitudinal, vertical, and angular positional adjustment of the first fretting saddling member. In a locking configuration, the first lateral fastener may lock the first fretting saddling member against a first distal lateral guide surface of the first channel of a support 150 by pushing against the first fretting saddling member in a lateral direction. The first lateral fastener may lock the longitudinal position, the lateral position, the vertical position, and the angular position of the first fretting saddling member.

As illustrated in FIGS. 28 and 29, a saddling member 124 (positioned for use with a laterally outermost distal string) without an intonation block may be used as a saddle. In alternative embodiments, any fretting saddling member may include a saddling member and/or an intonation block.

Figure 31:
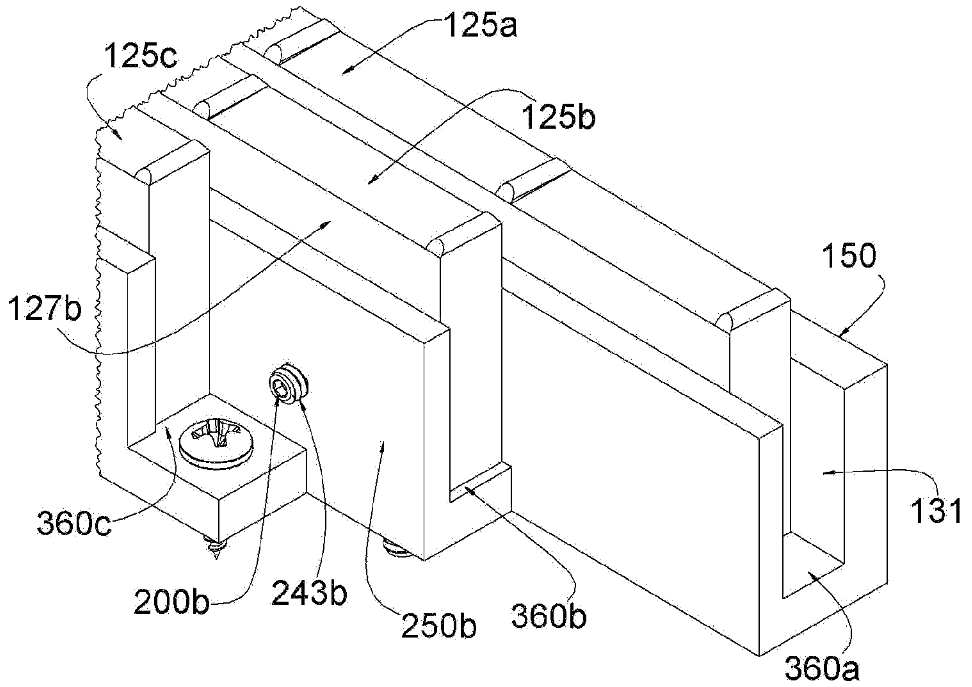

As illustrated in FIG. 31, a deutero-trito barrier 250*b* between a second channel 360*b* and a third channel 360*c* includes a lateral fastening opening in the form of a second side screw hole 243*b*. A second lateral fastener 200*b*, which may be a side screw, may insert into the second side screw hole, and contact a second distal lateral member side 127*b* of a second fretting saddling member 125*b* respective to a deutero string. In a non locking configuration, the second lateral fastener may allow longitudinal, vertical, and angular positional adjustment of the second fretting saddling member. In a locking configuration, the second lateral fastener may lock the second fretting saddling member against a second proximal lateral guide surface of the second channel of a support 150 by pushing against the second fretting saddling member in a lateral direction. The second lateral fastener may lock the longitudinal position, the lateral position, the vertical position, and the angular position of the second fretting saddling member. In an alternative embodiment, an assembly may include a lateral fastener and a side screw hole for any fretting saddling member.

As illustrated in FIGS. 27-31, a support 150 includes a channel 360. A fretting saddling member 125 of an assembly 55 may be inserted into the channel. The fretting saddling member may have parallel lateral member sides which extend longitudinally and vertically. In longitudinal order, centered under a respective string (and centered in the channel), a channel may include: a forward height adjustment hole 247, a forward base fastening slot 310 (which may be aligned with the respective string 20), and a rearward height adjustment hole 248. The rear wall behind the channel may include a positioning slot 320 under a stringing opening 155, which may be aligned with the respective string. A forward height screw 195 and a rearward height screw 196 may insert from under the support into the forward height adjustment hole and the rear height adjustment hole and contact a downward surface of the fretting saddling member. A forward upright fastener 201 may insert upward through the forward base fastening slot (which may be a longitudinally elongated through hole in the bottom of the channel) into a forward upright fastening opening 305 in the downward surface of the fretting saddling member. The forward upright fastener and height screws may be accessible through an aperture 60 of a body cavity 50 at the back 40. A positioning screw 205 may insert through the positioning slot into a positioning hole 249 in a positioning projection 325 at a rearward member end 132 of the fretting saddling member. The respective string may insert into the stringing opening, contact a string guide indentation 135 in a clearance surface 140, contact and be directed by the saddling interface 134 at a rearward critical contact point 116, and extend at a wrist fretable vertical distance above a first fretting crown 120*a*, a second fretting crown 120*b*, a third fretting crown 120*c*, and a fourth fretting crown 120*d*, of a sequence of fretting crowns on the upper surface of the fretting saddling member, and extend above a fingerboard to a nut. The fretting saddling member may include the string guide indentation, the clearance surface, and the saddling interface. With a lateral fastener and the forward upright fastener in a non locking configuration the forward height screw and the rearward height screw may adjust a vertical position of a forward member end 131 and a vertical position of the rearward member end, while the channel may prevent lateral movement of the fretting saddling member. The height screws may adjust the angle of the sequence of fretting crowns to the string. The positioning screw may adjust a longitudinal position of the fretting saddling member, or, with the positioning screw removed, the fretting saddling member may be longitudinally positioned by sliding it by hand. Each fastener may independently lock the vertical, longitudinal, lateral, and angular position of its respective fretting saddling member (even in a configuration with the positioning screw omitted). The forward upright fastener may lock the fretting saddling member against the height screws and against a lateral guide surface of the channel. In an alternative embodiment, the positioning screw may be omitted (the positioning projection and position hole may also be omitted), and the fretting saddling member may be longitudinally positioned by sliding it by hand.

As illustrated in FIGS. 28 and 29, a first sequence of fretting crowns of a first fretting saddling member 125*a* includes four fretting crowns. The first fretting saddling member may be used with a proto string 20*a*. A second sequence of fretting crowns of a second fretting saddling member 125*b* may include three fretting crowns for use with a deutero string 20*b*. A third sequence of fretting crowns of a third fretting saddling member 125*c* may include two fretting crowns for use with a trito string 20*c*. A fourth sequence of fretting crowns of a fourth fretting saddling member 125*d* may include one fretting crown and for use with a tetarto string 20*d*. A fifth sequence of fretting crowns of a fifth fretting saddling member 125*e*, for use with a pempto string 20*e*, may include one fretting crown. In the sequences of fretting crowns (which may have different numbers of fretting crowns), a first fretting crown 120*a*, a second fretting crown 120*b*, a third fretting crown 120*c*, and a fourth fretting crown 120*d* may be respectively positioned to define wrist fretable notes at the intervals of a semitone, a whole step, a minor third, and a major third above the open note of a respective string. For intonation correction, each fretting crown 120 in a sequence of fretting crowns may be at a distance from the rearward critical contact point of the respective string on the respective saddling interface which is i) greater than a nominal oddment length respective to the intended note of the fretting crown, ii) equal to a nominal oddment length respective to the intended note of the fretting crown, or iii) less than a nominal oddment length respective to the intended note of the fretting crown. In an alternative embodiment, a saddling member 124 for a hecto string 20*f* may alternatively be configured with an intonation block, as a fretting saddling member with one fretting crown. In an alternative embodiment, some strings may be configured with plain saddles. In an alternative embodiment, a fretting saddling member may have a different number of fretting crowns than described above.

Figure 32:
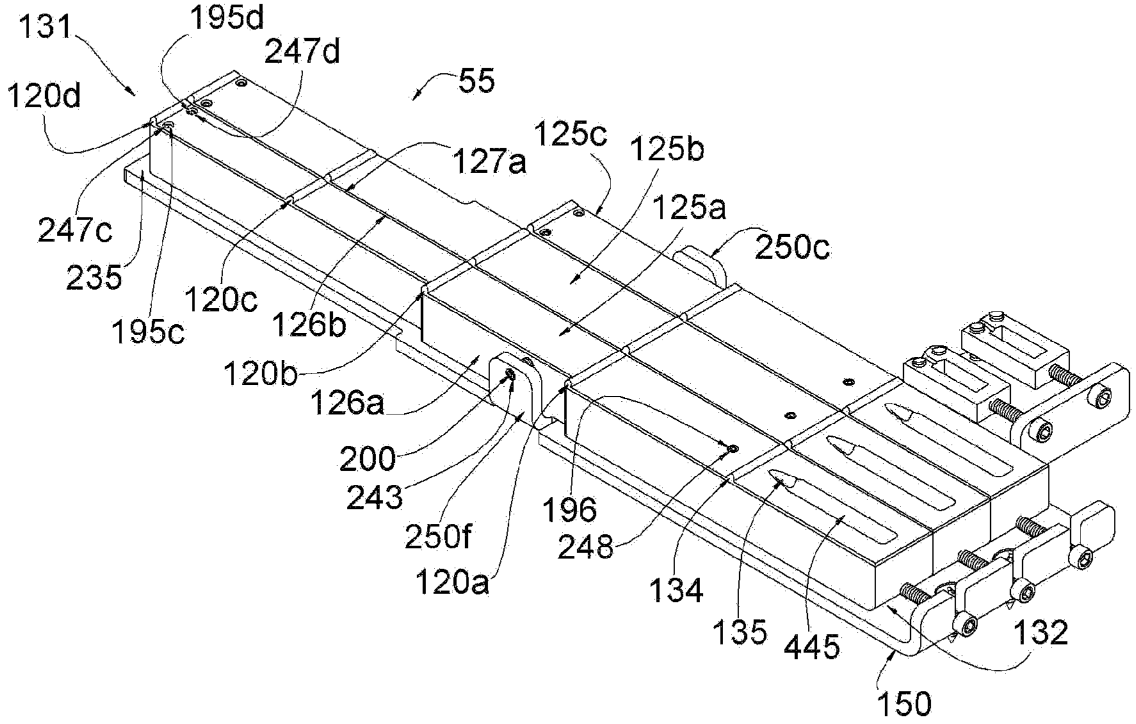
FIG. 32 illustrates a partial isometric view of an assembly.

As illustrated in FIG. 32, an assembly 55 may include two laterally spaced forward height screws 195 for a first fretting saddling member 125*a*. A laterally proximal forward height adjustment hole 247*c* and a laterally distal forward height adjustment hole 247*d* (in the first fretting saddling member) may allow a laterally proximal forward height screw 195*c* and a laterally distal forward height screw 195*d* to insert. The forward height adjustment holes may be in a forward member end 131 of the first fretting saddling member. The two forward height screws may extend between the fretting saddling member and an upper support surface 235 of a support 150, allowing vertical repositioning of the forward member end (relative to the body, the support, and the string), and allowing rotational positioning of the first fretting saddling member around an axis parallel with a proto string. The first fretting saddling member may include a rearward height adjustment hole 248 and into which a rearward height screw 196 may insert, allowing adjustment of the vertical position of a rearward member end 132 relative to the body, the support, and the neck. The first fretting saddling member may include a string guide indentation 135 in a clearance surface. A string slot 445 in the clearance surface of the first fretting saddling member may allow the proto string to insert from underneath, through the fretting saddling member. The proto string may insert through a stringing opening in the support under the first fretting saddling member, and a ball end may seat under the support. The proto string may contact and be directed by a saddling interface 134 at a rearward critical contact point, and extend at a wrist fretable vertical distance above a first fretting crown 120*a*, a second fretting crown 120*b*, a third fretting crown 120*c*, and a fourth fretting crown 120*d* of a first sequence of fretting crowns, above a fingerboard to a nut. Each fretting saddling member may include three height adjustment holes similar to those of the first fretting saddling member.

As may be included in FIG. 32, a lower support surface of a support 150 may mount on a top of a body. A first fretting saddling member 125*a* for a proto string, a second fretting saddling member 125*b* for a deutero string, and a third fretting saddling member 125*c* for a trito string, may each be positioned on an upper support surface 235 of the support. A first distal lateral member side 127*a* of the first fretting saddling member may contact a second proximal lateral member side 126*b* of the second fretting saddling member. A second distal lateral member side of the second fretting saddling member may contact a third proximal lateral member side of the third fretting saddling member. A laterally outermost proximal barrier 250*f* proximal to the first fretting saddling member may include a side screw hole 243 and into which a lateral fastener 200 may insert, contacting the first proximal lateral member side 126*a* of the first fretting saddling member and pushing the third distal lateral member side of the third fretting saddling member against a trito-tetarto barrier 250*c*. With the lateral fastener in a non locking configuration, the lateral member sides of the fretting saddling members may slide against one another during longitudinal and vertical adjustment of the positions of the fretting saddling members using the height screws and the positioning screws. Each fretting saddling member may be longitudinally adjustable in parallel with a centerline of the neck and substantially parallel with the line of its respective string. The string respective to a fretting saddling member may be substantially centered relative to and at a wrist fretable vertical distance above the sequence of fretting crowns on that fretting saddling member. The lateral fastener may lock the vertical, longitudinal, lateral, and angular positions of the fretting saddling members by locking the lateral member sides of the fretting saddling members against one another and locking them against the trito-tetarto barrier. The lateral fastener may be threaded. As long as the lateral fastener is inserted and at least loosely tightened, a fretting saddling member may be adjusted with and supported by a single forward height screw 195 and a rearward height screw 196, and a second forward height screw may be omitted.

Figure 33:
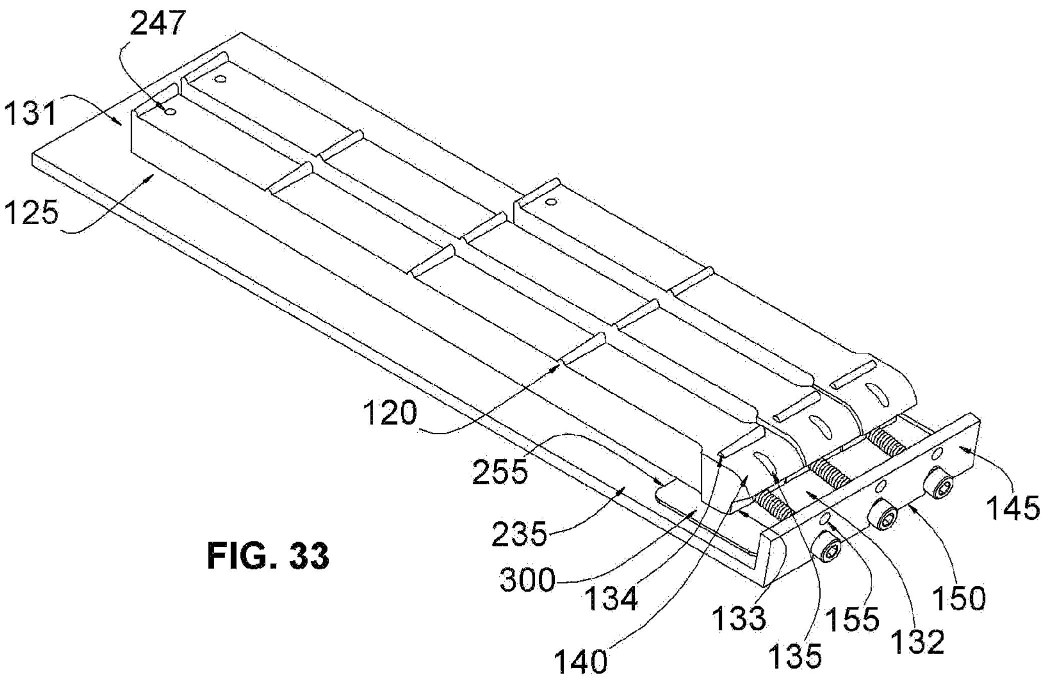
FIG. 33 illustrates a partial isometric view of an assembly.
Figure 34:
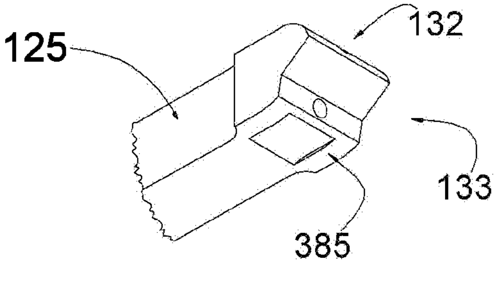

As illustrated in FIGS. 33 and 34, a rearward member end 132 of a fretting saddling member 125 may include a pivot 133. The pivot may be curved like a surface of a cylinder, and the saddling interface 134 may have a position corresponding to a central axis of that cylinder. A vertical position of the forward member end 131 may be adjustable relative to a string, a support 150, and a body, by pivoting the fretting saddling member on the pivot. The forward member end may be pivoted up or down to adjust the sequence of fretting crowns closer to or farther from the string, without changing the vertical position of the saddling interface or (because of its central position relative to the curved surface of the pivot). This may adjust the angle of a sequence of fretting crowns (including a fretting crown 120) on the fretting saddling member to the string, without changing the vertical position of a rearward critical contact point of the string on the saddling interface. A forward height screw may insert into a forward height adjustment hole 247 in the forward member end and contact a planar upper support surface 235 of the support. A lower support surface may contact a top of the body, to which the support may be attached. The fretting saddling member may be supported on the support on the body by the pivot, and may be positioned on the body on the support. The support may include a shim 255, which may adjust a vertical position of the rearward member end. The pivot may slide along the shim of the support (or alternatively on the upper support surface with the shim removed) during longitudinal adjustment of the fretting saddling member. The pivot may include two lateral contact projections 385 in the form of lateral rims in contact with a support at two laterally spaced points. The lateral contact projections of the pivot may contact the support at two or more points along a line perpendicular to the line of the string. A lower portion of the rearward member end of the fretting saddling member may include the pivot. The width of a pivot may prevent rotation of the fretting saddling member around an axis parallel with the string. The forward height screw may pivot the fretting saddling member on the pivot. A stringing opening 155 in the support may allow attachment of a string, which may contact a string guide indentation 135 of a clearance surface 140, contact the saddling interface, and extend at a wrist fretable vertical distance above the sequence of fretting crowns on the fretting saddling member. A rear wall 145, which may be above the top of the body, may include a positioning slot for a positioning screw, which may insert into a positioning hole in the fretting saddling member. The stringing opening may be above the positioning slot in the rear wall. Each fretting saddling member may include a pivot, which may contact the support at two points along a line perpendicular to the line of a respective string. Although not visible in the figures, an upright fastener may insert through a base fastening slot aligned with and centered under a string into an upright fastening opening in a fretting saddling member, and lock the position of the fretting saddling member. The upright fastener may lock the pivot against the upper support surface, or against a planar upward facing guide surface of the shim, and may lock the forward height screw against the support.

As illustrated in FIGS. 33 and 34, a fretting saddling member 125 may include a pivot 133. A shim 255, under a fretting saddling member 125, may contact an upper support surface 235 of a support 150. A vertical position of a rearward member end 132 (or, in an alternative embodiment of a forward member end 131 or of the entire fretting saddling member) may be adjustable with the shim. A shim may include an upward facing guide surface 300, which acts as a surface of a support. A shim may be used as an alternative to a rearward height screw. In an alternative embodiment, a height screw may contact a shim. A shim may alternatively be positionable between a support and a body. In an alternative embodiment, a vertical position of a support may be adjustable with a shim, thus adjusting the vertical position of a forward member end, a rearward member end, or both. In an alternative embodiment, multiple shims may be stacked for vertical position adjustment of a fretting saddling member, a fretting appendage, or a support. In an alternative embodiment, a shim in the form of a wedge may be used for vertical adjustment, and a sliding action of a shim may be used for vertical adjustment. In an alternative embodiment, a shim may include a hole or slot allowing a fastener or height screw to insert through the shim. In an alternative embodiment, a support may be vertically repositionable using screws and/or other hardware connected to the body. In an alternative embodiment, a separate bridge may be supplied for a trito, tetarto, or a pempto string.

Figure 35:
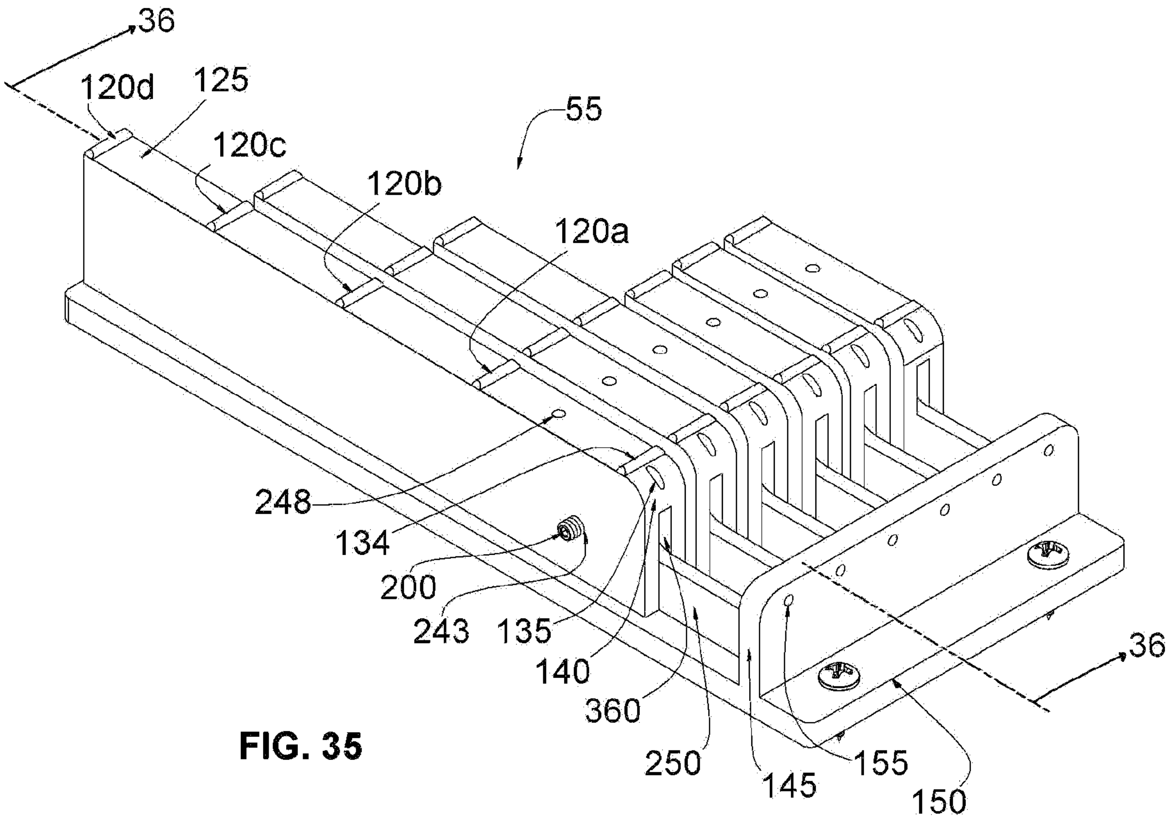
FIG. 35 illustrates a partial isometric view of an assembly.

As illustrated in FIG. 35, an assembly 55 may be arranged with six fretting saddling members 125.

Figure 36:
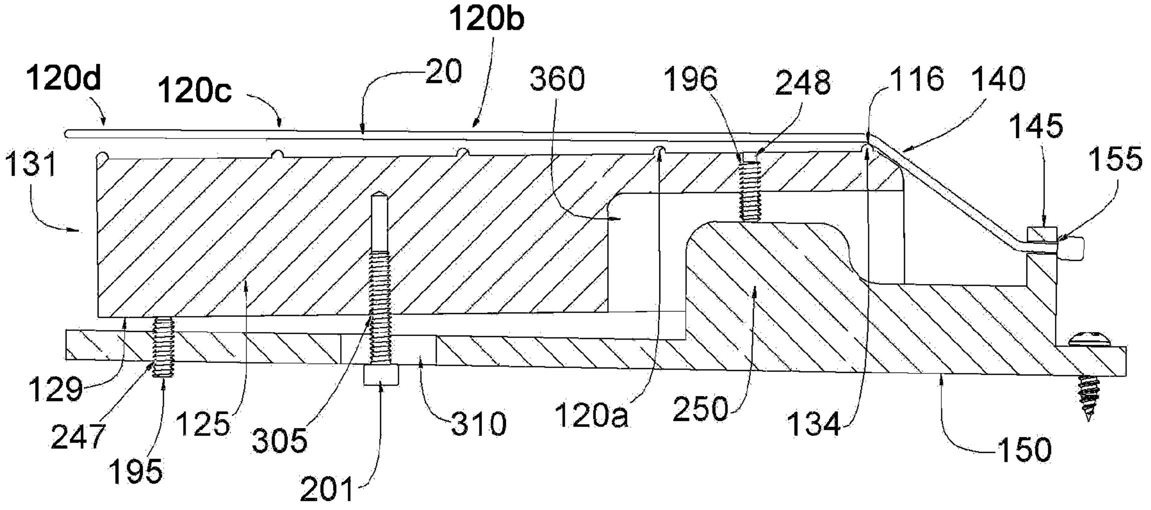

As illustrated in FIGS. 35 and 36, a fretting saddling member 125 includes a channel 360 into which a barrier 250 of a support 150 is inserted. The channel may be at the rearward member end, centered between lateral member sides of the fretting saddling member. The barrier and the channel may be centered under and aligned with a string 20, and may center and align the fretting saddling member under the string and enable longitudinal and vertical position adjustment in alignment with the string. A lateral fastener 200 may insert into a side screw hole 243 in the fretting saddling member, locking a guide surface of the channel against a side of the barrier. Unlike some other assemblies illustrated in the figures, in this assembly 55, a positioning projection, positioning hole, positioning slot, and positioning screw are not present. The fretting saddling member may be longitudinally positionally adjusted by loosening the respective fasteners, sliding it into position by hand, and locking it in place with a fastener. A positioning projection, a positioning slot, and a positioning screw may be omitted while retaining full longitudinal, vertical, and angular positionability and lockability of the fretting saddling member.

As illustrated in FIGS. 35 and 36, a fretting saddling member 125 includes a sequence of fretting crowns on an upper member surface including a first fretting crown 120*a*, a second fretting crown 120*b*, a third fretting crown 120*c*, and a fourth fretting crown 120*d*. The fretting saddling member may be coupled to and positioned on a support 150, which may couple the fretting saddling member to a body of an instrument and position the fretting saddling member on the body. A string 20 may insert through a stringing opening 155 in a rear wall 145, contact a string guide indentation 135 in a clearance surface 140, contact a saddling interface 134 at a rearward critical contact point 116 and extend at a wrist fretable vertical distance above the sequence of fretting crowns. A rearward member end of the fretting saddling member may include a rearward height adjustment hole 248 into which a rearward height screw 196 may insert, contacting an upwards facing surface of the barrier 250 of the support, which may insert into the channel 360 of the fretting saddling member. A forward height screw 195 may insert into a forward height adjustment hole 247 in the support, which is centered under the string and contact a downward member surface 129 at the forward member end 131 of the fretting saddling member. A forward upright fastener 201 may insert through a forward base fastening slot 310, into a forward upright fastening opening 305 in the downward member surface of the fretting saddling member. The forward base fastening slot may be centered under and aligned with the string. The upright fastening opening may be centered between the lateral member sides of the fretting saddling member.

Figure 37:
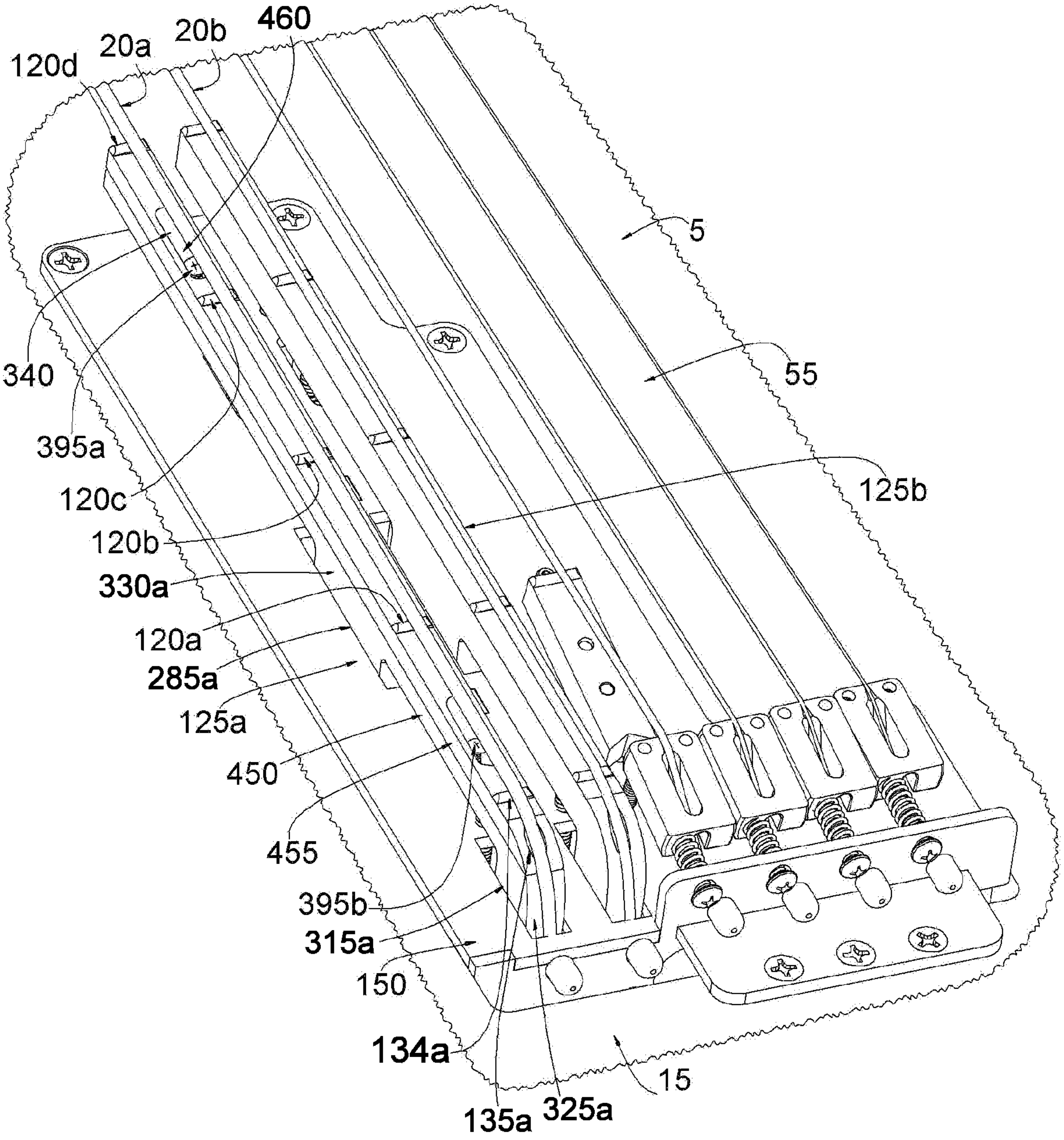
FIG. 37 illustrates a partial isometric view of an assembly on a body.

As illustrated in FIG. 37, a first fretting saddling member 125*a* is adjustably positionable on a body 15 of an instrument 5. The instrument in FIG. 37 has the same features as the instrument in FIG. 9, except that the first fretting saddling member 125*a* includes a bar block 455 adjustably coupled to a platform block 450. The bar block and the platform block may make up a single combined block forming the fretting saddling member. The bar block may include a first string guide indentation 135*a*, a first saddling interface 134*a*, a first fretting crown 120*a*, a second fretting crown 120*b*, a third fretting crown 120*c*, and a fourth fretting crown 120*d* centered under and aligned with the proto string 20*a*. The platform block may include a first fastening projection 330*a* and a first positioning projection 325*a* inserting into a first intermediate insertion slot 285*a* and a first rearward insertion slot 315*a* in a support 150. The platform block may also include the other positioning features of the first fretting saddling member in FIG. 9 such as a first projection fastening slot, a first positioning hole, and a first forward upright fastening opening. The first fretting saddling member may be adjustably positioned relative to the support, the proto string, and the body in the same manner as the first fretting saddling member in FIG. 9. The bar block may be coupled to the platform block with a rearward intonation block screw 395*b* and a forward intonation block screw 395*a*, heads of which may seat in recesses 340 in the bar block. The rearward intonation block screw and forward intonation block screw may insert downward through intonation block slots 460 of the bar block into a rearward intonation block screw hole and forward intonation block screw hole in an upward surface of the platform block. With the intonation block screws in a non locking configuration, a longitudinal position of the bar block, including the first saddling interface and the first sequence of fretting crowns, is adjustable relative to the platform block by sliding the intonation block slots along the intonation block screws, which center the bar block under, and align the bar block with the proto string. The intonation block screws may be configured to lock the bar block to the platform block for wrist fretting use. The assembly 55 may include a second fretting saddling member 125*b* configured with a deutero string 20*b*.

In additional or alternative embodiments, a platform block includes an additional bar block or a saddle tab for a deutero string. In an additional or alternative embodiment, the platform block may include an additional bar block or a saddle tab for a trito string, a tetarto string, a pempto string, and/or a hecto string. A platform block and its respective support, if the platform block is configured with multiple bar blocks and/or saddle tabs may include positioning features such as slots and projections which are laterally centrally located relative to the strings for balance. In additional or alternative embodiments, any fretting saddling member may include a similar platform block and a similar bar block. A fretting saddling member including a bar block and a platform block may allow a user to position the fretting saddling member, lock the platform block in place with the respective fasteners, and then to longitudinally adjust the position of the bar block to intonate the fretting crowns and fingerboard frets. In an additional or alternative embodiment, a vertical position of a longitudinally forward end of the bar block, a vertical position of a longitudinally rearward end of the bar block, or both may be adjustable relative to the platform block; a shim, for example, might be inserted between platform block and the bar block to achieve this adjustability.

A fretting saddling member 125 may include saddling interface 134 and a sequence of fretting crowns (including a fretting crown 120), which include a fingerboard matching angle 345 matching a fingerboard angle 350 of a fingerboard 90 at a point under a respective string 20. A fingerboard may be flat, like a classical guitar, or curved, like a steel string guitar. A flat fingerboard may include a fingerboard angle of zero degrees; for a flat fingerboard, a fingerboard matching angle of zero degrees may be appropriate. For common curved fingerboard radii, a fingerboard matching angle may be between zero and ten degrees, depending on a lateral position of a string and a radius of a neck 75. However, for an instrument with a small fingerboard radius and a wide neck, a fingerboard matching angle may be as large as twenty degrees. Although some buzz may result, a generic fretting saddling member including a fingerboard matching angle of zero degrees may be positioned under any string of an instrument with a radiused fingerboard. Similarly, a generic fretting saddling member with an averaged or estimated fingerboard matching angle may be used to approximately match one or more fingerboard angles.

An assembly 55 may include a vertical slot, such as a positioning slot 320, which may run substantially vertically. A vertical slot may restrict a lateral position of a fretting saddling member 125, while allowing adjustment of a longitudinal position, a vertical position, and an angular position of the fretting saddling member. A part of an assembly, such as a positioning screw 205, may insert into the vertical slot and connect the fretting saddling member to the support. In an alternative embodiment, a vertical slot may be in a fretting saddling member, and a part of the assembly may insert into the vertical slot and connect the fretting saddling member to a support.

An assembly 55 may include a longitudinal slot, which may run substantially longitudinally. A longitudinal slot may restrict a lateral position of a fretting saddling member 125, laterally positioning the fretting saddling member, while allowing adjustment of a longitudinal position, a vertical position, and an angular position of the fretting saddling member. A support 150, a fretting saddling member, or both may include a longitudinal slot. In some embodiments, a longitudinal slot is centered under and/or aligned with a string 20. In some embodiments, a longitudinal slot is aligned with a centerline of a neck 75. A channel 360 in a support, a channel in a fretting saddling member, a forward base fastening slot 310, a rearward base fastening slot 311, a forward member fastening slot 312, a rearward member fastening slot 313, a projection fastening slot 335, an intermediate insertion slot 285, or a rearward insertion slot 315 may be a longitudinal slot. A barrier 250 may act as part of a longitudinal slot.

An insert may insert, fully or partly, into a longitudinal slot in a fretting saddling member 125. The insert and the longitudinal slot may connect the fretting saddling member to a support 150. An insert may be a fastener, a part of the support (such as a barrier 250), or another feature. A longitudinal position of the fretting saddling member may be adjusted by manipulating (for example, by sliding) a surface of the longitudinal slot along the insert. The fretting saddling member may slide longitudinally along the insert. The longitudinal slot may maintain a lateral position of the fretting saddling member during an adjustment of the longitudinal position of the fretting saddling member relative to the support. The insert may be coupled to or integrated with the support. For example, i) a barrier of a support may insert into a channel 360 in a fretting saddling member, and/or ii) a fastener may insert through a fastening slot in a fretting saddling member into a fastening opening in a support.

An insert may insert, fully or partly, into a longitudinal slot in a support 150. The insert and the longitudinal slot may connect the support to a fretting saddling member 125. An insert may be a fastener, a part of the fretting saddling member (which may insert into the longitudinal slot and act as an insert), or another feature. A longitudinal position of the fretting saddling member may be adjusted by manipulating (for example, by sliding) the fretting saddling member along the longitudinal slot. The insert may contact a guide surface of the longitudinal slot during positional adjustment of the fretting saddling member. The insert may be coupled to, or integrated with the fretting saddling member. For example, i) a vertically lower portion of a fretting saddling member (such as a projection) may insert into a channel 360 or an insertion slot in a support, and/or ii) a fastener may insert through a fastening slot in a support into a fastening opening in a fretting saddling member.

An upright fastening opening respective to a fretting saddling member 125 may be centered under that fretting saddling member's respective string 20. (In some embodiments, two upright fastening openings, for a single fretting saddling member, may be aligned with the respective string, longitudinally spaced, and centered under that string.) An upright fastener may be used in several arrangements: i) a forward upright fastening opening 305 may be in a support 150, and a forward member fastening slot 312 may be in a fretting saddling member, ii) a rearward upright fastening opening 306 may be in a support, and a rearward member fastening slot 313 may be in a fretting saddling member, iii) a forward base fastening slot 310 may be in a support, and a forward upright fastening opening may be in a fretting saddling member, iv) a rearward base fastening slot 311 may be in a support, and a rearward upright fastening opening may be in a fretting saddling member, or v) combinations thereof. Alternatively, two upright fasteners may insert through the same fastening slot into two upright fastening openings.

A lateral fastener 200 may be used in several arrangements. For example, i) a side screw hole 243 may be in a fretting saddling member 125, ii) a side screw hole may be in a support 150, and/or iii) a bracket 210 may cooperate with the locking action of a lateral fastener.

A fastener may have a non locking configuration in which a vertical position, a longitudinal position, and an angular position of a fretting saddling member are adjustable. A vertical position of a forward member end and a vertical position of a rearward member end may be adjustable. The fastener may have a locking configuration in which it locks the vertical position, the longitudinal position, and the angular position of the fretting saddling member. The fastener may lock the vertical position of the forward member end and the vertical position of the rearward member end. A single fastener may independently perform this locking action, without the use of another fastener. Multiple fasteners for a single fretting saddling member may allow firmer locking, or may assist in centering and alignment of the fretting saddling member under a respective string. In some embodiments, each fretting saddling member in an assembly is arranged with a fastener that locks its position independently. In some embodiments, a single fastener locks positions of multiple fretting saddling members in an assembly. A fastener may longitudinally, vertically, and laterally position a fretting saddling member.

In an alternative embodiment, a fastener may include a threaded rod, threaded nut, latch, hook, clip, pin, wire, snap, or other feature. A fastener may include multiple components. It is possible to attach or form a fastener as a part of a fretting saddling member or a support. A fastening opening may be varied or omitted with a varied fastener form. Varied fastener forms and varied fastener positions are possible. Multiple fasteners may separately lock longitudinal positions, vertical positions, or lateral positions of a fretting saddling member.

In an alternative embodiment, a bracket may bend at an angle, and may include a vertical or longitudinal slot or other feature. A bracket may act as part of a support.

A height adjustment hole may be tapped into the material of a support 150. A height adjustment hole may be tapped into the material of a fretting saddling member 125. An upright fastening opening may be longitudinally between a forward height adjustment hole 247 and a rearward height adjustment hole 248. An upright fastener may be longitudinally between a forward height screw 195 and a rearward height screw 196. A forward height adjustment hole may be in a support, or a forward height adjustment hole may be in a fretting saddling member. A rearward height adjustment hole may be in a support, or a rearward height adjustment hole may be in a fretting saddling member. The forward height screw may adjust a vertical position of a forward member end 131. The rearward height screw may adjust a vertical position of a rearward member end 132. The vertical position of a fretting saddling member, including a sequence of fretting crowns, a saddling interface 134, and a critical contact point 116 of a respective string, may be adjusted relative to a body 15, the support, and a neck 75, with the forward height screw and the rearward height screw; an angle of the respective string to the sequence of fretting crowns may also be adjusted. In an alternative embodiment, a height adjustment hole may include a threaded insert.

A fretting appendage 225 may be included in an assembly 55 in an alternative arrangement. For example, in an alternative embodiment, an appendage fastener may insert downward through a longitudinal appendage through a slot in a fretting appendage into an appendage fastening opening in the support. In an alternative embodiment, an appendage height screw may insert upward into an appendage height adjustment hole in the support and contact a downward surface of a fretting appendage. A fretting appendage may be positioned under any string, space permitting. A fretting appendage may alternatively be positionable to define a wrist fretable note a whole step, minor third, major third, or other interval above an open note of a respective string.

A support 150 may include a pickup opening 70 or a shim 255. Any support may be configured with one or more shims to adjust a vertical position of a forward member end, a vertical position of a rearward member end, or both of a fretting saddling member 125. A support may include a metal, a polymer, a composite, or a natural substance. A support, including a rear wall and a barrier, may be made by cutting, welding, and/or bending sheets of a material or from molded or machined parts. A support may be coupled to a body 15 with support screws 175, with adhesives, or using other coupling means. A support may include multiple components. One or more saddles 160 on a support may each contact one or more strings 20. In an alternative embodiment, a saddle may be shaped or angled to position rearward critical contact points of strings. A support or a saddle may incorporate bridge features of electric, acoustic, flat top, or arched top instruments. A support or a saddle may incorporate bridge features of fixed or vibrato bridges, such as a vibrato mechanism. A support or a saddle may be adapted for use with a string bending device, a fine tuner, a separate string retainer, or another feature which may be included by an assembly. A saddle may be fully or partly integrated with a support. A threaded hole or opening in a support (or in a fretting saddling member or a fretting appendage) may be tapped into it or may include a threaded insert. In an alternative embodiment, a feature of an assembly may be partly or fully integrated with a body; for example, a top of the body might be contacted by a height screw, and might act, in part, as a support. A fretting saddling member may be adjustably coupled to and adjustably positioned on a support. A fastener may adjustably couple and adjustably position the fretting saddling member on the support. The fastener, and the support may adjustably couple and adjustably position the fretting saddling member on the body. The fastener may lock the position of the fretting saddling member. In some embodiments, a support is a wide base. In additional or alternative embodiments, a support is reduced in size and includes multiple components. A support may be as simple as a threaded insert in the body of an instrument, or a post or body on which a fretting saddling member may be positioned.

A support may include multiple components, which may be separately connected to the body of the guitar. For example, a support might include several small threaded inserts, posts, bolts, or other attachment points. Although the block is "on" the support and "on" the body, this is not intended to imply that the block is necessarily above the support, but rather that it is positioned where it can be accessed (about the body) by the player. For example, a support might be under only part of a fretting saddling member, or a fretting saddling member might be suspended from a support.

In some embodiments, part of a support is positioned between a laterally outermost proximal string and a laterally outermost distal string. A fretting saddling member may be positioned on and coupled to the support partly or entirely between the laterally outermost proximal string and the laterally outermost distal string. The fretting saddling member may contact a surface of the support which is between the laterally outermost proximal string and the laterally outermost distal string.

The fretting saddling member 125 may include, or may be, a shaped and/or assembled block of a material or of several materials. It may be solid, hollow, or skeletonized, and may include multiple components, such as a threaded insert or a piece of fretwire. It may include flat, bent, curved, or decorative surfaces. It may include a material such as a metal, a polymer, a composite, or a natural substance, and may include flat or bent surfaces, such as may be made from sheet metal. As used herein, any fretting saddling member described herein may be a type of block. Any feature or a function of a fretting saddling member described in this document may be included by the block of the fretting saddling member. A block of a fretting saddling member may include a rectilinear shape or a non rectilinear shape.

A block may make up a fretting saddling member 125. The block may include a fretting member 123 and a saddle tab 415. The block may include a saddling member 124 and an intonation block 390. The block may include a platform block 450 and a bar block 455. In some embodiments, a block may be configured with a single string. In additional or alternative embodiments, a block may be configured with multiple strings and may have saddling interfaces and sequences of fretting crowns, saddle tabs, intonation blocks, and/or bar blocks, for each of multiple strings. A block may include several components which may be coupled to one another, for example, with screws, by welding, or with an adhesive.

A fretting saddling member may be a shaped or assembled block of a material. The block may include fretting crowns 120 (which may have proximal lateral ends 121*a* and distal lateral ends 121*b*). The block may have a proximal lateral member side 126, a distal lateral member side 127, an upper member surface 128, a downward member surface 129, and a longitudinally forward surface 130. The block may have a forward member end 131 and a rearward member end 132. A block may include a pivot 133, a saddling interface 134, a string guide indentation 135 in a clearance surface 140, a forward height adjustment hole 247, a rearward height adjustment hole 248, a positioning hole 249, a forward upright fastening opening 305, a rearward upright fastening opening 306, a forward member fastening slot 312, a rearward member fastening slot 313, a positioning projection 325, a fastening projection 330, a projection fastening slot 335, a recess 340, a channel 360, and/or any other feature or function described as a part or portion of function of a fretting saddling member.

A fretting crown 120 or a saddling interface 134 may be formed from fretwire or another firm material and attached to a fretting saddling member, or may be shaped into the material of the fretting saddling member. A lateral end 121 of a fretting crown or a saddling interface may be beveled, rounded, or both. A fretting crown or a saddling interface may be angled around a vertical axis at a range of angles at which "fanned frets" may function. A fretting crown may be arched. Lateral ends of fretting crowns may be coterminous with lateral member sides of the fretting saddling member and/or with edges of an upper surface of the fretting saddling member.

In an alternative embodiment, a fretting saddling member 125 may include two or more saddling interfaces for two or more consecutive strings 20, and may include string contactable areas on one or more fretting crowns 120 that may be at wrist fretable vertical distances under the strings contacting the saddling interfaces. Thus, a fretting saddling member may be configured with multiple strings, each of which may be used for wrist fretting. Supporting features, locking features, and positioning features of the assembly may be arranged for a fretting saddling member for use with multiple strings. A fretting saddling member for multiple strings may be wider than some depicted embodiments.

An assembly 55 may include a saddle means positionable on the body 15 of the instrument 5. A saddle means may be a saddle 160, or a saddling interface 134 of a fretting saddling member 125. A string 20 may contact the saddle means at a rearward critical contact point 116, and extend above the neck to a forward critical contact point 115 on the nut 110. A fretting saddling member, which may be used for wrist fretting with a respective string, may be adjustably positionable relative to a saddle means of a consecutive string. An instrument may include saddle means for multiple strings. A saddle of a saddle means may be an acoustic or electric type saddle, and may be of a hardtail or a vibrato type; a saddle of a saddle means may be configured for a single string or for multiple strings. A saddle of a saddle means may be shaped or angled to position a rearward critical contact point of a string in an intonated position.

The following five paragraphs disclose with particularity a neck scale length, as may be used in conjunction with and to facilitate understanding of any of the other disclosure throughout the present specification. A neck scale length may be understood to be a nominal sounding length of an open string from a saddle 160 or a saddling interface 134 to a nut 110. (As might be established by expected critical contact points of the string on these features.) A nominal sounding length of a fretted fingerboard note may be calculated, based on a neck scale length, using the twelfth root of two. A nominal oddment length may be calculated by subtracting a nominal sounding length from the neck scale length. A nominal semitone sounding length may be 94.3874% of a neck scale length. A nominal whole step sounding length may be 89.0899% of a neck scale length. A nominal minor third sounding length may be 84.0896% of a neck scale length. A nominal major third sounding length may be 79.3701% of a neck scale length. A nominal perfect fourth sounding length may be 74.9154% of a neck scale length. A nominal semitone oddment length may be 5.6126% of a neck scale length. A nominal whole step oddment length may be 10.9101% of a neck scale length. A nominal minor third oddment length may be 15.9104% of a neck scale length. A nominal major third oddment length may be 20.6299% of a neck scale length. A nominal perfect fourth oddment length may be 25.0846% of a neck scale length. A nominal octave oddment length may be 50.0000% of a neck scale length.

A player may play fretted fingerboard notes with the fretting hand 376. To play a fretted fingerboard note, the player may depress a string 20 against a fingerboard fret 100 with a finger of the fretting hand, stopping the string with the fingerboard fret, and shortening the sounding length of the string. The shortened sounding length of the string, between the fingerboard fret and a rearward critical contact point 116, may be plucked with the picking hand 375. A sequence of fingerboard frets 100 may have a chromatic spacing (in a longitudinal direction) based on a neck scale length. A first fingerboard fret may be positioned to define fretted fingerboard notes a semitone above open notes of open strings. For a string, the sequence of fingerboard frets may define a sequence of successive semitones above a fundamental pitch of that string.

A fingerboard fret 100 intended to produce a fretted fingerboard note of a specific interval above open notes of open strings 20 may be positioned at a nominal oddment length, respective to that interval, from a nut 110. More specifically, a fingerboard fret may be positioned at the nominal oddment length (of its respective interval) from the expected positions of the forward critical contact points of the strings on the nut. For example, a twelfth fingerboard fret 100*e* may be positioned at a nominal octave oddment length from a nut; a neck scale length may be twice the distance from the twelfth fingerboard fret to the nut. In an alternative embodiment, a method of adjusting a position of a nut or a position of a forward critical contact point of a string on the nut, away from a nominal position suggested by a neck scale length, such as the use of a compensated nut, may be used. In an alternative embodiment, a fingerboard fret may be positioned at a distance from a nut, which may be smaller or larger than suggested by a nominal oddment length.

A fretting saddling member 125 or a fretting appendage 225 may be positioned in conjunction with any string 20, and may have one, two, three, four, or more fretting crowns. A string, which is configured for wrist fretting, may be understood to be a wrist fretting string. An instrument 5 may include a wrist fretting string and a single direction fretting string. A single direction fretting string may be distal to a distal lateral end 121*b* of each fretting crown 120 included by an assembly 55. A single direction fretting string may be used to play open notes or fretted fingerboard notes while accompaniment is played on a wrist fretting string. For some players, an instrument including a combination of one or more proximal wrist fretting strings and one or more distal single direction fretting strings may be easy to learn, comfortable to play, and useful for producing wrist fretted low notes in the lowest octave of the instrument.

In some embodiments, a proto string is configured with a fretting saddling member having four or fewer fretting crowns. (A proto string may alternatively be configured as a single direction fretting string) A deutero string may be configured with a fretting saddling member having four or fewer fretting crowns, or as a single direction string. A trito string may be configured with a fretting saddling member having two or fewer fretting crowns, or as a single direction string. A tetarto string may be configured with a fretting saddling member having two or fewer fretting crowns or as a single direction fretting string. A pempto string may be configured with a fretting saddling member having one fretting crown, or as a single direction fretting string. A hecto string may be configured with a fretting saddling member having one fretting crown or as a single direction fretting string. If a single fretting crown is to be used with a string, that string may alternatively be configured with a saddle and a fretting appendage. An assembly may include varied combinations of wrist fretting strings and single direction fretting strings. Other combinations of fretting crowns are possible and envisioned.

Adjustable longitudinal and vertical positioning of a fretting saddling member 125 may accommodate for small errors that a user or a manufacturer may make in positioning an assembly 55 on an instrument 5. Although it may prevent a fretting crown 120 from being used for wrist fretting, a vertical position of a sequence of fretting crowns on a fretting saddling member may be adjusted upward such that the fretting crowns contact a respective string 20, or downward such that depressing the string between the saddling interface 134 and a fretting crown brings the string into contact with a fingerboard fret 100. Although these positions may not be the positions of expected use, this extra adjustment range allows for some tolerances during installation.

When wrist fretting, a player may use the picking hand 375 to change a note of a string 20. The pisiform bone wrist area 377 of the picking hand may be used to depress the string between a fretting crown 120 and a rearward critical contact point 116 of the string, immediately rearward of the fretting crown, until the string contacts the fretting crown, shortening the sounding length of the string. The string may be directly contacted with the skin of the wrist. If the chosen fretting crown is a part of a sequence of fretting crowns, the contact point of the wrist with the string may be between the chosen fretting crown and the next fretting crown in the direction of the rearward critical contact point. A shortened sounding length of the string between the fretting crown and a nut may then be plucked with the picking hand thumb to produce sound. In some embodiments, when wrist fretting, the wrist moves the string to the fretting crown, and the fretting crown remains stationary. In some embodiments, wrist fretting is performed with the fastener locking the position of the fretting saddling member. When using the pisiform bone wrist area of the picking hand to wrist fret, the thumb and fingers of the picking hand may be free to pluck any string, and the fretting hand may be left free. While wrist fretting with the picking hand, the fretting hand may be used to play fretted fingerboard notes on strings which are distal to the wrist fretting string. This may enable new combinations of low pitched wrist fretted notes and higher pitched fretted fingerboard notes.

A player may play a wrist fretted note on a wrist fretting string, play an open note on the wrist fretting string, or play a fretted fingerboard note on the wrist fretting string. A player may switch between multiple wrist fretable notes defined by a sequence of fretting crowns under a string. A player may switch between wrist fretable notes playable on two (or more) wrist fretting strings. These actions may be performed rapidly; the player may switch from one to another in a fraction of a second. While playing a wrist fretted note, strings which may be distal to the wrist fretting string may be used to play fretted fingerboard notes and open notes.

Several factors may affect the pitch of a fretted fingerboard note during a fretting action at a fingerboard fret 100, such as: i) the force required to fret the string 20 due to the height of the string above the fingerboard 90, and ii) the thickness and material of the string. If a rearward critical contact point 116 of the string were positioned exactly as suggested by a neck scale length, the fingerboard frets might produce pitches that were sharp. To correct this, the rearward critical contact point of the string may be moved rearward. This adjustment may be called "intonating" the string.

On a string 20 which contacts a saddle 160, to correct sharp fretted fingerboard notes, the saddle may be moved rearward. To correct flat fretted fingerboard notes, the saddle may be moved forward. An adjustable saddle may allow a rearward critical contact point of a string to be positioned at a distance less than, equal to, or greater than a neck scale length from a forward critical contact point of the string. In an alternative embodiment, the position of a rearward critical contact point of a string may be adjusted by angling and/or shaping a saddle.

An assembly 55 may allow a user to adjust the vertical position and longitudinal position of a fretting saddling member 125 and to adjust an angle between a sequence of fretting crowns and a string 20, which has the saddling interface 134 as its vertex. Adjusting the position of the fretting saddling member may adjust the position of the saddling interface, the rearward critical contact point 116 of the string 20, and the sequence of fretting crowns. In some embodiments, certain spatial relationships are preserved throughout adjustment. The saddling interface and the fretting crowns 120 may remain coplanar. The saddling interface and the fretting crowns 120 may remain at fixed distances from one another. A fingerboard matching angle 345, shared by the fretting crowns and the saddling interface, may continue to match a fingerboard angle 350 of a fingerboard 90. In an assembly, moving a fretting saddling member forward or rearward may shorten or lengthen the sounding length of an open note of the respective string, the sounding lengths of the fretted fingerboard notes, and the sounding lengths of the wrist fretted notes.

A method of setting up a fretting saddling member 125 may have these steps: i) To get started, the fretting saddling member may be positioned such that the saddling interface 134 is at a distance equal to a neck scale length from the nut 110. ii) The vertical position of the rearward member end 132 may be adjusted to set the vertical distance between a string 20 and fingerboard frets 100 on the fingerboard 90. iii) The fretted fingerboard notes of the string may be intonated by adjusting the longitudinal position of the fretting saddling member. The fretting saddling member may be moved rearward (away from the nut) to correct sharp fretted fingerboard notes, or moved forward (toward the nut) to correct flat fretted fingerboard notes. iv) The vertical position of the forward member end 131 may be adjusted to set the vertical positions of the fretting crowns 120 relative to the string, and to adjust the angle of the sequence of fretting crowns to the string which has the saddling interface as its vertex. v) Small adjustments may be made to the position of the fretting saddling member for playability.

A fretting saddling member 125 may be vertically and longitudinally adjusted such that: i) each fretting crown 120 of a sequence of fretting crowns is positioned to define a wrist fretable note above an open note of a string 20, and the string is at a wrist fretable vertical distance above each fretting crown; ii) each fingerboard fret 100 under the string defines a fretted fingerboard note, and the string is at a fretable vertical distance above each fingerboard fret; and iii) the open string may be used to play an open note. The sequence of fretting crowns may define a sequence of successive semitones above the open note of the string.

On a fretting saddling member 125, the distance between a fretting crown and a saddling interface may be adjustable or non adjustable. Several previously unknown factors may affect the pitch of a wrist fretted note during a wrist fretting action at a fretting crown. To compensate for these factors, a fretting crown 120 and a saddling interface may be positioned on a fretting saddling member at a distance from one another which intonates a wrist fretable note.

Some previously unknown factors which may affect the pitch of wrist fretted notes are described here. When positioning a fretting saddling member on an instrument, three example scenarios may be envisioned, to assist in understanding these factors. These scenarios may be termed scenario A, scenario B, and scenario C. Scenarios A, B, and C may be as follows: The angle of the sequence of fretting crowns to the string 20, which has the saddling interface 134 as its vertex, may be adjusted to be A) less than, B) equal to, or C) greater than the angle of the sequence of fingerboard frets to the string which has the nut 110 as its vertex. The number of playable fingerboard frets 100 may be A) less than twelve, B) about twelve, or C) more than twelve. On a chromatically spaced fretting saddling member, the distance between the string and a fretting crown 120 with a particular ordinal number may be A) less than, B) equal to, or C) greater than the distance between the string and a fingerboard fret with the same ordinal number. The amount of force to wrist fret at that particular fretting crown may be A) less than, B) equal to, or C) greater than the amount of force to fret at the corresponding fingerboard fret.

To compensate for the factors in these examples, a "scenario A" fretting saddling member, a "scenario B" fretting saddling member, and a "scenario C" fretting saddling member may be arranged. On the scenario A fretting saddling member, the scenario B fretting saddling member, and the scenario C fretting saddling member: A fretting crown with a particular ordinal number may be positioned at a distance from a saddling interface 134 which is A) greater than, B) equal to, or C) less than a nominal oddment length of its associated musical interval. The distance between that particular fretting crown and the saddling interface may be A) greater than, B) equal to, or C) less than the distance between a fingerboard fret 100 with the same ordinal number and the nut 110. The distance between that particular fretting crown and the rearward critical contact point 116 of the string 20 may be A) greater than, B) equal to, or C) less than the distance between the corresponding fingerboard fret and the forward critical contact point 115 of the string. The distance between that particular fretting crown and the nut may be A) less than, B) equal to, or C) greater than the distance between the corresponding fingerboard fret and the saddling interface. The distance between that particular fretting crown and the forward critical contact point of the string may be A) less than, B) equal to, or C) greater than the distance between the corresponding fingerboard fret and the rearward critical contact point of the string.

The above fretting saddling members for scenarios A, B, and C have been given as examples, and described in terms of a chromatic spacing. It may be understood that fretting crowns and a saddling interface on a fretting saddling member may be arranged in a variety of ways to compensate for a variety of strings, string height, the number of playable fingerboard frets, and other factors affecting intonation. Features of non adjustable fretting saddling members may be arranged using experimental data from a fretting saddling member with an adjustable saddle tab block or an adjustable intonation block. Each fretting crown on a non adjustable fretting saddling member may be positioned on the fretting saddling member independently to intonate its respective wrist fretable note. In an assembly with multiple fretting saddling members, fretting crown to saddling interface distances of each fretting saddling member may be independently chosen to intonate wrist fretable notes of their respective strings, which may have varied setups. Although a fretting saddling member may have fretting crown positions suited to a particular setup, the fretting saddling member may be used in a variety of other setups. For example, a fretting saddling member designed for scenario B might be used in scenario C, or vice versa.

In some embodiments, each fretting crown 120 in a sequence of fretting crowns is positioned at a distance from a saddling interface 134 (on the fretting saddling member 125) that is less than a nominal oddment length of an interval respective to that fretting crown. The distance from a fretting crown to the rearward critical contact point of the string may be less than a nominal oddment length of the interval respective to that fretting crown. The longitudinal position of the fretting saddling member may be adjusted such that the longitudinal position of the rearward critical contact point 116 of the string makes the sounding length of the open string longer than a neck scale length. Each fretting crown may be farther from the forward critical contact point 115 of the string than a respective fingerboard fret 100 is from the rearward critical contact point of the string. The distance from a fretting crown to the forward critical contact point of the string may be greater than a nominal sounding length of the interval respective to that fretting crown. A fretting crown and a respective fingerboard fret may produce the same pitch, but may do so with unequally long sounding lengths of the string. The angle of the sequence of fingerboard frets 100 to the string may be less than the angle of the sequence of fretting crowns to the string. A fretting crown may be closer to the saddling interface than a respective fingerboard fret is to the nut.

An assembly 55 of an instrument 5 may include a first fretting saddling member **125*a*, including a first saddling interface 134*a* and a first sequence of fretting crowns. The first saddling interface may contact a proto string 20*a* and may direct the proto string at a wrist fretable height above the first sequence of fretting crowns. The first sequence of fretting crowns may include, in longitudinal order beginning with the nearest to the first saddling interface, a first fretting crown 120*a*, a second fretting crown 120*b*, a third fretting crown 120*c*, and a fourth fretting crown 120*d*. The assembly may include a second fretting saddling member 125*b*, including a second saddling interface 134*b* and a second sequence of fretting crowns. The second saddling interface may contact a deutero string 20*b* and direct the deutero string at a wrist fretable vertical distance above the second sequence of fretting crowns. The second sequence of fretting crowns may include, in longitudinal order beginning with the nearest to the second saddling interface, a first fretting crown, a second fretting crown, a third fretting crown, and a fourth fretting crown. The instrument may include a nut 110, a first fingerboard fret 100*a*, a second fingerboard fret 100*b*, a third fingerboard fret 100*c*, and a fourth fingerboard fret 100*d*. A forward critical contact point 115 of the proto string may be on the nut, and a rearward critical contact point 116** of the proto string may be on the first saddling interface. A forward critical contact point of the deutero string may be on the nut, and a rearward critical contact point of the deutero string may be on the second saddling interface. The proto string may be a laterally outermost proximal string. The deutero string may be consecutive to the proto string. Relative to one another, the proto string may be a laterally proximal string and the deutero string may be a laterally distal string. In some embodiments, the instrument is a bass guitar. In some embodiments, the instrument is a guitar. In some embodiments, other numbers of fretting crowns are associated with some strings.

A longitudinally foremost point on a fretting saddling member may be understood to be a forward extent. This point may be at a forward member end of the fretting saddling member.

For some players, certain lateral widths and longitudinal lengths of features of an assembly 55 may enable wrist fretting while minimizing unintentional contact with the picking hand 375. Some players may find that a fretting saddling member 125 with a narrower lateral width or a shorter longitudinal length minimizes unintentional contact with the hand. Some players may find that a forward extent of a fretting saddling member, which is farther from a nut 110, and nearer to a saddling interface 134, minimizes unintentional contact with the hand. A foremost fretting crown on a fretting saddling member may be at the longitudinally forward extent, or between the longitudinally forward extent and the saddling interface. A laterally narrow and longitudinally short fretting saddling member may be light in weight, and may be positioned comparatively near other parts of an assembly, such as a pickup 65. Laterally narrow fretting saddling members may be positioned under consecutive strings without contacting one another, allowing independent positional adjustment.

A player may switch among playing a wrist fretted note on a wrist fretting string, playing a fretted fingerboard note on that string, and playing that string as an open string. A simultaneous wrist fretting and fingerboard fretting action on the same string may be possible, but may result in unorthodox pitches.

The pisiform bone wrist area may be used to wrist fret. Other parts of the picking hand may also be used to perform a similar action. For example, in some embodiments, a string 20 may be brought into contact with a fretting crown 120 by a finger of the picking hand 375.

In some embodiments, wrist fretting may be combined with slide guitar, flat picking, slapping, tapping, and other techniques.

Players with larger hands may find that their fingers are more likely to collide with a fingerboard 90 or fingerboard frets 100 during wrist fretting. It may be useful to provide a neck, or a variety of necks, suited to varied hand sizes, with specific numbers of fingerboard frets. Players with larger hands may prefer having fewer fingerboard frets.

In some embodiments, a flat fingerboard 90 on a neck 75 enables fretting saddling members 125 or fretting appendages 225 to be interchangeable between strings 20. A flat fingerboard like that of a classical guitar may be described as having a "flat radius," an "infinite radius," or a radius of zero.

Lightweight tuners may lessen the need to support a neck 75 with the fretting hand 376 during a wrist fretting action. A lightweight tuning machine, having a mass of less than 70 grams (or 70 grams per tuner per string if tuning machines are connected), may tension a string 20, and may be mounted on a headstock 85. In some embodiments, a tuning machine has a mass of 70 g or less on an averaged per string basis.

In some embodiments, an instrument 5 may be strung with steel, nylon, and other strings. In some embodiments, an instrument 5 may be tuned to an alternate tuning. In some embodiments, an assembly 55 may include a piezoelectric pickup.

In some embodiments, an instrument 5 includes a fretted fingerboard 90. Alternatively, an instrument may include a fretless fingerboard; an instrument with a fretless fingerboard may be otherwise similar to fretted instruments.

A fretting saddling member may be configured to be positioned on a soundboard of a hollow body of an instrument. A support may be configured to couple the fretting saddling member to a soundboard. A fastener may be configured to couple the block to the support within 80 mm of a longitudinally rearward critical contact point of a respective string.

A fretting saddling member, a support, or both may include a threaded opening configured to receive a fastener. The fastener may adjustably position and couple the fretting appendage on a support and on a body.

In some embodiments, an instrument 5 may include features of an electric guitar, an acoustic guitar, a four; five; or six string bass guitar, a seven or eight string guitar, a banjo, a ukulele, a steel guitar, a zither, or another instrument. The instrument may include features of a fretless variant of one of these.

In an alternative embodiment: Fingerboard frets 100 of an instrument 5 may include a diatonic or a microtonal spacing. A sequence of fretting crowns may be positioned on a fretting saddling member 125 relative to the saddling interface 134 to define diatonic or microtonal wrist fretable notes. A described intonation method may be used to intonate a saddling interface and a sequence of fretting crowns of an instrument with a diatonic or a microtonal spacing. On a fretting saddling member with a diatonic spacing, a distance from the saddling interface to the second fretting crown may be inclusively from 138% to 152% of a distance from the saddling interface to the first fretting crown.

In an alternative embodiment, an instrument 5 may include fanned fingerboard frets.

In an alternative embodiment, an instrument may include a varied number of strings 20. An instrument may include an extra neck or harp guitar strings.

Some positions and dimensions may be understood by comparison with a lateral string spacing 170. Some positions and dimensions may be understood by comparison with a neck scale length, a nominal sounding length, or a nominal oddment length. Other positions and dimensions of features may be understood by comparing them to one another. Some positions and dimensions may be understood by comparison with the distance from a first fretting crown 120*a* to the saddling interface.

A neck scale length and a lateral string spacing 170 included by an instrument 5 may be typical of a guitar or a bass guitar. However, an instrument may include a neck scale length as long or longer than a neck scale length of a double bass or as short or shorter than a neck scale length of a ukulele. Strings 20 of an instrument may have a lateral string spacing as wide or wider than a lateral string spacing of a double bass or as narrow or narrower than a lateral string spacing of a ukulele.

In some embodiments, a fretting saddling member includes a pivot which contacts a support at two points which are substantially perpendicular to the line of a string. In some embodiments, a distance between a first point and a second point at which a support is contacted by a pivot is greater than a lateral string spacing. In some embodiments, the distance between a first point and a second point at which the support 150 is contacted by the pivot is equal to or less than a lateral string spacing. In some embodiments, a height screw is a pivot. The fretting saddling member may be pivotally mounted on the body (i.e. on a support on the body), on a height screw, and or on a pivot that forms part of the fretting saddling member. A pivoting action may adjust a vertical position of a forward member end, a rearward member end, or both.

A fretting saddling member may include a forward member end 131, a rearward member end 132, and a fretting crown with a fingerboard matching angle. In some embodiments, a 1 mm vertical adjustment up or a 1 mm vertical adjustment down of a forward member end 131 or a rearward member end 132 alters a fingerboard matching angle of a fretting crown by more than two degrees. In some embodiments, a 1 mm vertical adjustment up or a 1 mm vertical adjustment down of a forward member end 131 or a rearward member end 132 alters a fingerboard matching angle of a fretting crown by less than two degrees.

In some embodiments, a neck scale length is less than 300 mm. In some embodiments, a neck scale length is more than 1200 mm. In some embodiments, a neck scale length is from 300 mm to 1200 mm. In some embodiments, a neck scale length is from 500 mm to 900 mm.

In some embodiments, a lateral string spacing is less than 7.5 mm. In some embodiments, a lateral string spacing is more than 40 mm. In some embodiments, a lateral string spacing is from 7.5 mm to 40 mm. In some embodiments, a lateral string spacing is from 9 mm to 25 mm.

In some embodiments, a longitudinal length of a fretting saddling member is greater than 34% of a neck scale length. In some embodiments, a longitudinal length of a fretting saddling member is less than or equal to 34%, 30%, 26%, 21%, 16%, 11%, and/or 6% of a neck scale length.

In some embodiments, a pickup is coupled to a body, under a string, such that at least part of the pickup is within 75% of a neck scale length from the nut. In some embodiments, a pickup is coupled to a body, under a string, such that at least part of the pickup is at a distance equal to or greater than 75% 79%, and/or 84% of a neck scale length from a nut.

In some embodiments, a longitudinal distance from a nut to a forward extent of a fretting saddling member is less than 70% of a neck scale length. In some embodiments, a longitudinal distance from a nut to a forward extent of a fretting saddling member is greater than or equal to 70%, 74%, 79%, 84%, 89%, and/or 94% of a neck scale length.

In some embodiments, a lateral width of a fretting saddling member is greater than 500% of a lateral string spacing. In some embodiments, a lateral width of a fretting saddling member is equal to or less than 500%, 400%, 300%, 200%, and/or 100% of a lateral string spacing. In some embodiments, a fretting saddling member is laterally wider than 60 mm. In some embodiments, a lateral width of a fretting saddling member is equal to or less than 60 mm, 50 mm, 40 mm, 30 mm, 25 mm, 20 mm, and/or 15 mm.

In some embodiments, a lateral width of a fretting crown is greater than 500% of a lateral string spacing. In some embodiments, a lateral width of a fretting crown is equal to or less than 500%, 400%, 300%, or 200%, 100%, 75%, 50%, and/or or 40% of a lateral string spacing. In some embodiments, a fretting crown is laterally wider than 60 mm. In some embodiments, a lateral width of a fretting crown is equal to or less than 60 mm, 50 mm, 40 mm, 30 mm, 20 mm, 15 mm, 10 mm, and/or 8 mm. A fretting crown may be a one string fretting crown, a two string fretting crown, or a three or more string fretting crown.

In some embodiments, a distance from a saddling interface to a longitudinally forward extent of a longitudinally forward end of a fretting saddling member is greater than 525% of the distance from the saddling interface to the first fretting crown. In some embodiments, a distance from a saddling interface to a longitudinally forward extent of a fretting saddling member is equal to or less than 525%, 450%, 370%, 285%, 195%, and/or 110% of the distance from the saddling interface to the first fretting crown.

In some embodiments, a fastener or the height screw respective to a fretting saddling member may tilt from 0 degrees to about 17 degrees. In some embodiments, a fastener or the height screw may tilt more than 17 degrees.

In some embodiments, an intonated note, above an open note of a string tuned to concert pitch, may be understood to be within 20 cents, 15 cents, 10 cents, and/or 7 cents of concert pitch.

A change of .127 mm in a position of a fingerboard fret 100, a fretting crown 120, or a critical contact point of a string 20 may be noticeable to some users. A position of a feature may be adjusted by less than. 127 mm. For example, an assembly may include a M3×0.5 screw as a positioning screw; turning the M3×0.5 screw a quarter of a turn may adjust a longitudinal position of a respective fretting saddling member 125 by about .125 mm. An eighth of a turn of the same screw might adjust the position by half that amount.

A fretting crown positioned to intonate a wrist fretted note may be from 0 mm and 10 mm farther away from or nearer to the saddling interface than its respective nominal oddment length, with a range between 0 mm and 5 mm being effective in some situations. The amount of shift in position (if needed) may depend on neck scale length, string height, and other factors.

In some embodiments, on a fretting saddling member, a longitudinal distance from a height adjustment hole to another height adjustment hole, or from a height adjustment hole to a pivot, is greater than 25% of a neck scale length. In some embodiments, on a fretting saddling member, a longitudinal distance from a height adjustment hole to another height adjustment hole, or from a height adjustment hole to a pivot, is equal to or less than 25%, 21%, 16%, 11%, or 6% of a neck scale length.

In some embodiments, a lateral member side 126 of a fretting saddling member 125 and a lateral end 121*a* of a fretting crown 120 of the fretting saddling member are at a lateral distance (vertical distance not being considered) greater than 100% of a lateral string spacing 170 from a respective string 20. In some embodiments, a lateral member side 126 of a fretting saddling member 125 and a lateral end 121*a* of a fretting crown 120 of the fretting saddling member are at a lateral distance (vertical distance not being considered) equal to less than 100% of a lateral string spacing 170 from a respective string 20. In some embodiments, this distance is less than 50% of a lateral string spacing 170.

A distance from a rearward critical contact point 116 of a proto string 20*a* to a twelfth fingerboard fret 100*e* may be inclusively from 10 mm to .25 mm less than a distance from a forward critical contact point 115 of the proto string to the twelfth fingerboard fret.

A distance from a rearward critical contact point 116 of a proto string 20*a* to a twelfth fingerboard fret 100*e* may be inclusively from .25 mm less than to .25 mm greater than a distance from a forward critical contact point 115 of the proto string to the twelfth fingerboard fret.

A distance from a rearward critical contact point 116 of a proto string 20*a* to a twelfth fingerboard fret 100*e* may be inclusively from .25 mm to 10 mm greater than a distance from a forward critical contact point 115 of the proto string to the twelfth fingerboard fret.

A distance from a rearward critical contact point of a deutero string 20*b* to the twelfth fingerboard fret 100*e* may be inclusively from 10 mm to .25 mm less than a distance from a forward critical contact point of the deutero string to the twelfth fingerboard fret.

A distance from a rearward critical contact point of a deutero string 20*b* to the twelfth fingerboard fret 100*e* may be inclusively from .25 mm less than to .25 mm greater than a distance from a forward critical contact point of the deutero string to the twelfth fingerboard fret.

A distance from a rearward critical contact point of a deutero string 20*b* to the twelfth fingerboard fret 100*e* may be inclusively from .25 mm to 10 mm greater than a distance from a forward critical contact point of the deutero string to the twelfth fingerboard fret.

A distance from a forward critical contact point 115 of a proto string 20*a* to a rearward critical contact point 116 of the proto string may be inclusively from 10 mm to .25 mm less than a distance from the forward critical contact point of the deutero string 20*b* to the rearward critical contact point of the deutero string.

A distance from a forward critical contact point 115 of a proto string 20*a* to a rearward critical contact point 116 of the proto string may be inclusively from .25 mm less than to .25 mm greater than a distance from the forward critical contact point of the deutero string 20*b* to the rearward critical contact point of the deutero string.

A distance from a forward critical contact point 115 of a proto string 20*a* to a rearward critical contact point 116 of the proto string may be inclusively from 25 mm to 10 mm greater than a distance from the forward critical contact point of the deutero string 20*b* to the rearward critical contact point of the deutero string.

The following examples are for some instruments having fretting crowns in a chromatic spacing. The reader should keep in mind that diatonic and microtonal spacings are also possible, and may use the same method of intonation to achieve in tune notes.

A distance from an ordinally numbered fretting crown 120 of a first sequence of fretting crowns to a forward critical contact point 115 of the proto string 20*a* may be inclusively from 25 mm less than to .25 mm greater than a distance from a fingerboard fret 100 having the same ordinal number to a rearward critical contact point 116 of the proto string.

A distance from an ordinally numbered fretting crown 120 of a first sequence of fretting crowns to a forward critical contact point 115 of the proto string 20*a* may be inclusively from .25 mm to 10 mm greater than a distance from a fingerboard fret 100 having the same ordinal number to a rearward critical contact point 116 of the proto string.

A distance from an ordinally numbered fretting crown 120 of a second sequence of fretting crowns to a forward critical contact point of the deutero string 20*b* may be inclusively from 25 mm less than to .25 mm greater than a distance from a fingerboard fret 100 having the same ordinal number to a rearward critical contact point of the deutero string.

A distance from an ordinally numbered fretting crown 120 of a second sequence of fretting crowns to a forward critical contact point of the deutero string 20*b* may be inclusively from .25 mm to 10 mm greater than a distance from a fingerboard fret 100 having the same ordinal number to a rearward critical contact point of the deutero string.

A distance from an ordinally numbered fretting crown 120 of a first sequence of fretting crowns to a forward critical contact point 115 of the proto string 20*a* may be inclusively from 10 mm to .25 mm less than a distance from a fretting crown 120 having the same ordinal number of a second sequence of fretting crowns to a forward critical contact point of the deutero string 20*b*.

A distance from an ordinally numbered fretting crown 120 of a first sequence of fretting crowns to a forward critical contact point 115 of the proto string 20*a* may be inclusively from 25 mm less than to .25 mm greater than a distance from fretting crown 120 having the same ordinal number of a second sequence of fretting crowns to a forward critical contact point of the deutero string 20*b*.

A distance from an ordinally numbered fretting crown 120 of a first sequence of fretting crowns to a forward critical contact point 115 of the proto string 20*a* may be inclusively from 25 mm to 10 mm greater than a distance from a fretting crown 120 having the same ordinal number of a second sequence of fretting crowns to a forward critical contact point of the deutero string 20*b*.

In an assembly 55, a first saddling interface 134*a* of a first fretting saddling member 125*a* may be positionable from 11 mm farther forward to 11 mm farther rearward than a second saddling interface 134*b* of a second fretting saddling member 125*b*. Other embodiments include a larger adjustment range.

Fretting crowns 120 in a sequence of fretting crowns on a fretting saddling member 125 may be positioned relative to a saddling interface 134 to enable intonated wrist fretable notes. They may be positioned in anticipation of use in a scenario in which a vertical position of the string is set within a certain vertical range above a fingerboard 90, in which a string 20 is within a certain range of thicknesses, and in which the string is tuned to a certain range of notes. This may be accomplished by positioning the fretting crown intended to produce a note of a particular pitch at a distance from the saddling interface which is i) greater than a nominal oddment length of a respective interval, ii) equal to a nominal oddment length of a respective interval, or iii) less than a nominal oddment length of a respective interval.

In some embodiments, a fastener is configured to couple a fretting saddling member to a support within 80 mm of a longitudinally rearward critical contact point of a respective string. In some embodiments, a height screw engaged with a fretting saddling member contacts a support within 80 mm of a longitudinally rearward critical contact point of a respective string.

On some instruments, the distance from a saddling interface of a fretting saddling member to a third fretting crown of the fretting saddling member is inclusively from 99.5% to 100.5% of the distance from the third fingerboard fret to the nut.

On some instruments, the distance from a saddling interface of a fretting saddling member to a third fretting crown of the fretting saddling member is inclusively from 82% to 99.5% of the distance from the third fingerboard fret to the nut.

In some embodiments, on a fretting saddling member, a distance from the saddling interface to the second fretting crown is inclusively from 180% to 194.39% of a distance from the saddling interface to the first fretting crown. In some embodiments, on a fretting saddling member, a distance from the saddling interface to the second fretting crown is inclusively from 194.39% to 220% of a distance from the saddling interface to the first fretting crown. In some embodiments, on a fretting saddling member, a distance from the saddling interface to the second fretting crown is inclusively from 194.72% to 220% of a distance from the saddling interface to the first fretting crown. In some embodiments, on a fretting saddling member, a distance from the saddling interface to the second fretting crown is inclusively from 195.04% to 220% of a distance from the saddling interface to the first fretting crown. In some embodiments, on a fretting saddling member, a distance from the saddling interface to the second fretting crown is inclusively from 195.37% to 220% of a distance from the saddling interface to the first fretting crown. In some embodiments, on a fretting saddling member, a distance from the saddling interface to the second fretting crown is inclusively from 138% to 152% of a distance from the saddling interface to the first fretting crown. In some embodiments, on a fretting saddling member, a distance from the saddling interface to the third fretting crown is inclusively from 255% to 283.48% of the distance from the saddling interface to the first fretting crown. In some embodiments, on a fretting saddling member, a distance from the saddling interface to the third fretting crown is inclusively from 283.48% to 325% of a distance from the saddling interface to the first fretting crown. In some embodiments, on a fretting saddling member, a distance from the saddling interface to the third fretting crown is inclusively from 284.12% to 325% of a distance from the saddling interface to the first fretting crown.

In some embodiments, on a fretting saddling member, a distance from the saddling interface to a longitudinally forward extent of the block is equal to or less than 370% of the distance from the saddling interface to the first fretting crown. In some embodiments, on a fretting saddling member, a distance from the saddling interface to a longitudinally forward extent the block is equal to or less than 450% of the distance from the saddling interface to the first fretting crown. In some embodiments, on a fretting saddling member, a distance from the saddling interface to a longitudinally forward extent the block is equal to or less than 525% of the distance from the saddling interface to the first fretting crown.

In some embodiments, a distance from the saddling interface to the first fretting crown is inclusively from 100% to 120% of a distance from the nut to the first fingerboard fret. In some embodiments, a distance from the saddling interface to the first fretting crown is inclusively from 80% to 100% of a distance from the nut to the first fingerboard fret. In some embodiments, a distance from the saddling interface to the first fretting crown is inclusively from 80% to 99.5% of a distance from the nut to the first fingerboard fret. In some embodiments, a distance from the saddling interface to the first fretting crown is inclusively from 80% to 99% of a distance from the nut to the first fingerboard fret. In some embodiments, a distance from the saddling interface to the first fretting crown is inclusively from 80% to 98.5% of a distance from the nut to the first fingerboard fret. In some embodiments with a diatonic spacing, a distance from the saddling interface to the first fretting crown is inclusively from 80% to 120% of a distance from the nut to the second fingerboard fret.

In some embodiments, a lateral distance between a first pivot point and a second pivot point (for example, points at which two height screws are used for pivoting) of a fretting saddling member on a support is greater than 60 mm. In some embodiments, a lateral distance between a first pivot point and a second pivot point of a fretting saddling member on a support is less than or equal to 60 mm, 50 mm, 40 mm, 30 mm, 20 mm, or 10 mm.

At a point under a fretting saddling member, a vertical thickness of the support to which it is coupled may be greater than 3 mm. At a point under a fretting saddling member, a vertical thickness of the support to which it is coupled may be less than or equal to 3 mm, 2.5 mm, 2 mm, 1.5 mm, and/or 1 mm. On a hollow body of an acoustic instrument, a thin support may allow acoustic coupling of the fretting saddling member to a soundboard.

In some embodiments, a distance from a saddling interface of a fretting saddling member to a longitudinally forward extent of the fretting saddling member is equal to or less than 105% of a distance from a nut to a sixth fingerboard fret.

The lateral distance, center to center, at the rearward critical contact points of two consecutive strings, may be understood to be a lateral string spacing. The lateral string spacing may typically be the same for any two consecutive strings; however, if the strings are spaced unevenly, an average may be used. In the case of coursed strings, such as on a twelve string guitar, a course of strings may be considered to be functionally a single string, with respect to this document.

The word "consecutive" may be understood to indicate that two elements are adjacent. However, the word "consecutive" is not intended to indicate which element is sequentially previous or sequentially subsequent to the other.

The phrases "proximal" and "distal" may be understood to indicate spatial relationships. However, these phrases are not intended to indicate whether or not features are consecutive.

The numerals of Greek origin: proto, deutero, trito, tetarto, pempto, and hecto may be sometimes used to indicate repeated elements. They may be understood to function as first, second, third, fourth, fifth, and sixth, as ordinarily used in technical writing. Lateral position is not implied by the numerals of Greek origin, and may be indicated in another manner. The numerals of Greek origin may avoid confusion that might result from the use of "first string," "second string," "third string," and so forth, as these phrases may have traditional meanings which imply lateral positions. Where "first string," "second string," "third string," etc. are used, they may be understood to have their traditional meanings. In some embodiments, a plurality of consecutive laterally spaced strings includes a proto string, a deutero string, a trito string, a tetarto string, etc., and the proto string is a laterally outermost proximal string. Described embodiments may be interpreted to include these configurations, while not excluding other possible string configurations. Because the figures show certain instruments, for the convenience of the reader, proto string, deutero string, trito string, tetarto string, pempto string, and hecto string may be associated with specific reference numerals. However, the reader should keep in mind that any embodiment may have a varied number of strings, and that the numerals of Greek origin may be used to describe strings in lateral positions other than those illustrated. For example, a proto string may consistently be illustrated in the figures as a laterally outermost proximal string; however, it may be understood that, in a claim, a proto string may have this lateral position or a different lateral position in relation to another string. Relative to one another, two consecutive strings may be a laterally distal string and a laterally proximal string.

In a right handed playing posture, a proximal body side 13 of an instrument 5 may be near the chest, and a distal body side 14 of the instrument may contact the leg. The teachings in this document are applicable to right and left handed instruments. If a right handed six string instrument were tuned to standard guitar tuning, a laterally outermost proximal string might be a "low E" string, and a laterally outermost distal string might be a "high E" string. If a left handed six string instrument were tuned to standard guitar tuning, a laterally outermost proximal string might be a "low E" string, and a laterally outermost distal string might be a "high E" string, though its form might mirror a right handed instrument. An instrument may be illustrated or described with right handed form and function; however, left handed form and function may be substituted for right handed form and function.

A string, a fingerboard fret, a note, a fretting crown segment, another feature, a position of a feature, or a distance from one feature to another may be described as "intonated;" this may be descriptive of a set up with in tune function. "Intonation" and "intonate" may be understood to be a property or process related to in tune function. "To intonate" may be understood to mean locating features such that fingerboard frets and/or a fretting crown segment are in tune relative to a string.

To avoid confusion, what may be conventionally called a "fret" on a fingerboard may be referred to as a "fingerboard fret;" a part of an assembly for use in the opposite direction by wrist fretting may be called a "fretting crown". A note produced at a fingerboard fret may be called a "fretted fingerboard note." A note produced at a fretting crown may be called a "wrist fretable note" or a "wrist fretted note."

"Rearward" and "longitudinally rearward" may be used interchangeably. "Forward" and "longitudinally forward" may be used interchangeably. "Distal" and "laterally distal" may be used interchangeably. "Proximal" and "laterally proximal" may be used interchangeably. The words "tilted" and "angled" may be understood contextually and may be used interchangeably.

For brevity, "instrument" and "strings" may be used instead of "stringed musical instrument" and a "plurality of strings." The words "and" and "or" may be used with a full range of traditional functions including "and/or". The term "and/or" may be used for clarity or to avoid redundancy. The words to "be," to "comprise," to "include," and to "have" may be understood in a non limiting manner.

If an illustration of a right handed instrument in a six string guitar form (tuned to standard tuning) were viewed with a forward end of its neck at the top of a page, its rearward bout at the bottom of the page, and with its strings facing the reader, its "low E" string may be the laterally leftmost of its strings, and its "high E" string may be the laterally rightmost of its strings. As understood from this orientation, strings may be indicated as "leftmost," "second from the left," etc.

A saddle means may be called a "saddle feature." A fastener in the form of a screw may be called a "clamping screw." A fastening opening in the form of a threaded hole may be called a "clamping hole." A longitudinal slot cooperating with a fastener to lock a position of a fretting saddling member or a fretting appendage may be called a "clamping slot." An action similar to wrist fretting performed with a finger of the picking hand may be called "pinkie fretting;" both actions and other similar picking hand actions may be called "counter fretting." An assembly may be called a "wrist fretting assembly" or a "counter fretting assembly." A central longitudinal recess may be called an "elongated longitudinal depression." A back of a body may be called a "backside." A pivot may be called a "pivot feature." A fretting appendage may be called a "fret appendage." A fretting appendage may be called a "block," or a "fretting block." A fretting appendage including two fretting crown segments may be called a "tandem fret appendage." A fretting saddling member may be called a "block," an "extended saddle member," or a "tandem extended saddle member." Nominal sounding lengths and nominal oddment lengths may be called "standard calculated distances." "Height adjustment" may be understood to mean vertical adjustment. "Height position" and "height" may be understood to mean vertical position. "Height distance" may be understood to mean vertical distance. A height adjustment hole may be called a "height positioning hole." A nut may be called a "nut feature." A soundboard may be called an "acoustic top." "Longitudinally rearward critical contact point," "rearward critical contact point," and "critical saddle contact point" may be used interchangeably. A support may be called a "base." A guide surface may, in some contexts, be a surface of a "guidance feature." A body cavity may be called a body "recess." A pickup including a distal coil and a proximal coil may be called a "divided pickup." "Laterally adjacent" features may be understood to be laterally consecutive. A sounding length may be called a "vibrating length" or a "vibration length." A guide surface of a longitudinal slot such as a channel may be called an "interior wall."

Contextually, a fretting crown segment may be called a "one string fretting segment" or a "wrist-fretting crown segment;" a fretting crown may be called a "wrist fretting crown," a "one string fret," a "two string fret," etc.

A feature, function, or position may be described as "about," "substantially," or "approximately." These may be understood to imply functionality exactly in a described position and/or orientation and within a range of variance from the described position and/or orientation. The description of some features, functions, positions, or orientations as "about," "substantially," or "approximately," is not intended to imply that other features, functions, positions, or orientations not described in this manner may be differently precise. Nor is the use of these descriptions intended to imply a lack of precision; they are intended to teach the reader that a range of variations may work.

Broadly, a feature, function, position, or orientation may be understood to be "about," "substantially," or "approximately" as described if an associated string is playable as an open string, and/or a fingerboard fret is usable to play a fingerboard fretted note, and/or a fretting crown is usable to play a wrist fretted note. The terms "about," "substantially," or "approximately" refer to less than or equal to +/−1%, +/−2%, +/−3%, +/−4%, +/−5%, +/−6%, +/−7%, +/−8%, +/−9%, +/−10%, +/−11%, +/−12%, +/−14%, +/−15%, +/−20%, +/−25%, or +/−30% variation. As a non-limiting example, substantially parallel represents a range of −1 to 1 degree difference, −10 to 10 degree difference, or −30 degrees to 30 degrees of difference from being parallel, depending on the embodiments.

A first feature, which is aligned with a second feature, may be substantially aligned with the second feature. A first feature which aligns a second feature with a third feature may substantially align the second feature with the third feature.

A first feature which is centered under a second feature may be substantially centered under the second feature. A first feature which is centered between a second feature and a third feature may be substantially centered between the second feature and the third feature. A first feature which centers a second feature under a third feature may substantially center the second feature under the third feature. A first feature which centers a second feature between a third feature and a fourth feature may substantially center the second feature between the third feature and the fourth feature.

A feature, function, or position described as longitudinal may be understood to be substantially longitudinal. A feature which is longitudinally between two points may be exactly between the two points, or may be vertically higher or lower than and/or laterally proximal or distal to one or both of the points.

A feature, function, or position described as lateral may be understood to be substantially lateral. A feature which is laterally between two points may be exactly between the two points, or may be vertically higher or lower than and/or longitudinally forward or rearward of one or both of the points.

A feature, function, or position described as vertical may be understood to be substantially vertical. A feature which is vertical with respect to two points may be vertical with respect to both points, or may include some overlap in the vertical dimension with one or both points.

Some non limiting examples are presented here for the convenience of the reader. In an example, a substantially longitudinal slot may run at a slight angle to a centerline of a neck or to a string. In some embodiments, a lateral end of a fretting crown is laterally between two strings; the lateral end of the fretting crown may be vertically lower than both strings and nearer to one string than the other string. In a further example, a vertical height screw or fastener may be substantially vertical; however, it may be tilted or angled as respective features, such as a fretting saddling member, are tilted or angled. In another example, a pickup opening which is longitudinally between a fretting crown and fingerboard may be vertically lower than the fretting crown and the fingerboard. In a further example, a fretting crown which is centered under a string may be substantially centered under the string; it may stick out farther from under one side of the string than the other, but still function for wrist fretting.

Not every feature may be visible in every figure. Some descriptions may describe features which may be distributed among several figures illustrating one or more embodiments. When a feature is described with respect to an embodiment, that description may be used to understand a similar feature in another embodiment. Some embodiments may include repeated elements. A description of a first element may be used to understand the similar nature of a second element. Some descriptions include figure numbers which are specified for teaching purposes, and other embodiments share features described with respect to the specified figures; repeated descriptions of those features may be shortened or omitted for brevity. Features described as similar may be understood to be similar to or the same as features to which they are compared. Sections organized by topic may be understood to include information on other topics. Some ranges, when comparing locations of features, may overlap and/or have different endpoints; these ranges are given as examples, to help the reader understand the embodiments; other ranges are both possible and envisioned.

Illustrations and descriptions are detailed and specific for the purpose of teaching; however, they may be understood to illustrate and inform in a non limiting manner. Dimensions and measurements have been presented by way of example, and are not intended to limit the scope of the inventions disclosed herein. Alternatives and variations have been presented; even so, an illustration or description of every possible combination, alternative, or variation is beyond the scope of this document. Outlining some changeable characteristics is not intended to convey that all possible changes have been covered. Without departing from the teachings of this document, features, structures, devices, parts, components, and elements may be combined, omitted, substituted for one another, rearranged, added to, configured differently, altered, varied, or used independently. Without departing from the teachings of this document, steps, methods, processes, and systems may be combined, omitted, added to, substituted for one another, altered, varied, or performed in other orders. A portion or a part of a step or a feature described or illustrated in an embodiment or in an example may be combined with or used instead of a portion or a part of a step or a feature in a different embodiment or in a different example. Changes may be made to the embodiments while remaining within the scope and spirit of the teachings. The embodiments and examples provided herein are not intended to be discrete and separate from each other. All possible combinations and subcombinations of steps and features are intended to fall within the scope of this disclosure.

I claim:

1. A component for a stringed musical instrument, the component comprising:

a block comprising: a saddling interface; a fretting crown spaced longitudinally forward of the saddling interface; and a slot configured to receive an insert of the stringed musical instrument, wherein the block is adjustably positionable on a body of the stringed musical instrument such that a string of the stringed musical instrument extends i) from a longitudinally rearward critical contact point on the saddling interface, ii) at a wrist fretable vertical distance above the fretting crown, iii) above a neck of the stringed musical instrument connected to the body of the stringed musical instrument, iv) to a longitudinally forward critical contact point on a nut of the stringed musical instrument disposed on the neck of the stringed musical instrument, wherein the insert of the stringed musical instrument connects to the body of the stringed musical instrument, and wherein, with the insert of the stringed musical instrument inserted into the slot, a longitudinal position of the block is adjustable relative to the body of the stringed musical instrument by manipulating the block, via the slot, along the insert of the stringed musical instrument.

2. An assembly for a stringed musical instrument, the assembly comprising:

a block comprising a saddling interface and a fretting crown spaced longitudinally forward of the saddling interface, wherein the block is adjustably positionable on a body of the stringed musical instrument such that a proto string of the stringed musical instrument extends i) from a proto string longitudinally rearward critical contact point on the saddling interface, ii) at a wrist fretable vertical distance above the fretting crown, iii) above a neck of the stringed musical instrument connected to the body of the stringed musical instrument, iv) to a proto string longitudinally forward critical contact point on a nut of the stringed musical instrument disposed on the neck of the stringed musical instrument.

3. The assembly of claim 2, wherein the fretting crown comprises a first lateral end and a second lateral end opposite the first lateral end, wherein the block is configured to couple to the body of the stringed musical instrument such that the first lateral end of the fretting crown is laterally between the proto string of the stringed musical instrument and a deutero string of the stringed musical instrument, wherein the deutero string of the stringed musical instrument extends i) from the body of the stringed musical instrument, ii) above the neck of the stringed musical instrument, iii) to the nut of the stringed musical instrument, and wherein the deutero string of the stringed musical instrument is laterally spaced from the proto string of the stringed musical instrument.

4. The assembly of claim 2, wherein the block comprises a first lateral side and a second lateral side opposite the first lateral side, wherein the block is configured to couple to the body of the stringed musical instrument such that the first lateral side of the block is laterally between the proto string of the stringed musical instrument and a deutero string of the stringed musical instrument, wherein the deutero string of the stringed musical instrument extends i) from the body of the stringed musical instrument, ii) above the neck of the stringed musical instrument, iii) to the nut of the stringed musical instrument, and wherein the deutero string of the stringed musical instrument is laterally spaced from the proto string of the stringed musical instrument.

5. The assembly of claim 2, wherein a longitudinal position of the block is adjustable relative to the body of the stringed musical instrument.

6. The assembly of claim 2, wherein a vertical position of the block is adjustable relative to the body of the stringed musical instrument.

7. The assembly of claim 2, wherein the block further comprises a string guide indentation configured to position the proto string of the stringed musical instrument on the saddling interface.

8. The assembly of claim 2, wherein the block is configured to pivotally mount on the body of the stringed musical instrument, wherein the block further comprises a longitudinally forward end and a longitudinally rearward end opposite the longitudinally forward end, and wherein the block pivots to adjust i) a vertical position of the longitudinally rearward end of the block, ii) a vertical position of the longitudinally forward end of the block, or iii) both relative to the body of the stringed musical instrument.

9. The assembly of claim 2, further comprising a height screw configured to adjust a vertical position of the block relative to the body of the stringed musical instrument.

10. The assembly of claim 2, wherein the block further comprises a height adjustment hole configured to receive a height screw configured to adjust a vertical position of the block relative to the body of the stringed musical instrument.

11. The assembly of claim 2, further comprising a support coupleable to the body of the stringed musical instrument, wherein the support comprises a height adjustment hole configured to receive a height screw configured to adjust a vertical position of the block relative to the body of the stringed musical instrument.

12. The assembly of claim 2, further comprising a fastener configured to couple the block to the body of the stringed musical instrument.

13. The assembly of claim 2, wherein the block further comprises an opening configured to receive a fastener configured to couple the block to the body of the stringed musical instrument.

14. The assembly of claim 2, further comprising a support coupleable to the body of the stringed musical instrument, wherein the support comprises an opening configured to receive a fastener configured to couple the block to the body of the stringed musical instrument.

15. The assembly of claim 2, further comprising a support coupleable to the body of the stringed musical instrument, wherein the support comprises a substantially longitudinal slot, and wherein a longitudinal position of the block is adjustable, relative to the body of the stringed musical instrument, by manipulating the block along the slot.

16. The assembly of claim 2, wherein the fretting crown is a first fretting crown, and wherein the block further comprises a second fretting crown spaced longitudinally forward of the first fretting crown.

17. The assembly of claim 2, further comprising a support coupleable to the body of the stringed musical instrument, wherein the support is configured to couple the block to the body of the stringed musical instrument.

18. The assembly of claim 2, wherein a lateral width of the fretting crown is equal to or less than 50 millimeters (mm).

19. The assembly of claim 2, wherein a distance from the saddling interface to a longitudinally forward extent of the block is equal to or less than 525% of a distance from the saddling interface to the fretting crown.

20. The assembly of claim 5, further comprising a fastener configured to lock the longitudinal position of the block.

21. The assembly of claim 6, further comprising a fastener configured to lock the vertical position of the block.

22. A stringed musical instrument comprising:

a body;

a neck comprising a longitudinally rearward end connected to the body and a longitudinally forward end located away from the body;

a fingerboard connected to the neck;

a nut disposed on the longitudinally forward end of the neck; and a block comprising a saddling interface and a fretting crown spaced longitudinally forward of the saddling interface, wherein the block is adjustably positionable on the body such that a proto string i) contacts the saddling interface at a proto string longitudinally rearward critical contact point, ii) extends above the fretting crown and the fingerboard, and iii) contacts the nut at a proto string longitudinally forward critical contact point, and wherein the block is positionable such that the fretting crown defines a wrist fretable note above an open note of the proto string.

23. The stringed musical instrument of claim 22, wherein a vertical position of the block is adjustable relative to the body.

24. The stringed musical instrument of claim 22, wherein a longitudinal position of the block is adjustable relative to the body.

25. The stringed musical instrument of claim 22, wherein the fretting crown comprises a first lateral end and a second lateral end opposite the first lateral end, wherein a deutero string extends i) from the body, ii) above the fingerboard, iii) to the nut, wherein the deutero string is laterally spaced from the proto string, and wherein the first lateral end of the fretting crown is laterally between the proto string and the deutero string.

26. The stringed musical instrument of claim 22, wherein the block is a first block and the fretting crown is a fretting crown of the first block, wherein the stringed musical instrument further comprises a second block comprising a fretting crown of the second block, wherein the second block is adjustably positionable on the body, with the fretting crown of the second block under a deutero string, and such that the fretting crown of the second block defines a wrist fretable note above an open note of the deutero string, wherein the deutero string extends i) from the body, ii) above the fingerboard, iii) to the nut, and wherein the deutero string is laterally spaced from the proto string.

27. The stringed musical instrument of claim 22, wherein the block comprises a first lateral side and a second lateral side opposite the first lateral side, wherein a deutero string extends i) from the body, ii) above the fingerboard, iii) to the nut, wherein the deutero string is laterally spaced from the proto string, and wherein the first lateral side of the block is laterally between the proto string and the deutero string.

28. The stringed musical instrument of claim 22, further comprising a height screw configured to adjust a vertical position of the block.

29. The stringed musical instrument of claim 22, further comprising a sequence of fingerboard frets on the fingerboard, wherein the sequence of fingerboard frets includes a sixth fingerboard fret, and wherein a distance from the saddling interface to a longitudinally forward extent of the block is equal to or less than 105% of a distance from the nut to the sixth fingerboard fret.

30. The stringed musical instrument of claim 22, further comprising a fastener, wherein the fastener has a non locking configuration and a locking configuration, wherein, when the fastener is in the non locking configuration, a position of the block is adjustable relative to the body, and wherein, when the fastener is in the locking configuration, the fastener fixes the position of the block.

* * * * *